(12) United States Patent
Owada

(10) Patent No.: US 7,558,441 B2
(45) Date of Patent: Jul. 7, 2009

(54) RESOLUTION CONVERSION UPON HIERARCHICAL CODING AND DECODING

(75) Inventor: Mitsuru Owada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 675 days.

(21) Appl. No.: 10/689,781

(22) Filed: Oct. 22, 2003

(65) Prior Publication Data

US 2004/0086188 A1    May 6, 2004

(30) Foreign Application Priority Data

Oct. 24, 2002    (JP)    ............................ 2002-309901
Oct. 24, 2002    (JP)    ............................ 2002-309902

(51) Int. Cl.
*G06K 9/32* (2006.01)
*G06K 9/46* (2006.01)
*H04N 7/12* (2006.01)
*H04N 11/02* (2006.01)
*H04N 11/04* (2006.01)

(52) U.S. Cl. .................. 382/299; 382/240; 375/240.19

(58) Field of Classification Search ................. 382/240, 382/298; 341/79; 709/203; 375/240.19
See application file for complete search history.

(56) References Cited

U.S. PATENT DOCUMENTS

| | | | |
|---|---|---|---|
| 5,657,085 A | 8/1997 | Katto | |
| 5,920,652 A | 7/1999 | Wilkinson | |
| 6,314,452 B1 * | 11/2001 | Dekel et al. | ................. 709/203 |
| 6,360,019 B1 * | 3/2002 | Chaddha | ..................... 382/253 |
| 6,591,017 B1 | 7/2003 | Fukuhara et al. | |
| 6,870,961 B2 | 3/2005 | Matsubara | |
| 6,879,727 B2 | 4/2005 | Sato | |
| 6,898,310 B1 | 5/2005 | Ohmi et al. | |
| 7,181,077 B2 | 2/2007 | Matsubara | |
| 2002/0176629 A1 * | 11/2002 | Labelle | ........................ 382/232 |
| 2003/0113027 A1 * | 6/2003 | Chan et al. | .................. 382/240 |
| 2003/0123744 A1 * | 7/2003 | Chui et al. | ................... 382/240 |

FOREIGN PATENT DOCUMENTS

| | | |
|---|---|---|
| JP | 6-245077 | 9/1994 |
| JP | 10-003542 | 1/1998 |
| JP | 11-196284 | 7/1999 |
| JP | 2000-023197 | 1/2000 |
| JP | 2000-125293 | 4/2000 |

(Continued)

OTHER PUBLICATIONS

Rabbani and Joshi ("An Overview of the JPEG 2000 still image compression standard", Signal Processing: Image Communication 17 (2002) 3-48).*

(Continued)

*Primary Examiner*—Matthew C Bella
*Assistant Examiner*—Randolph Chu
(74) *Attorney, Agent, or Firm*—Fitzpatrick, Cella, Harper & Scinto

(57) ABSTRACT

In a decoding method of decoding encoded image data which has been hierarchically encoded in advance, a size of an image to be outputted is determined, and then the encoded image data is decoded up to a layer of hierarchy which is at least one layer more than a minimum number of layer/layers of hierarchy necessary to acquire an image of the determined size.

18 Claims, 39 Drawing Sheets

FOREIGN PATENT DOCUMENTS

| | | |
|---|---|---|
| JP | 2000-125294 | 4/2000 |
| JP | 2000-165664 | 6/2000 |
| JP | 2000-307876 | 11/2000 |
| JP | 2001-223901 | 8/2001 |
| JP | 2001-346047 | 12/2001 |
| JP | 2002-094804 | 3/2002 |
| JP | 2002-152517 | 5/2002 |
| JP | 2002-152744 | 5/2002 |
| WO | 01/86941 | 11/2001 |
| WO | 02/31756 | 4/2002 |

OTHER PUBLICATIONS

Christopholos et al., "The JPEG 2000 still image coding system: an Overview", IEEE Transaction on Consumer Electronics, vol. 46 No. 4, pp. 1103-1127, Nov. 2000.*

Vetterli, Martin, "Wavelet Transforms and Subband Coding", Journal of the Institute of Electronics, Information and Communication Engineers, vol. 74, No. 12, pp. 1275-1278, Dec. 1991.

Office Action, dated Nov. 16, 2007, in JP 2002-309901.

Office Action, dated Nov. 16, 2007, in JP 2002-309902.

Office Action, dated Feb. 8, 2008, in JP 2002-309901.

Office Action, dated Feb. 8, 2008, in JP 2002-309902.

Office Action, dated May 2, 2008, in JP 2002-309901.

* cited by examiner

F I G. 16
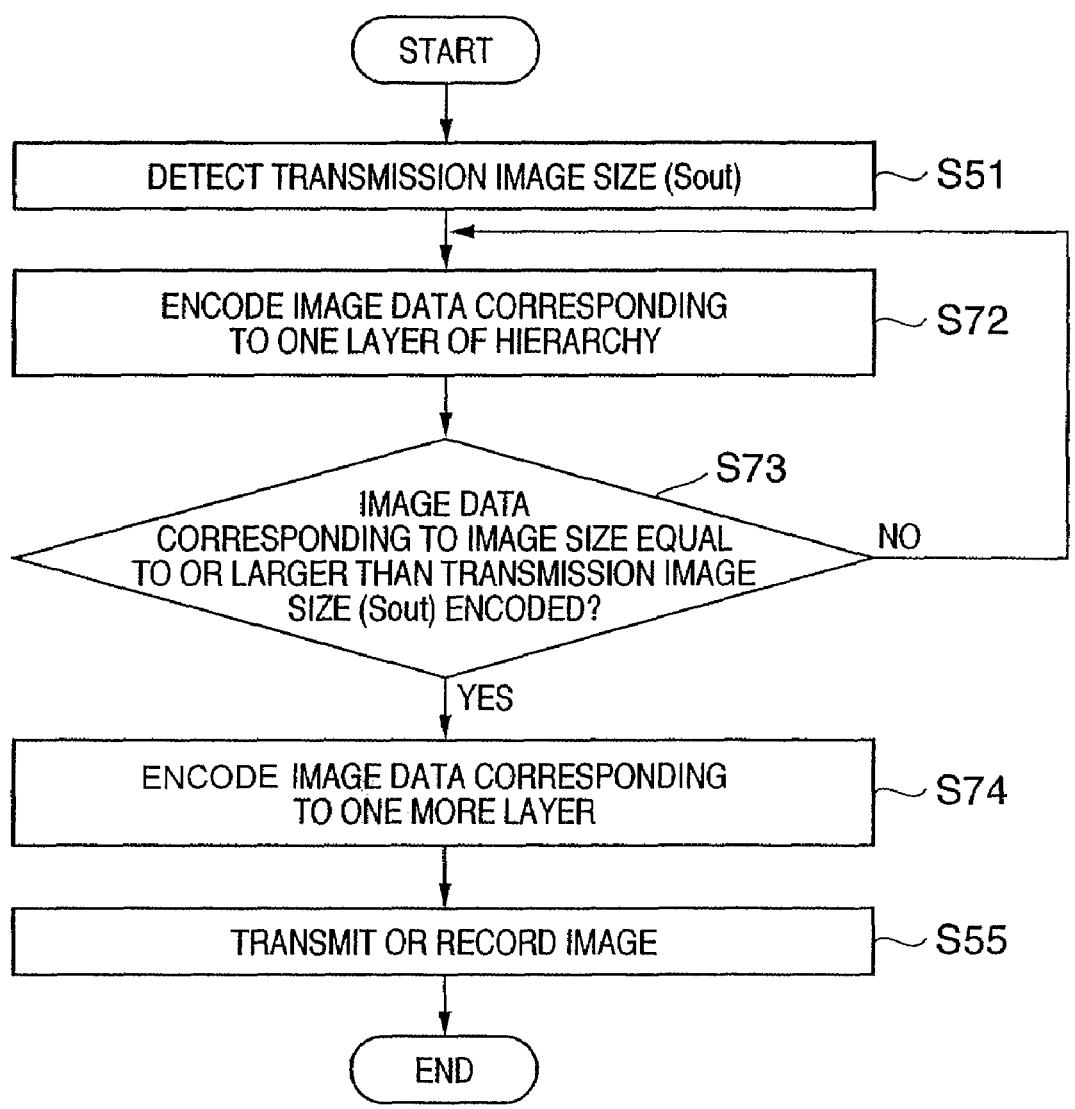

F I G. 31
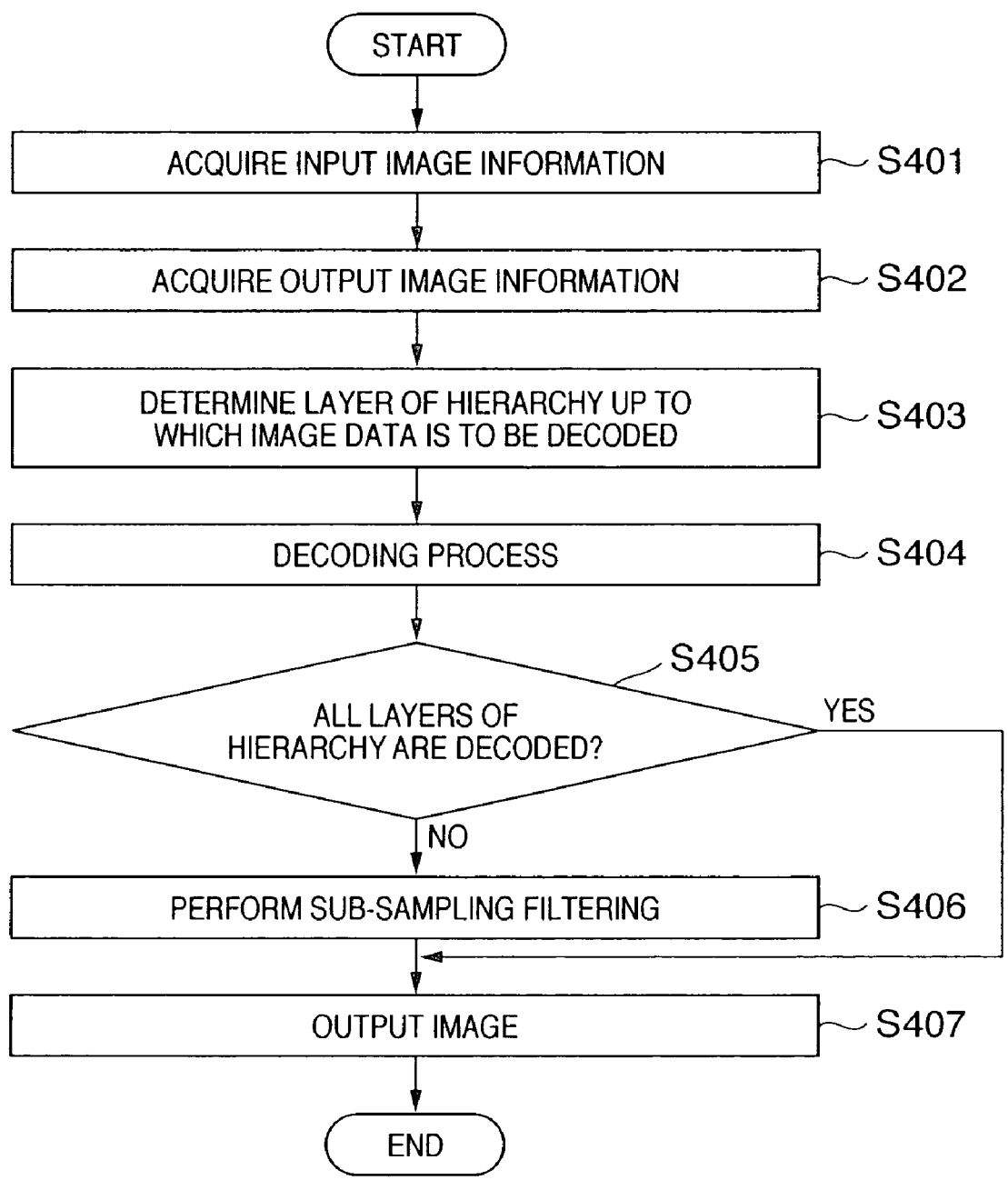

RESOLUTION CONVERSION UPON HIERARCHICAL CODING AND DECODING

FIELD OF THE INVENTION

The present invention relates to resolution conversion and, more particularly, to resolution conversion with relation to a hierarchical coding method.

BACKGROUND OF THE INVENTION

As computers and networks progresses rapidly, a variety of kinds of information, such as character data, image data, and audio data, are stored in and transferred between computers and networks. Among this data, a data amount of image data, especially multi-value image data is very large because the data contains much information, and there is a problem that the image data consumes resources such as memory and communication lines when the image data is stored and transferred. To cope with the problem, a high efficiency coding is often used to remove redundancy in an image and/or reduces the data amount by changing the content of the image to a level where the degradation of the image quality is not so conspicuous.

As for high efficiency coding methods, ISO, which is an international standardized coding method for a still image and JPEG recommended by ITU-T, is widely used. JPEG is based on the discrete cosine transform and has a problem of block distortions generated at a high compression ratio.

Resolution of a device in which input or output an image is improved in order to meet the demand for better image quality, a higher compression rate is demanded than ever. Accordingly, a subband coding method, another conversion method, is used. In the subband coding method, a digital image signal is divided into bands by, e.g., a filter for wavelet transform (the band division is called "wavelet transform", hereinafter), which is then compressed. More specifically, in subband coding, after an inputted signal is filtered by a plurality of filters having different passbands, the filtered signals are down-sampled at intervals corresponding to the passbands, and compressed using a tendency of energy of output signals from the filters (Martin Vetterli, "Wavelet transform and Subband Coding", Journal of the Institute of Electronics, Information and Communication Engineers, Vol. 74, No. 12, PP. 1275-1278, December 1991).

Subband coding is hierarchical coding, and encoded data can be decoded up to a desired layer of hierarchy without decoding all layers of hierarchy. Subband coding has a virtue of easily realizing efficient decoding, but also has a drawback of including alias which degrade image quality.

Wavelet transform is generally said to be a lower concept or modification of subband coding. It should be noted that "wavelet" in this specification is not limited to a technique using wavelet transform filters, and should be understood to widely include a technique of using filters adapted in subband coding.

FIG. 34 shows a basic configuration of an apparatus which performs band division by filters used in subband coding, e.g., wavelet transform filters, and synthesis. Orthogonal mirror filters are generally used as the wavelet transform filters.

Referring to FIG. 34, reference numeral 1101 denotes an image input processing unit which pre-processes image data; 1102, a discrete wavelet transform unit; 1103, a quantization unit; 1104, an entropy encoder; 1105, a transmission/recording processing unit; 1106, a reception/reproduction processing unit; 1107, an entropy decoder; 1108, an inverse quantization unit; 1109, an inverse discrete wavelet transform unit; and 1110, an image output unit. The configurations from the image input processing unit 1101 through the transmission/recording processing unit 1105 constitute an encoding apparatus, and data outputted from the encoding apparatus is transferred via communication or a recording medium to an decoding apparatus, constituted by the configurations from the reception/reproduction processing unit 1106 through the image output unit 1110, where an image is reproduced.

Encoding processing is explained first. An input image signal undergoes processes, such as γ conversion and color conversion, in the image input processing unit 1101, and enters the discrete wavelet transform unit 1102. The discrete wavelet transform unit 1102 performs discrete wavelet transform on the input image signal both in the vertical and horizontal directions. In wavelet transform processing, wavelet transform is recursively performed on a low frequency component obtained by wavelet transform, thereby generating multiple layers of hierarchy. The discrete-wavelet-transformed image data is inputted to the quantization unit 1103. The quantization unit 1103 can change the compression ratio and coding rate by quantizing the wavelet data with predetermined characteristics. The quantized image data is compressed by the entropy encoder 1104 utilizing the redundancy of the data. The transmission/recording processing unit 1105 performs processes for transferring the coded data, and for converting the coded data to a format suited for a medium when recording the data on the medium. The image is hierarchically encoded in the foregoing processing, and the output data is transferred or recorded on a storage medium.

The decoding processing is realized by performing the processes of the encoding processing in the inverse order. First, the reception/reproduction processing unit 1106 separates and reproduces image data which is transferred or recorded on a medium, and the entropy decoder 1107 decodes the image data, the inverse quantization unit 1108 decodes the image data to data before quantization, then the inverse discrete wavelet transform unit 1109 decodes the data into the original image data. Thereafter, the original image data is converted to image data suitable for designation of output by the image output unit 1110, then outputted. In this processing, it is possible to obtain an image of a desired small size by performing the inverse wavelet transform processing up to an intermediate layer of hierarchy, by taking advantage of the virtue of hierarchical encoding. Since the wavelet transform is generally octave transform, an image, corresponding to layer/layers of hierarchy, whose size is $1/2^n$ of the original size can be easily obtained.

With reference FIGS. 35 and 36, discrete wavelet transform in encoding processing is mainly described in more detail, and with reference to FIG. 37, discrete wavelet transform in decoding processing is mainly described in more detail.

In FIG. 35, the same elements as those in FIG. 34 are referred to by the same reference numerals. Image data is inputted to a low pass filter 1203 for analysis (referred to as "analysis LPF", hereinafter) for band division and to a high pass filter 1201 for analysis (referred to as "analysis HPF", hereinafter) for band division, and separated into a low frequency band signal and a high frequency band signal. Since the band width of each separated signal is a half the band width of the original image data, the down samplers 1202 and 1204 sample the signals. The high frequency band signal is directly outputted to the quantization unit 1103. The low frequency band signal is recursively processed by an analysis HPF 1205, an analysis LPF 1207, and down samplers 1206 and 1208. FIG. 35 shows an example of outputting three layers of hierarchy by two cycles of processing for explanatory convenience. Its concept is shown in FIG. 38. By the two dimensional (vertical and horizontal) processing, data corresponding to HL1, LH1, HH1 shown in FIG. 38 is obtained by the analysis HPF 1201 and the down sampler 1202, and data corresponding to LL1 is obtained by the analysis LPF 1203 and the down sampler 1204. However, the LL1 is recursively processed, and data corresponding to HL2, LH2, HH2 in FIG. 38 is obtained by the analysis HPF 1205 and the down sampler 1206, and data corresponding to LL2 in FIG. 38 is obtained by the analysis LPF 1207 and the down sampler 1208.

The respective frequency band data is quantized by the quantizer 1103a to 1103c corresponding to the respective frequency bands, and encoded by the entropy encoder 1104 for each band, then outputted by the transmission/recording processing unit 1105.

FIG. 36 shows an example of another configuration of the discrete wavelet transform unit 1102. In FIG. 36, the same elements as those in FIG. 35 are referred to by the same reference numerals. In the configuration shown in FIG. 36, when data of all the layers of hierarchy of an image is not needed, the transmission/recording processing unit 1105 outputs information indicating it to a controller 1209. In turn, the controller 1209 controls so that data of a needless layer/layers of hierarchy is not encoded out of hierarchically corded data of each frequency band. If high resolution data of a high layer/layers of hierarchy is not needed, the switch unit 1210 opens a switch or switches corresponding to the data of the higher layer/layers of hierarchy, thereby preventing the data of the layer/layers of hierarchy which is not encoded from being inputted to the entropy encoder 1104. At this time, it is possible to reduce a processing load and energy consumption by stopping the needless operations performed by a part of the discrete wavelet transform unit 1102 and the entropy encoder 1104.

In FIG. 37, the same elements as those in FIG. 34 are referred to by the same reference numerals. In the example shown in FIG. 38, an inverse quantizer 108a corresponds to the quantizer 1103a for quantizing hierarchical data of HL1, LH1 and HH1, an inverse quantizer 1108b corresponds to the quantizer 1103b for quantizing hierarchical data of HL2, LH2, and HH2, and an inverse quantizer 1108c corresponds to the quantizer 1103c for quantizing hierarchical data of LL2 in the low frequency band. The inversely quantized signals sequentially undergo inverse wavelet transform from the data of LL2.

First, LL2 is interpolated with 0's by an up sampler 1301, and further undergoes interpolation processing by a LPF 1302 for synthesis (referred to as "synthesis LPF", hereinafter) for band synthesis. HL2, LH2, and HH2 are similarly up-sampled by the up sampler 1304, undergo interpolation processing by a HPF 1305 for synthesis (referred to as "synthesis HPF", hereinafter) for band synthesis, then added to the LL2 component by an adder 1303, thereby LL1 is reproduced. The reproduced LL1 is further up-sampled by an up sampler 1306, and interpolated and reproduced by a synthesis LPF 1307. HL1, LH1, and HH1 are also up-sampled by an up sampler 1309, interpolated and reproduced by a synthesis HPF 1310, then added to the LL1 component by an adder 1308, thereby an original image is reproduced.

By selectively outputting data out of the respective hierarchical data acquired in the above processing steps in the image output unit 1110, an image having 1/2" of the original size can be easily outputted.

In the conventional coding method based on subband coding or wavelet transform, a range where a rip occurs becomes wide in the blocking frequency range of a filter when a filter having many taps, such as finite impulse response (FIR) filter is used for band division, and ringing is caused around portions where signal level changes greatly, e.g., at edges in an image. Especially for recursively performing band division a plurality of times, the same filter is conventionally used for all the band division processes. This causes a relative increase in the number of taps of a filter due to down sampling operation as the band division progresses. As a result, ringing occurs in a wide area around an edge of an image. To cope with this problem, a filter having a smaller number of taps and having a broad passband characteristic is used to restrain the occurrence range ringing. As the wavelet transform filter, an orthogonal mirror filter is generally used.

FIG. 39 shows characteristics of a 9×7 filter using the orthogonal mirror filter used in JPEG2000 which is recently suggested. It can be seen that both of the LPF and HPF have broad passband characteristics. However, due to the broad passband characteristics, aliasing occurs when a signal is down sampled after filtering an image signal for band division. However, the aliasing included in the image signals passed through the respective LPF and HPF is theoretically cancelled by synthesizing the filtered image signals without performing quantization. But when an image signal corresponding to an intermediate layer/layers of hierarchy from a LPF is extracted and outputted as an image signal, aliasing is not cancelled because no signal component from a HPF is synthesized.

This problem is caused because a condition of complete reproduction is not satisfied when decoding frequency divided signals, and aliasing generated by the HPF and LPF can not be cancelled to each other.

The effect of the aliasing generated by the LPF appears as ringing near edges where levels largely change. This is because the edges include signals in high frequency band but there is not a high frequency component, and aliasing generated by the LPF can not be cancelled. As a result, a high frequency component even affects a low frequency component as alias which generates noise in an area where the signal level gradually changes in an image. In short, the image is degraded in the low frequency component.

In a scheme of extracting signals up to an intermediate layer of hierarchy, only the LPF signal component which naturally includes alias is extracted and outputted, and therefore, an image of good quality can not be obtained.

The characteristics of the LPF and HPF are defined in the Standard. If a LPF and/or HPF having modified characteristics is used, compatibility is not maintained and moreover, the Standard itself is broken.

There is a method that, when the size of an input image is different from that of the output image, the resolution of an image inputted to an encoding apparatus is changed in advance. In this case, any known resolution conversion means can be used. Since it is necessary to change the settings of, inter alia, a filter in response to an output resolution, a large capacity is needed for memory and/or hardware when a two dimensional filter is used. Furthermore, when a destination device simultaneously requests a plurality of resolutions, it is necessary to prepare a plurality of devices and the devices have to be operated in response to the destination device.

Further, it is also possible to perform color resolution conversion in hierarchical coding. In a case of converting a 4:2:2 image signal to a 4:2:0 image signal, for instance, the conversion is easily realized by cutting the vertical color component or performing an equivalent process. In this case, however, alias can not be cancelled since the high frequency component is cut in the aforesaid conventional method, and an image is degraded due to a residual alias component. Similarly, a 4:1:1: signal can be obtained by cutting a horizontal color component, and a 4:1:0 signal can be obtained by cutting vertical and horizontal color components, but there is the same drawback as set forth above.

SUMMARY OF THE INVENTION

The present invention has been made in consideration of the above situation, and has as its object to reproduce an image of good quality which is not exerted by a bad influence of alias due to an image signal of an intermediate layer/layers of hierarchy in hierarchical coding.

It is another object of the present invention to encode an image of good quality when the image is encoded up to an intermediate layer of hierarchy.

According to the present invention, the foregoing object is attained by providing a decoding method of decoding encoded image data which has been hierarchically encoded in advance, comprising: determining a size of an image to be outputted; and decoding the encoded image data up to a layer of hierarchy which is at least one layer more than a minimum number of layer/layers of hierarchy necessary to acquire an image of the determined size.

According to the present invention, the foregoing object is also attained by providing a decoding apparatus for decoding encoded image data which has been hierarchically encoded in advance, comprising: a determination unit that determines a size of an image to be outputted; and a decoding unit that decodes the encoded image data up to a layer of hierarchy which is at least one layer more than a minimum number of layer/layers of hierarchy necessary to acquire an image of the determined size.

Further, according to the present invention, the foregoing object is also attained by providing an encoding method of hierarchically encoding an image, comprising: determining a size of an image to be outputted; and encoding the image up to a layer of hierarchy which is at least one layer more than a minimum number of layer/layers of hierarchy necessary to acquire an image of the determined size.

Furthermore, according to the present invention, the foregoing object is also attained by providing an encoding apparatus for hierarchically encoding an image, comprising: a determination unit that determines a size of an image to be outputted; and an encoding unit that encodes the image up to a layer of hierarchy which is at least one layer more than a minimum number of layer/layers of hierarchy necessary to acquire an image of the determined size.

Further, according to the present invention, the foregoing object is also attained by providing an encoding method of hierarchically encoding an image, comprising: restraining a frequency component which causes alias of an image signal of the image at the time of separating the image signal into layers of hierarchy; and separating the restrained image signal into layers of hierarchy.

Further, according to the present invention, the foregoing object is also attained by providing an encoding apparatus for hierarchically encoding an image, comprising: a frequency restraining unit that restrains a frequency component which causes alias of an image signal of the image at the time of separating the image signal into layers of hierarchy; and a separating unit that separates the image signal restrained by the frequency restraining unit into layers of hierarchy.

Further, according to the present invention, the foregoing object is also attained by providing a decoding method of decoding encoded image data which has been hierarchically encoded in advance, comprising: determining a layer of hierarchy up to which the encoded image data is to be decoded; decoding the encoded image data up to the determined layer; judging whether or not the determined layer corresponds to the highest layer of hierarchy of the encoded image data; and restraining, when the determined layer does not correspond to the highest layer, a frequency component, which causes alias, of the decoded image data.

Further, according to the present invention, the foregoing object is also attained by providing a decoding method of decoding encoded image data which has been hierarchically encoded in advance, comprising: decoding all of the encoded image data; judging whether or not the encoded image data was obtained as a result of encoding all layers of hierarchy; and restraining, when all the layers of hierarchy have not been encoded, a frequency component, which causes alias, of the decoded image data.

Further, according to the present invention, the foregoing object is also attained by providing a decoding method of decoding encoded image data which has been hierarchically encoded in advance, comprising: inputting encoded image data from external; determining a layer of hierarchy up to which the encoded image data is to be decoded; decoding the encoded image data up to the determined layer; judging whether or not all layers of hierarchy of the encoded image data have been decoded; and restraining, when all the layers of hierarchy have not been decoded, a frequency component, which causes alias, of the decoded image data.

Further, according to the present invention, the foregoing object is also attained by providing a decoding apparatus for decoding encoded image data which has been hierarchically encoded in advance, comprising: a determination unit that determines a layer of hierarchy up to which the encoded image data is to be decoded; a decoder which decodes the encoded image data up to the determined layer; a judging unit that judges whether or not the determined layer corresponds to the highest layer of hierarchy of the encoded image data; and a restraining unit that restrains, when the determined hierarchy does not corresponds to the highest layer, a frequency component, which causes alias, of the decoded image data.

Further, according to the present invention, the foregoing object is also attained by providing a decoding apparatus for decoding encoded image data which has been hierarchically encoded in advance, comprising: a decoder that decodes all of the encoded image data; a judging unit which judges whether or not the encoded image data was obtained as a result of encoding all layers of hierarchy; and a restraining unit that restrains, when all the layers of hierarchy have not been encoded, a frequency component, which causes alias, of the decoded image data.

Further, according to the present invention, the foregoing object is also attained by providing a decoding apparatus for decoding encoded image data which has been hierarchically encoded in advance, comprising: an input unit that inputs encoded image data from external; a determination unit that determines a layer of hierarchy up to which the encoded image data is to be decoded; a decoder that decodes the encoded image data up to the determined layer; a judging unit that judges whether or not all layers of hierarchy of the encoded image data have been decoded; and a restraining unit that restrains, when all the layers of hierarchy have not been decoded, a frequency component, which causes alias, of the decoded image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 16 is a flowchart for explaining an example of encoding processing according to a seventh embodiment of the present invention;

FIG. 31 is a flowchart for explaining decoding processing according to the twelfth embodiment of the present invention;

DETAILED DESCRIPTION OF THE PREFERRED EMBODIMENTS

Preferred embodiments of the present invention will be described in detail in accordance with the accompanying drawings.

In the first to eighth embodiments, the present invention is realized as an image reproduction apparatus and an image recording apparatus adopting hierarchical coding processing, and the present invention is especially effective to an apparatus which outputs an image of up to an intermediate layer of hierarchy. In the embodiments, a case of adopting a discrete wavelet transform method which conforms to JPEG2000 is explained.

First Embodiment

Figure 1:
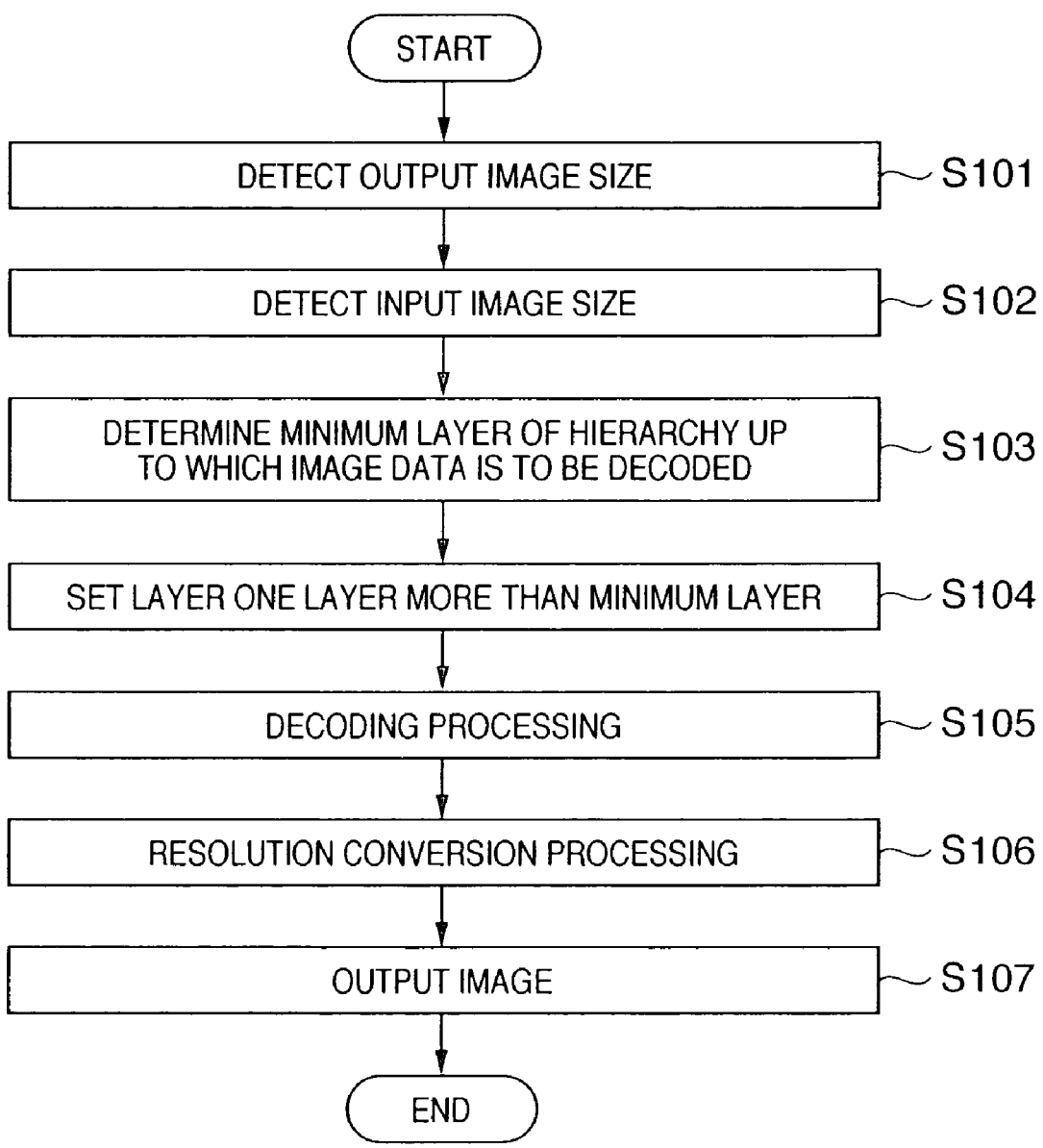
FIG. 1 is a flowchart showing a concept of image reproduction processing according to a first embodiment of the present invention.

A first embodiment is briefly explained with reference to a flowchart of FIG. 1.

First, an output image size is detected in step S101, an input image size is detected in step S102, then the process moves on to step S103.

In step S103, a minimum layer of hierarchy up to which image data is to be decided is determined from the output and input image sizes obtained in steps S101 and S102, then the process proceeds to step S104. In step S104, a layer of hierarchy which is one layer more than the layer determined in step S103 (so that a larger image is decoded) is set. In step S105, decoding processing is performed up to the layer of hierarchy which is set in step S104, and the process proceeds to step S106. Since an image which is larger than the required output image size is decoded due to the process in step S104, the resolution of the decoded image is reduced in step S106. A pre-filtering process is performed so that alias is not generated in this down sampling. Next in step S107, γ correction, color correction, format conversion, offset processing, and so on, are performed on the image of good quality obtained in step S106 in accordance with a device to which the image is outputted, then the processed image is outputted.

Next, the aforesaid processing example is explained in more detail with reference to FIG. 2.

Figure 2:
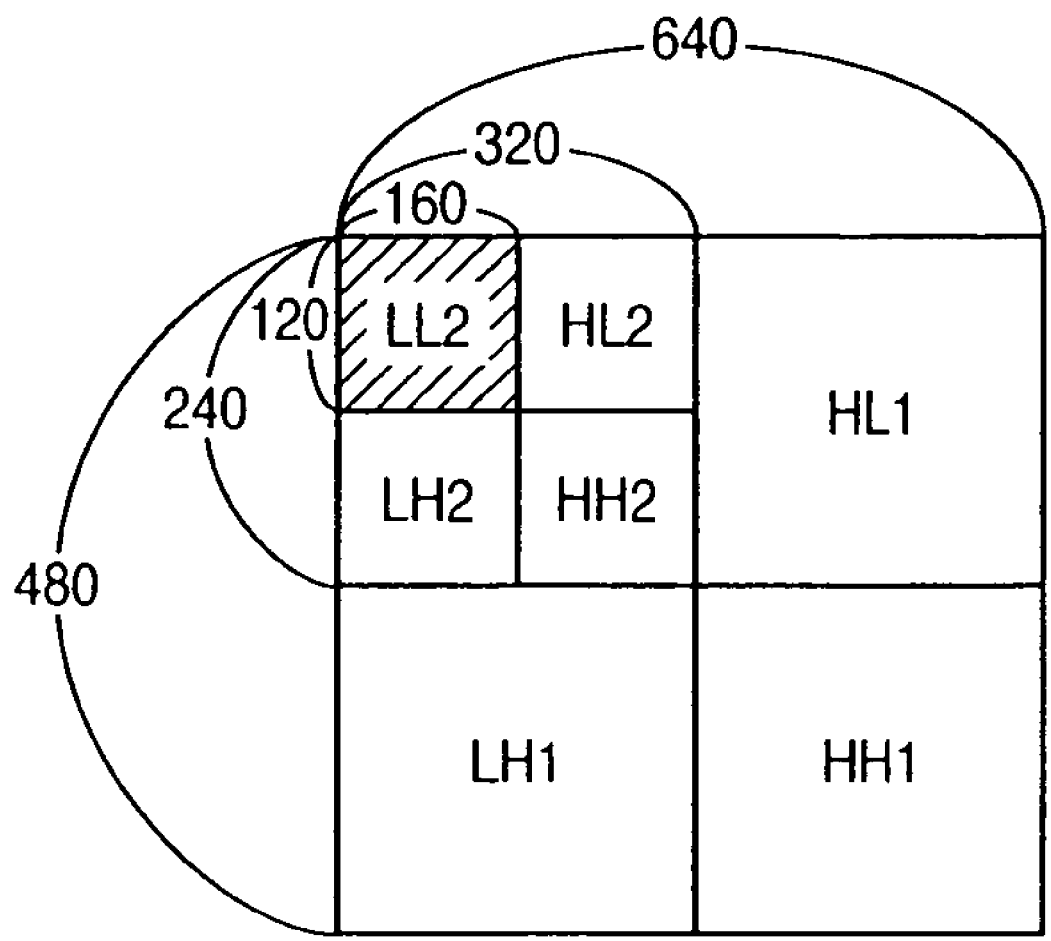
FIG. 2 is a drawing conceptually showing a hierarchy of a hierarchically coded image.

FIG. 2 is a drawing exemplifying a hierarchy of a hierarchically coded image. Here, a case of outputting a 160 (pixels)×120 (pixels) image (horizontal×vertical) from image data of a 640 (pixels)×480 (pixels) image is explained. Since an output image size corresponds to LL2 in FIG. 2, a layer of LL2 is obtained first. However, a decoded image of only LL2 is a distorted image including alias, thus a layer of hierarchy which is one layer more than the layer of LL2 is set in order to cancel alias of LL2. In this case, image data of 320×240 pixels corresponding to LL2, HL2, LH2, and HH2 is decoded. In this way, alias of LL2 is cancelled. Thereafter, a 160 (pixels)×120 (pixels) image is obtained from the decoded 320 (pixels)×240 (pixels) image using a sub-sampling filter, thereby obtaining an image of good quality.

Figure 3:
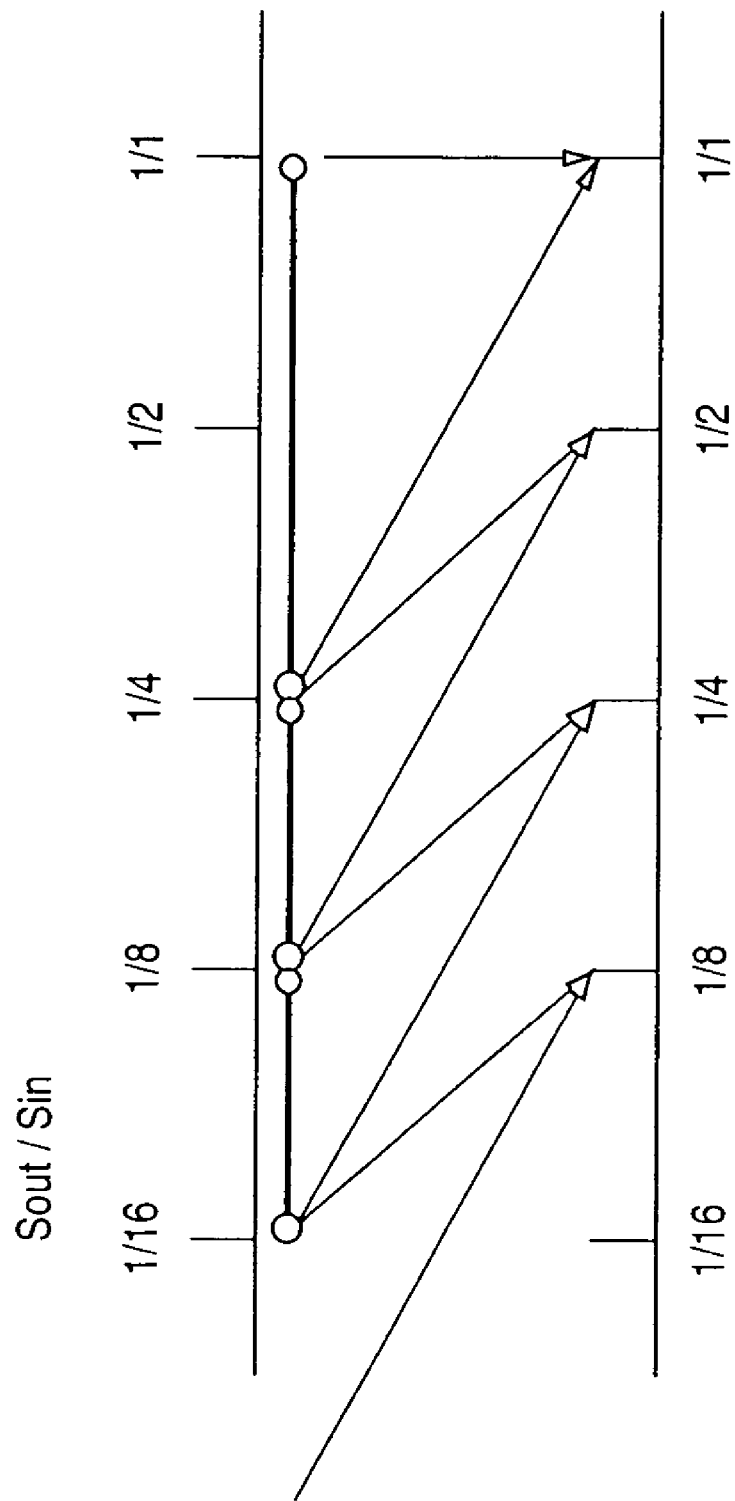
FIG. 3 is a view showing relationship between the sizes of input and output images and layers of hierarchy according to an embodiment of the present invention.

FIG. 3 shows a relationship between the input/output size ratios and layers of hierarchy up to which image data is to be decoded. When an output image size is denoted by Sout and an input image size is denoted by Sin, Sout/Sin is shown in the upper scale. A concept of a layer up to which image data is to be decoded in this invention is shown in the lower scale. For instance, when outputting an image whose input/output ratio is greater than $1/8(=1/2^3)$ and not greater than $1/4(=1/2^2)$, image data is decoded up to a layer which makes the image size of a decoded image 1/2 of an input image size.

Figure 4:
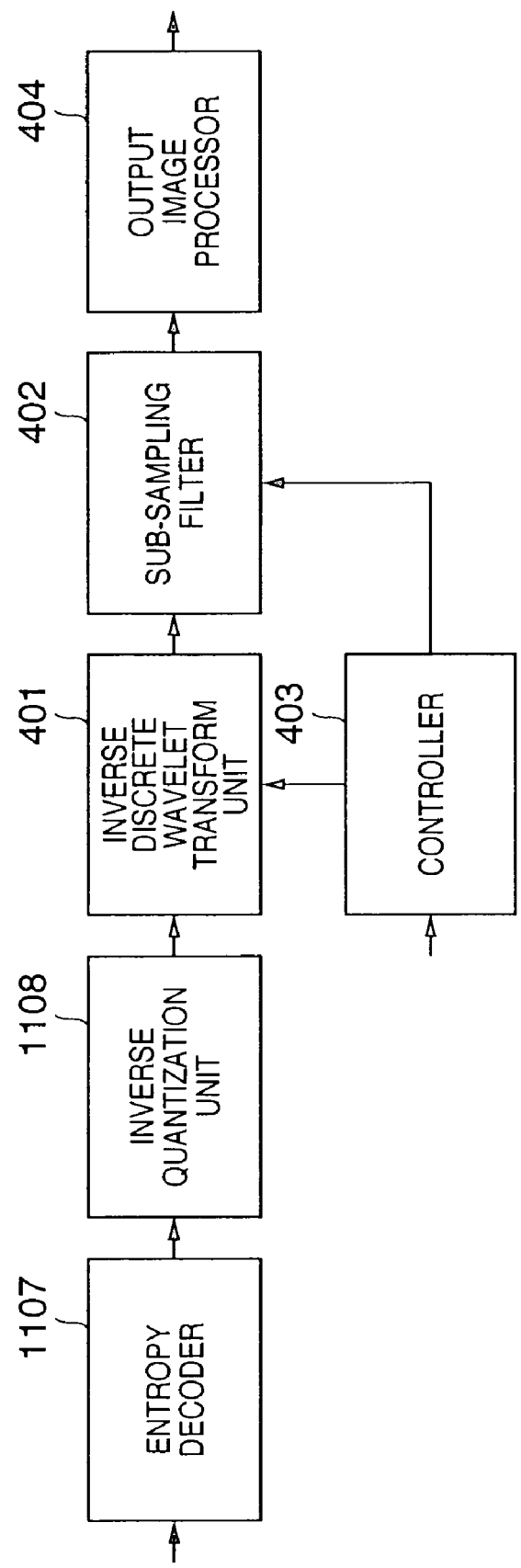
FIG. 4 is a block diagram showing a functional configuration of a decoding apparatus according to the first embodiment of the present invention.

FIG. 4 is a block diagram showing a functional configuration of a decoding apparatus according to the first embodiment. In FIG. 4, reference numeral 1107 denotes an entropy decoder, and reference numeral 1108 denotes an inverse quantization unit. An inverse discrete wavelet transform unit 401 is basically the same as the inverse discrete wavelet transform unit 1109 shown in FIG. 34 described as a prior art, but different in that the inverse discrete wavelet transform unit 401 can stop decoding processing in the middle of the decoding processing or stop the decoding operation partially in response to a control signal (will be described later). Reference numeral 402 denotes a sub-sampling filter for resolution conversion; 403, a controller for controlling hierarchical processing; and 404, an output image processor.

The controller 403 determines a layer of hierarchy up to which image data is to be decoded on the basis of the input image size and the output image size, and controls the inverse discrete wavelet transform unit 401 and the sub-sampling filter 402. Since decoding of image data more than the necessary layer/layers is not needed, the controller 403 controls the inverse discrete wavelet transform unit 401 to stop the decoding processing in the middle of the decoding processing or to stop operation of an unnecessary processing unit/units. In this manner, it is possible to improve processing time, processing performance, and energy consumption.

The controller 403 controls the sub-sampling filter 402 to perform resolution conversion processing of reducing the image size to equal to or less than 1/2 of the image data outputted from the inverse discrete wavelet transform unit 401. This process includes a pre-filtering process for removing alias caused by down sampling. However, this process by the sub-sampling filter 402 is not performed when all of the image data is outputted. The output image processor 404 performs various processes and conversions for outputting the image and outputs the processed image similarly to the image output unit 1110 in FIG. 34.

Figure 5:
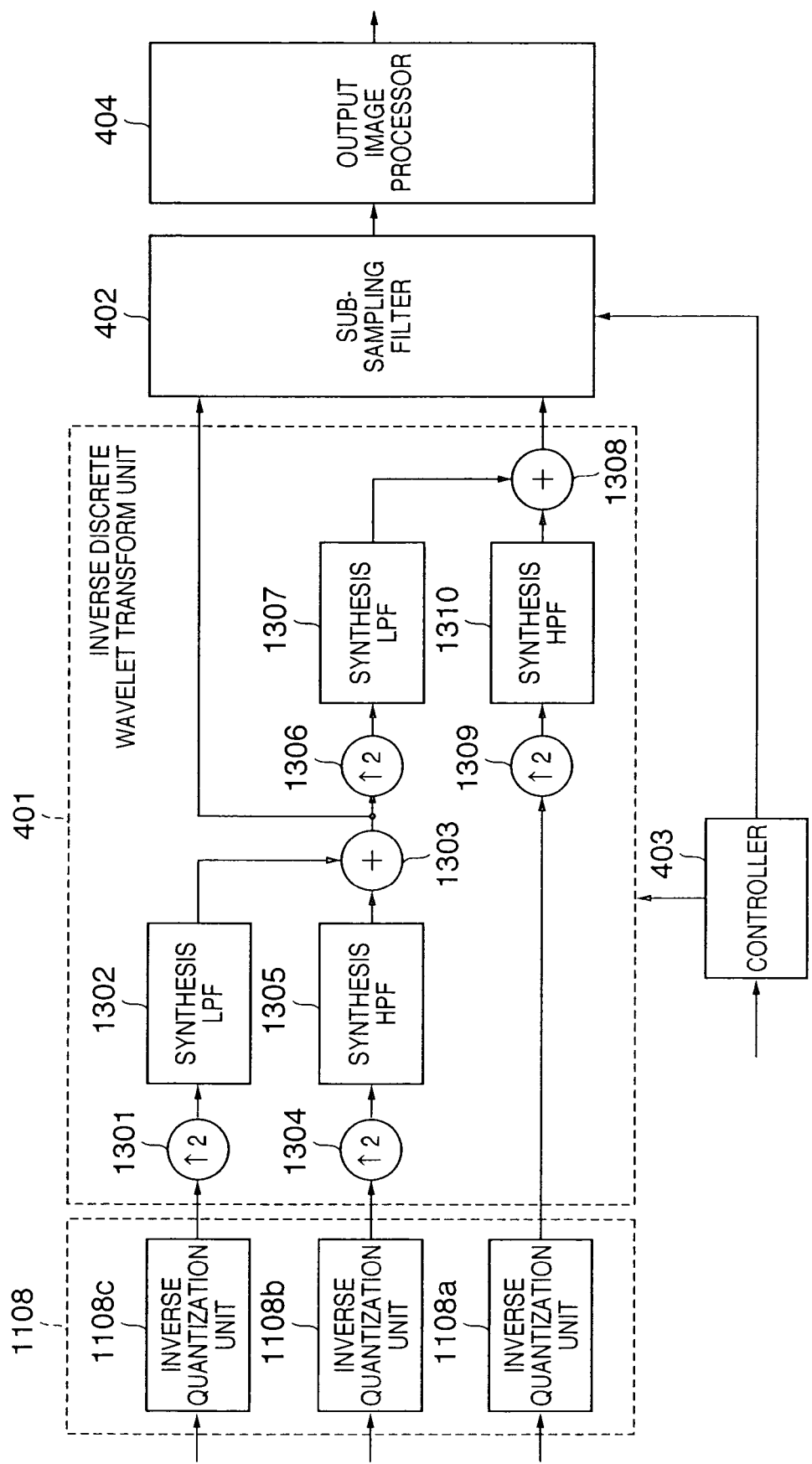
FIG. 5 is a block diagram showing an internal configuration of an inverse discrete wavelet transform unit according to the first embodiment of the present invention.
Figure 37:
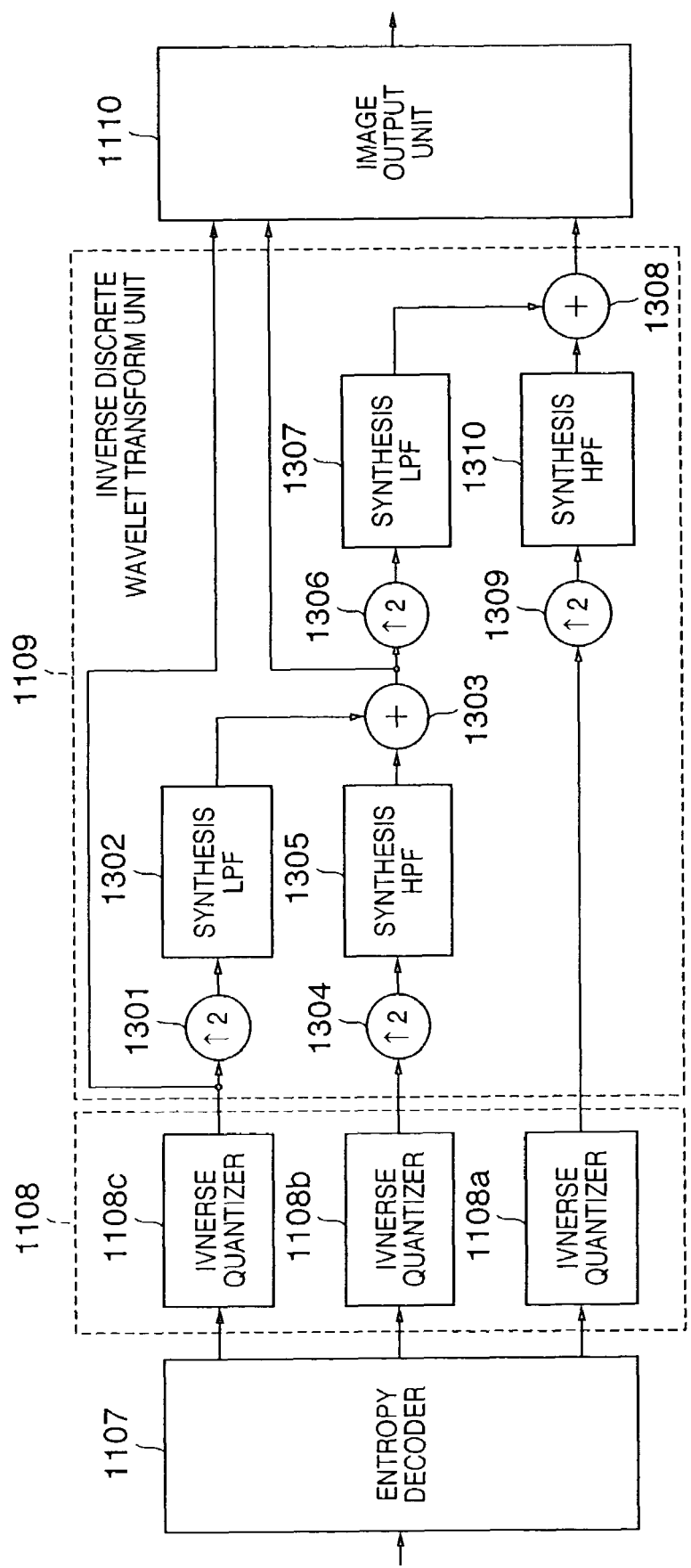
FIG. 37 is a block diagram for explaining details of a conventional decoding unit.

FIG. 5 shows an internal configuration of the inverse discrete wavelet transform unit 401. This configuration differs from that shown in FIG. 37 in that it is possible to stop decoding processing in the middle of the processing, to partially stop the processing, or prevent the processing from being started under the control of the controller 403. Further, the data of the lowest resolution corresponding to LL2 is not outputted to the sub-sampling filter 402. This is because LL2 contains alias, and it is necessary to decode image data up to a layer of hierarchy which is one layer more than the layer of LL2. However, a case of outputting a simple image, such as a thumbnail image, which does not require quality, is not included in this case.

In this manner, it is possible to obtain an image of good quality with no alias by decoding up to a layer of hierarchy which is one layer more than the necessary layer/layers.

Next, an example of decoding processing according to the first embodiment is explained. Here, a case of obtaining a layer of hierarchy up to which image data is to be decoded on the basis of an input/output image size ratio is explained with reference to FIG. 6.

Figure 6:
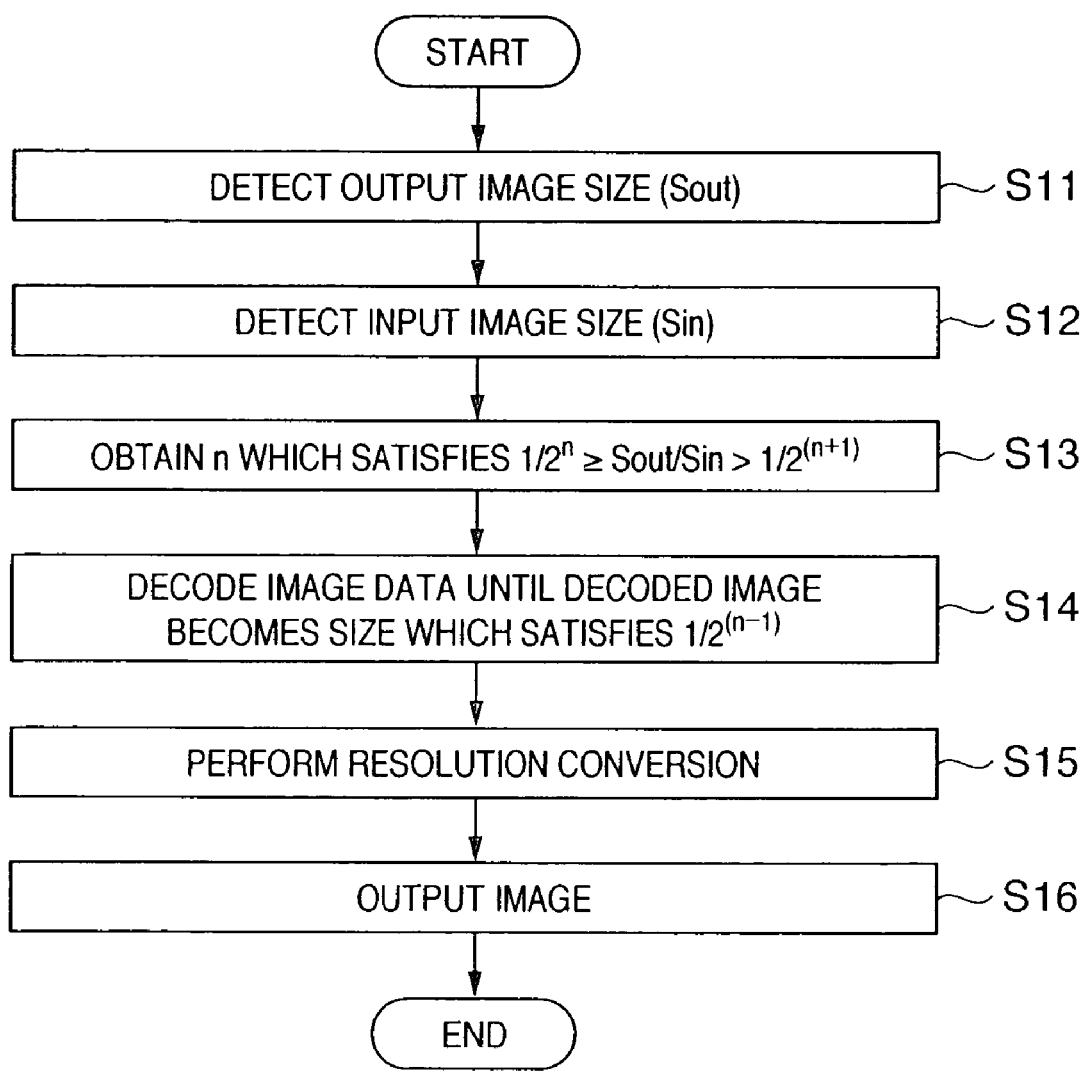
FIG. 6 is a flowchart for explaining an example of decoding processing according to the first embodiment of the present invention.

Referring to FIG. 6, an output image size (Sout) is detected in step S11, and an input image size (Sin) is detected in step S12.

Then in step S13, a layer (n) up to which image data is to be at least decoded is calculated using the equation (1) from the output image size (Sout) and the input image size (Sin) respectively obtained in steps S11 and S12. This process corresponds to the process in step S103 of FIG. 1.

$$1/2^n \geq Sout/Sin > 1/2^{(n+1)} \qquad (1)$$

In step S14, a layer of hierarchy up to which image data is to be actually decoded is determined on the basis of "n" obtained in step S13 using the equation (2) and the image data is decoded, or the image data is decoded to become an input/output ratio expressed by the equation (2). This process corresponds to the process in steps S104 and S105 in FIG. 1.

$$1/2^{(n-1)} \qquad (2)$$

where n is an integer equal to or greater than 1.

Since an image having a size which is larger than a necessary output image size is decoded in step S14, resolution conversion of accordingly reducing the resolution of the image is performed in step S15. At this time, pre-filtering process is performed to prevent generation of alias. In the next step, S16, γ correction, color correction, format conversion, offset processing, and so on, are performed on the image obtained in step S15 in accordance with a device to which the image is outputted. The processed image is then outputted.

With the foregoing processing, it is possible to output an image of good quality when image data is decoded up to an intermediate layer of hierarchy.

It should be noted that a case of decoding image data up to a layer of hierarchy which is one layer more than the necessary layer/layers is explained in the first embodiment. If a higher quality is demanded, decoding of image data up to two or more layers of hierarchy in addition to the necessary layer/layers can satisfy the demand. Thus, the quality of an image may be determined in view of an operation amount or hardware scale.

Second Embodiment

In a second embodiment, another method of obtaining a layer of hierarchy up to which image data is to be decoded on the basis of an input/output image size ratio is explained with reference to FIG. 7. The apparatus configuration and a concept of hierarchy coding are the same as those described in the first embodiment, and thus the description of them are omitted. Further, the processes in FIG. 7 which are same as those shown FIG. 6 are referred to by the same step numbers.

Figure 7:
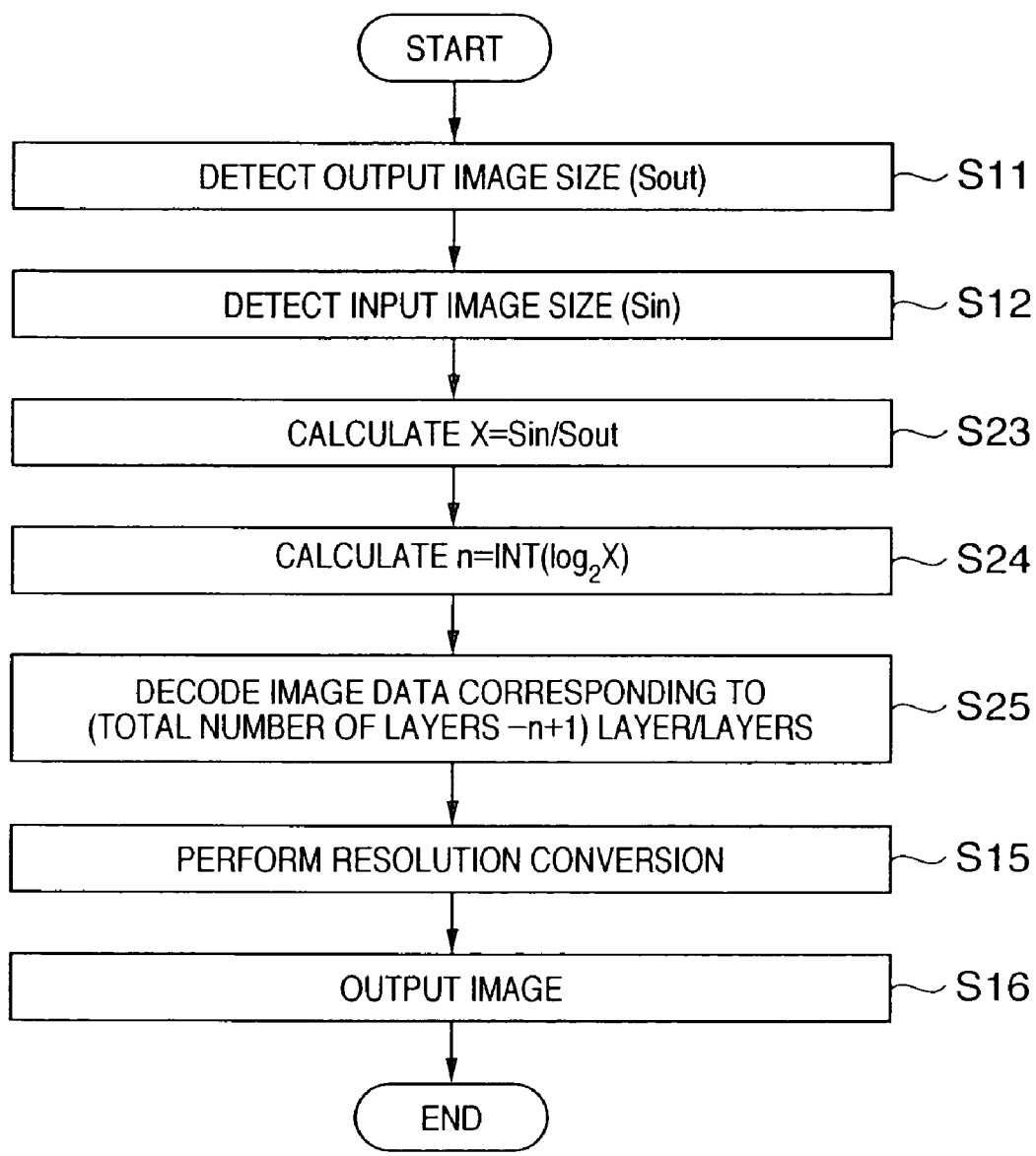
FIG. 7 is a flowchart for explaining an example of decoding processing according to a second embodiment of the present invention.

Referring to FIG. 7, an output image size (Sout) is detected in step S11, and an input image size (Sin) is detected in step S12.

Then in step S23, an input/output image size ratio (X) is calculated using the equation (3) from the output image size (Sout) and the input image size (Sin) respectively obtained in steps S11 and S12.

$$X = Sin/Sout \quad (3)$$

In step S24, the maximum number (n) of layer/layers of hierarchy which can be excluded from decoding processing is determined using the equation (4) on the basis of the input/output image size ratio (X) obtained in step S23.

$$n = INT(\log_2 x) \quad (4)$$

INT(f(X)) in the equation (4) represents an operation of rounding down below the decimal place of a value obtained by the calculation of f(X).

Since the number of layer/layers which can be excluded from the decoding processing is determined in step S24, the number of layer/layers, image data of which has to be decoded, is calculated based on the total number of layers of hierarchy of an input image, and further a layer up to which image data is actually decoded, that is one layer more than the necessary layer/layers, is calculated in step S25 using the equation (5), and an image is decoded so as to satisfy the condition.

$$\text{Number of Layer/Layers to Be Decoded} = \text{Total Number of Layers} - n + 1 \quad (5)$$

Since an image having a size which is larger than a necessary output image size is decoded in step S25, resolution conversion of accordingly reducing the resolution of the image is performed in step S15. At this time, pre-filtering process is performed to prevent generation of alias. In the next step, S16, γ correction, color correction, format conversion, offset processing, and so on, are performed on the image obtained in step S15 in accordance with a device to which the image is outputted, then the processed image is outputted.

With the foregoing processing, it is possible to output an image of good quality when image data is decoded up to an intermediate layer of hierarchy.

Third Embodiment

In a third embodiment, a method of hierarchically decoding image data layer by layer and obtaining an image of a desired size by checking the size of the decoded image is explained with reference to FIG. 8. The apparatus configuration and a concept of hierarchy coding are the same as those described in the first embodiment, and thus the description of them are omitted. Further, the processes in FIG. 8 which are same as those shown FIG. 6 are referred to by the same step numbers.

Figure 8:
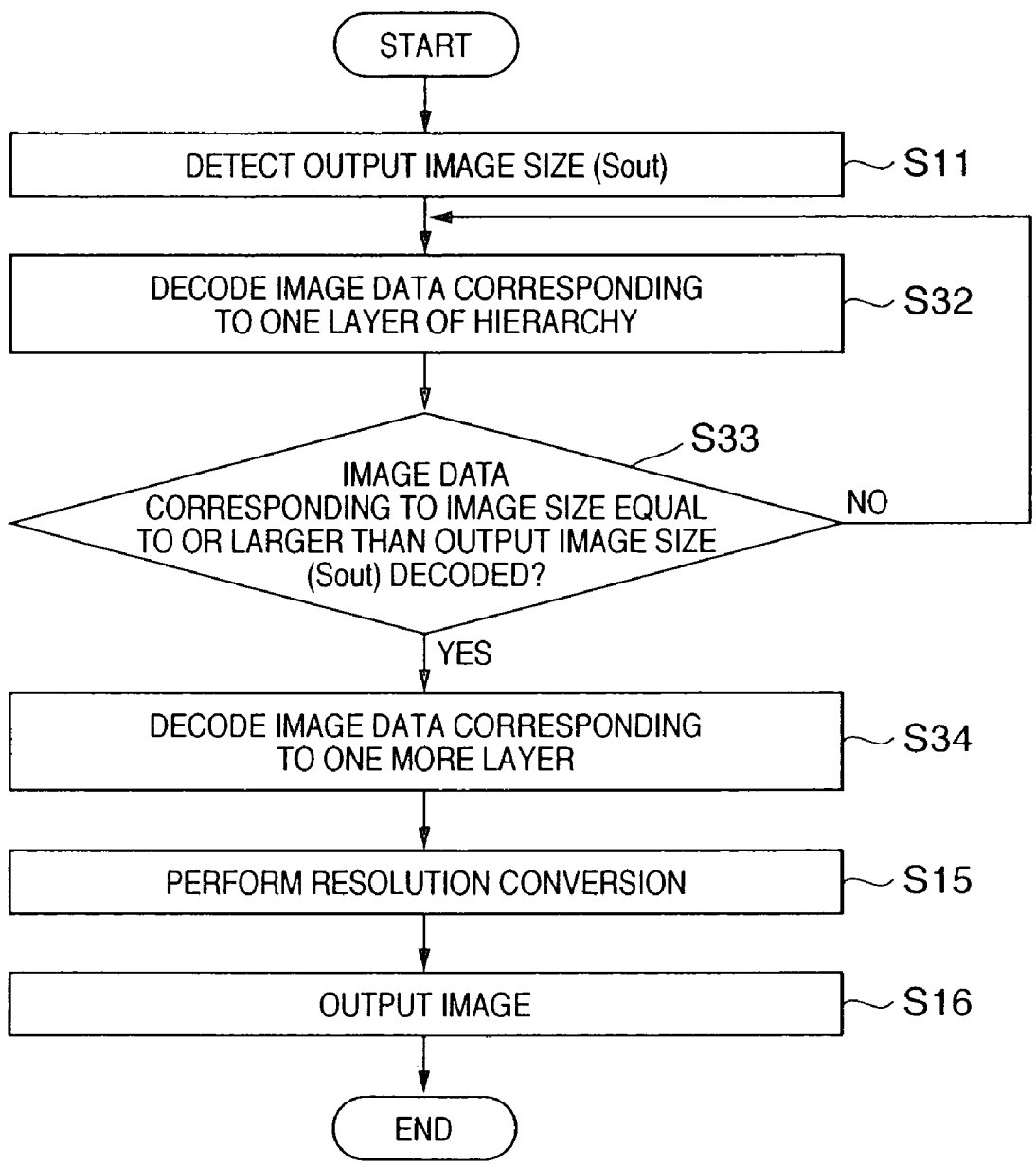
FIG. 8 is a flowchart for explaining an example of decoding processing according to a third embodiment of the present invention.

Referring to FIG. 8, an output image size (Sout) is detected in step S11, and the process proceeds to step S32 where image data corresponding to the lowest layer of hierarchy out of layer/layers which has/have not been decoded is decoded.

In step S33, it is determined whether the size of the image decoded in step S32 is equal to or larger than the output image size (Sout). If Yes, the process moves to step S34, whereas if No, the process returns to step S32 and image data of another lowest layer is decoded. By the operation of steps S32 and S33, image data corresponding to an image having a size equal to or larger than the output image size is decoded.

In addition to the image which is decoded to the size equal to or larger than the output image size in steps S32 and S33, image data of one more layer is decoded in step S34. It should be noted that if the size of the image has reached to the input image size at this point, the process of step S34 is not performed.

Since an image having a size which is larger than a necessary output image size is decoded in step S34, resolution conversion of accordingly reducing the resolution of the image is performed in step S15. At this time, pre-filtering process is performed to prevent generation of alias. In the next step, S16, γ correction, color correction, format conversion, offset processing, and so on, are performed on the image obtained in step S15 in accordance with a device to which the image is outputted, then the processed image is outputted.

With the foregoing processing, it is possible to output an image of good quality when image data is decoded to an intermediate layer of hierarchy.

Fourth Embodiment

In a fourth embodiment, a method of obtaining from a look up table (LUP) a layer of hierarchy up to which image data is to be decoded to obtain an image with no alias is explained.

Figure 9:
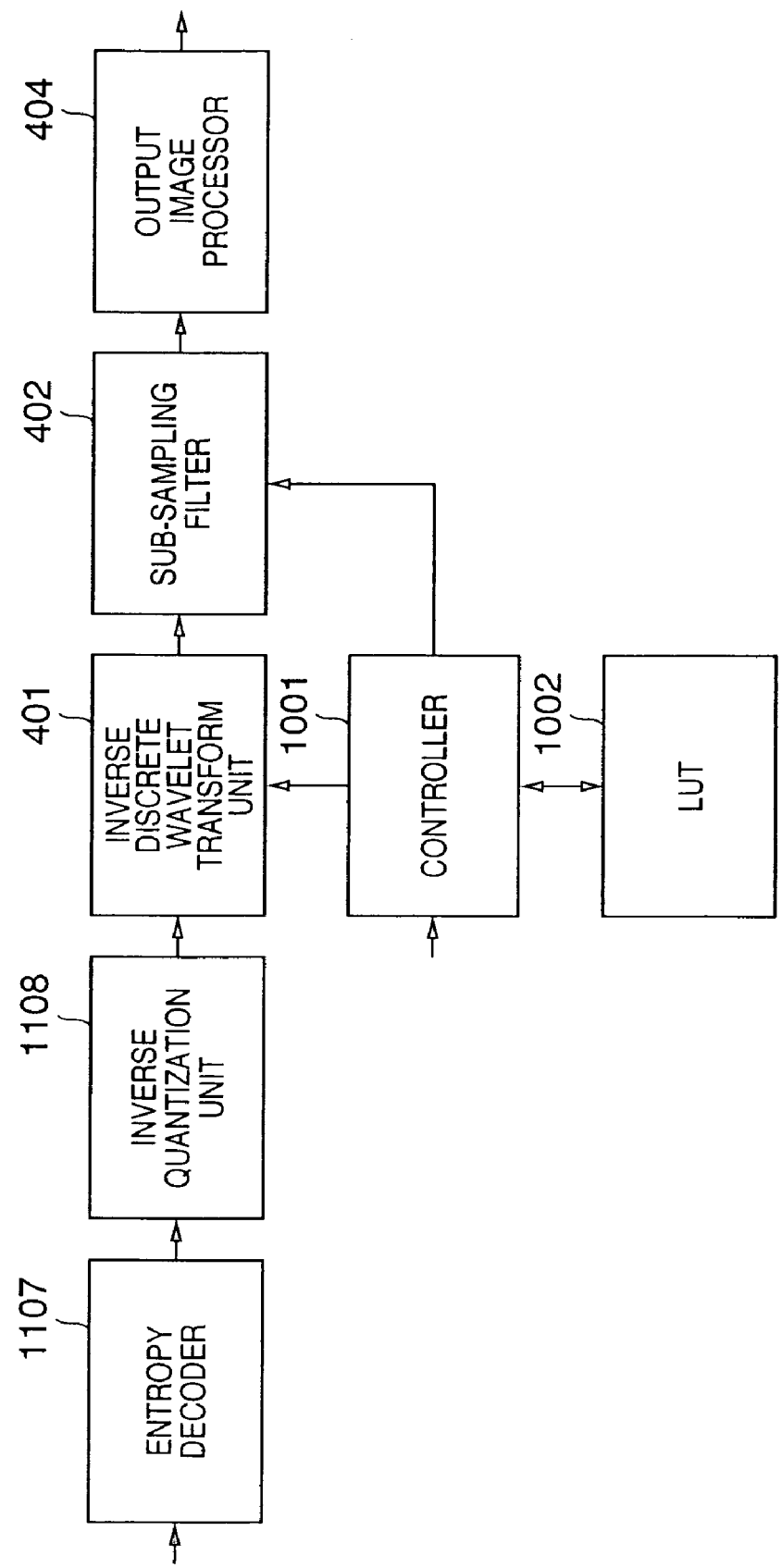
FIG. 9 is a block diagram showing a functional configuration of a decoding apparatus according to a fourth embodiment of the present invention.

FIG. 9 is a block diagram illustrating a functional configuration of a decoding apparatus according to the fourth embodiment of the present invention. The configuration in FIG. 9 differs from that of FIG. 1 described in the first embodiment in which a LUP 1002 is added and can be referred by a controller 1001. Other elements are same as those in the first embodiment, and the explanation of them are omitted.

The controller 1001 is basically the same as the controller 403 described in the first embodiment with reference to FIG. 4, but the controller 1001 is different from the controller 403 in that it stops decoding processing or partially stopping an operation by referring to the LUT 1002. The LUT 1002 transmits information on a layer/layers of hierarchy to be decoded based on, inter alia, the input/output image size information to the controller 1001.

The type and/or structure of the LUT 1002 is not fixed as long as the function and purpose are same. In a case of using a volatile memory, such as SRAM for instance, the content of LUT 1002 is loaded at the start of the decoding processing.

Further, the contents of the LUT 1002 may be adaptively changed by determining the characteristics of a wavelet filter or the degree of effect of alias.

The controller 1001 determines a layer of hierarchy up to which image data is to be decoded for obtaining an image with no alias from the input image size and the output image size by referring to the LUT 1002, and controls the inverse discrete wavelet transform unit 401 and the sub-sampling filter 402.

Next, processing in the fourth embodiment is explained with reference to FIG. 10. The processes in FIG. 10 which are same as those shown FIG. 6 are referred to by the same step numbers.

Figure 10:
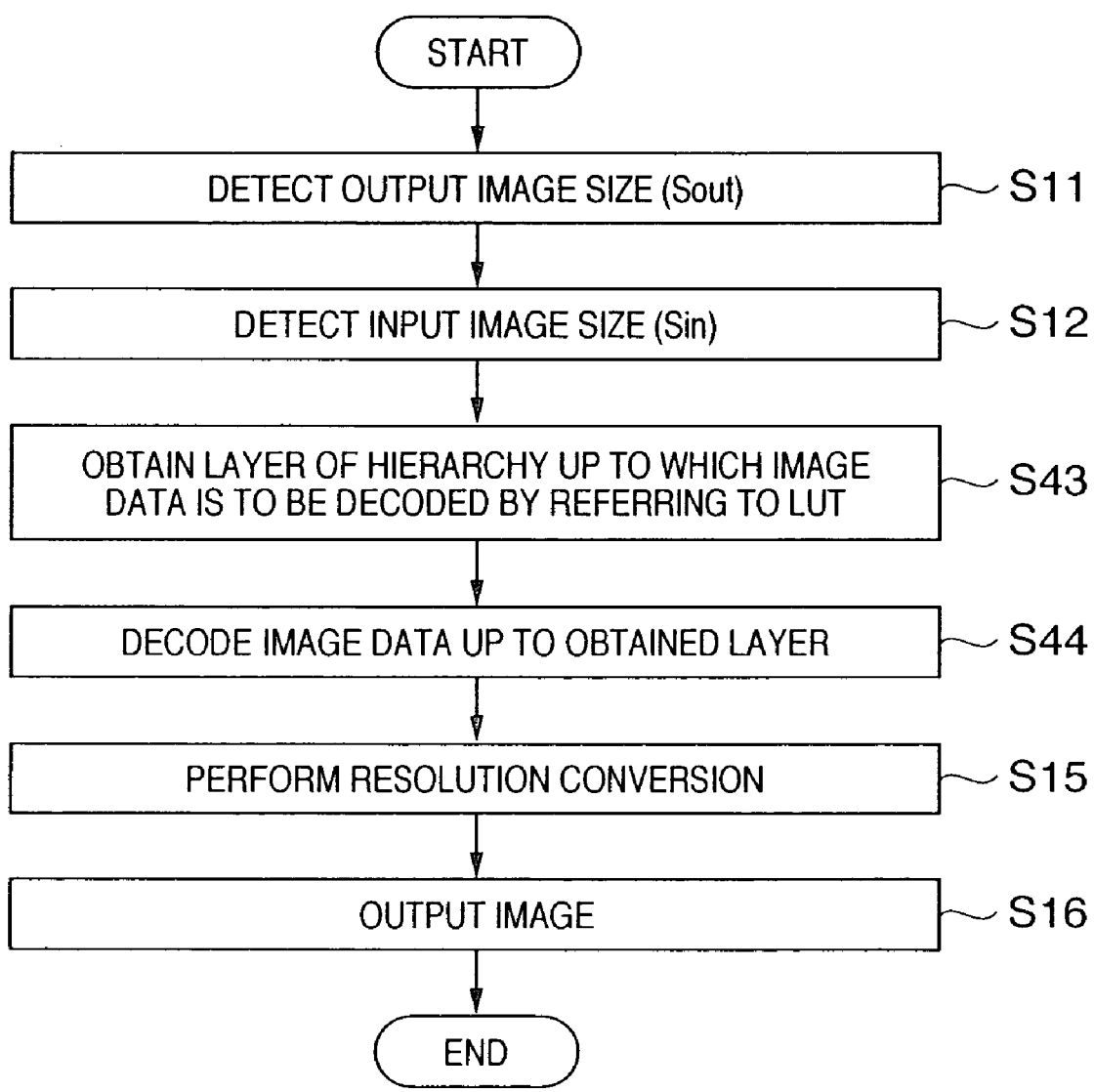
FIG. 10 is a flowchart for explaining an example of decoding processing according to the fourth embodiment of the present invention.

Referring to FIG. 10, an output image size (Sout) is detected in step S11, and an input image size (Sin) is detected in step S12.

In step S43, a layer of hierarchy up to which image data is to be decoded is determined by referring to the LUT 1002 based on the information obtained in steps S11 and S12. The LUT 1002 is preset so as to give a layer of hierarchy which is one layer more than the minimum layer of hierarchy necessary for obtaining an image of the designated output image size (e.g., so as to give an output as shown in FIG. 3).

In step S44, image data is decoded up to the layer obtained in step S43.

Since an image having a size which is larger than a necessary output image size is decoded in step S44, then accordingly, resolution conversion of reducing the resolution of the image is performed in step S15. At this time, pre-filtering process is performed to prevent generation of alias. In the next step, S16, γ correction, color correction, format conversion, offset processing, and so on, are performed on the image obtained in step S15 in accordance with a device to which the image is outputted. The processed image is then outputted.

With the foregoing processing, it is possible to output an image of good quality when image data is decoded to an intermediate layer of hierarchy.

In the fourth embodiment, effects of alias are determined and information on a layer/layers of hierarchy to be decoded is obtained from LUT. However, it is possible to realize the same effect of the fourth embodiment by obtaining a layer/layers of hierarchy which is/are not to be decoded. Further, a numeral operation equivalent to LUT may be performed instead.

Fifth Embodiment

A fifth embodiment is aimed at performing encoding which gives no bad effect on image quality by alias when an image is encoded up to an intermediate layer of hierarchy.

Figure 11:
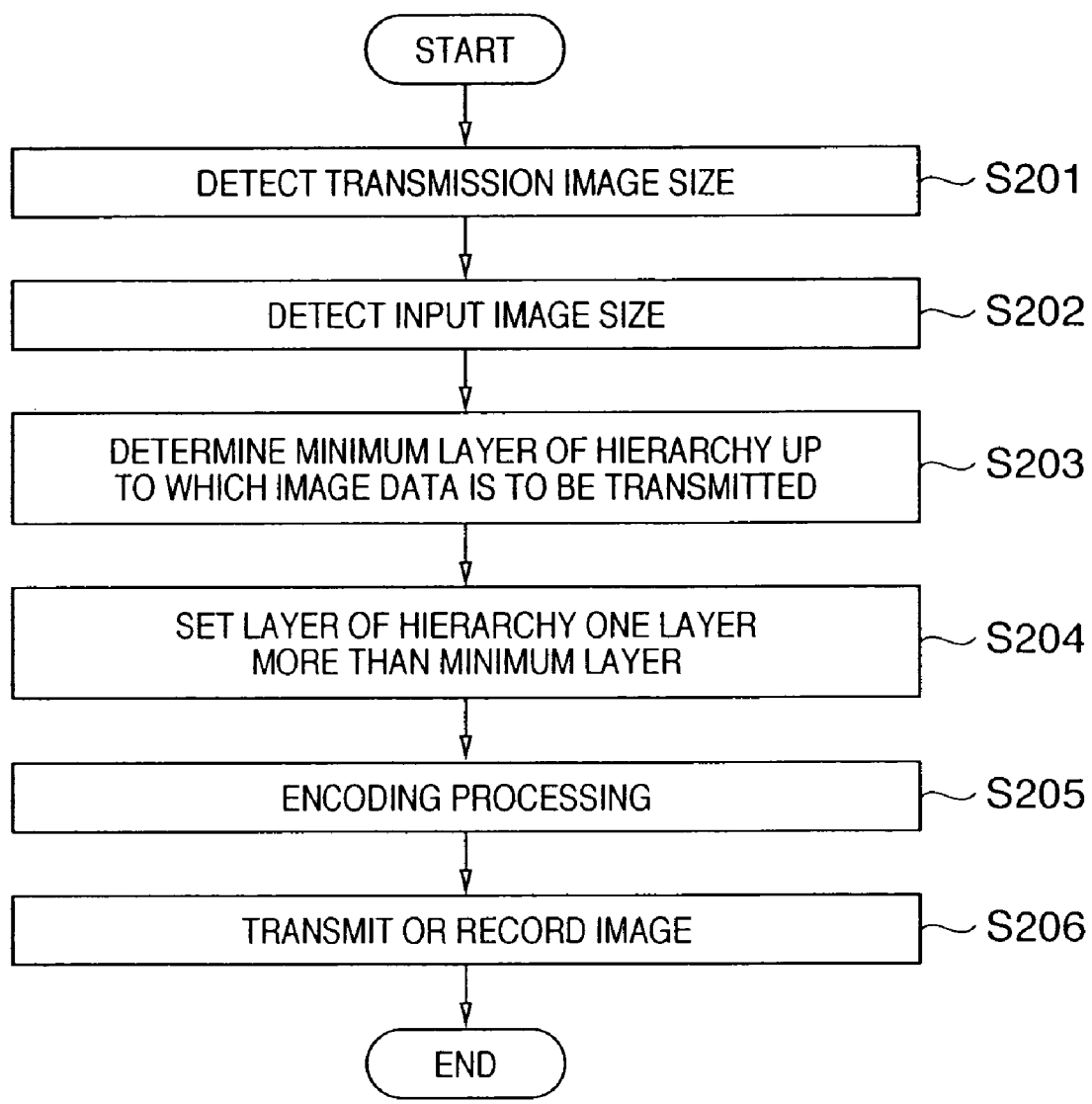
FIG. 11 is a flowchart showing a concept of image reproduction processing according to a fifth embodiment of the present invention.

Here, the fifth embodiment is briefly explained with reference to FIG. 11.

In step S201, a transmission image size is detected. The size can be adaptively changed in accordance with a destination of an image, a media on which the image is to be recorded, or an operation mode. Then, the process proceeds to step S202 where an input image size is detected.

The process moves onto step S203 where a layer of hierarchy up to which necessary image data is to be transmitted is determined from the transmission image size and the input image size respectively determined in steps S201 and S202, and the process proceeds to step S204. In step S204, a layer of hierarchy which is one layer more than the layer determined in step S203 (so that a larger image is coded) is set. In step S205, encoding is performed up to the layer which is set in step S204, and the process proceeds to step S206. In step S206, encoded image data is transmitted or recorded on a medium.

Next, the aforesaid processing example is explained in more detail with reference to FIG. 2.

FIG. 2 is a drawing exemplifying a hierarchy of a hierarchically coded image. Here, a case of encoding and outputting a 160 (pixels)×120 (pixels) image (horizontal×vertical) from image data of a 640 (pixels)×480 (pixels) image is explained. Since the size of an image to be encoded and outputted corresponds to LL2 in FIG. 2, a layer of LL2 is obtained first. However, an encoded image of only LL2 is a distorted image including alias, thus a layer of hierarchy which is one layer more than the layer of LL2 is set in order to cancel alias of LL2. In this case, image data of 320×240 pixels corresponding to LL2, HL2, LH2, and HH2 is encoded. In this way, alias of LL2 is cancelled when decoding the image data by a decoder. Thereafter, the decoder performs resolution conversion, such as sampling a 160 (pixel)×120 (pixel) image out of the 320 (pixel)×240 (pixel) image using a sub-sampling filter, thereby an image of good quality can be obtained.

The relationship between the input/output ratios of an image and the layers of hierarchy up to which image data is to be encoded is the same as that shown in FIG. 3. When a transmission image size is denoted by Sout and an input image size is denoted by Sin, Sout/Sin is shown in the upper scale. A concept of a layer up to which image data is to be encoded in this invention is shown in the lower scale. For instance, when transmitting an image whose input/output ratio is greater than $1/8$ $(=1/2^3)$ and not greater than $1/4$ $(=1/2^2)$, image data is encoded up to a layer which makes the transmission image size 1/2 of an input image size.

Figure 12:
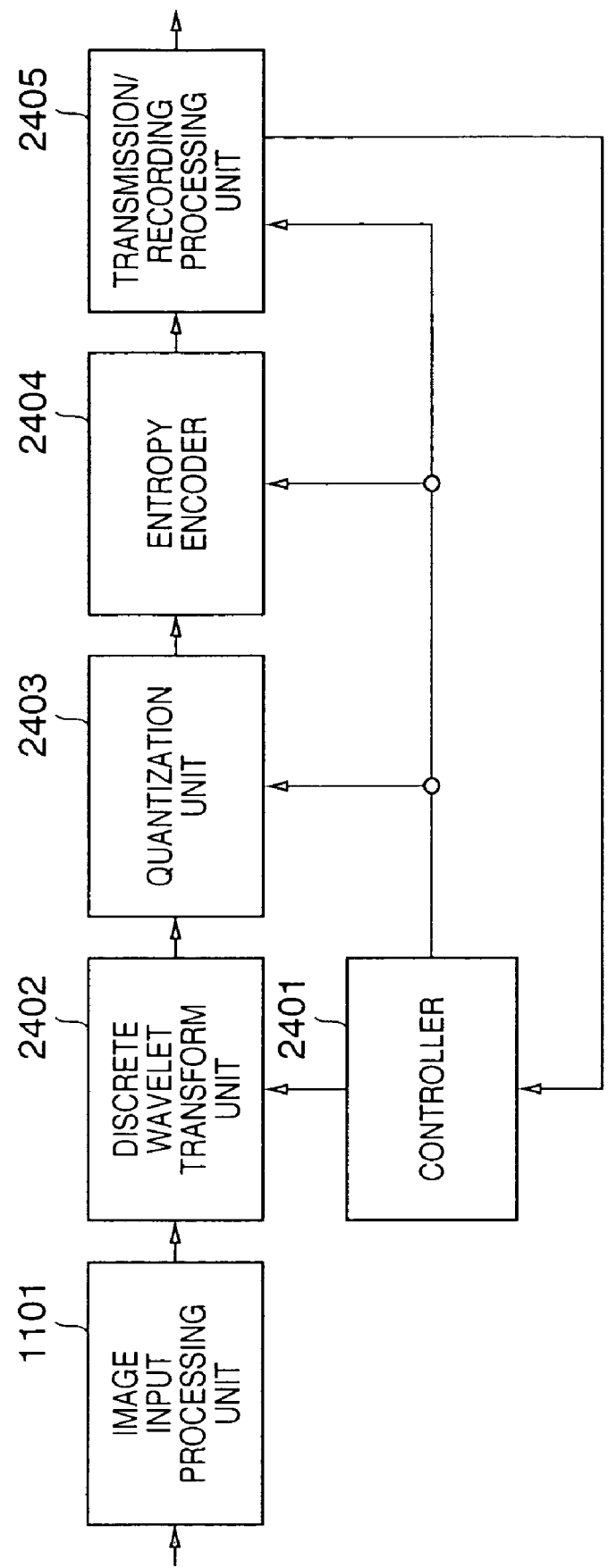
FIG. 12 is a block diagram showing a functional configuration of an encoding apparatus according to the fifth embodiment of the present invention.

FIG. 12 is a block diagram showing a functional configuration of an encoding apparatus according to the fifth embodiment. In FIG. 12, reference numeral 1101 denotes an image input processing unit; 2402, a discrete wavelet transform unit; 2403, a quantization unit; 2404, an entropy encoder; 2405, a transmission/recording processing unit; and 2401, a controller.

The controller 2401 determines a layer of hierarchy up to which image data is to be encoded based on the input image size and the transmission image size, and controls the discrete wavelet transform unit 2402, the quantization unit 2403, the entropy encoder 2404, and the transmission/recording processing unit 2405. In FIG. 12, the controller 2401 obtains information from the transmission/recording processing unit 2405, but the present invention is not limited to this and, for instance, the information can be obtained from mode information of the system. Since encoding of image data more than the necessary layer/layers is not needed, the controller 2401 controls the discrete wavelet transform unit 2402 and the entropy encoder 2404 to stop their processing in the middle of the encoding processing or to stop operation of unnecessary processing unit/units. In this manner, it is possible to improve processing time, processing performance, and energy consumption.

The quantization unit 2403 can be controlled so as to omit quantization processing of an unnecessary layer/layers or output 0s for the unnecessary layer/layers to intercept image data of unnecessary layer/layers. The transmission/recording processing unit 2405 formats the data of layer/layers to be transmitted, and output it. The data of unnecessary layer/layers is deleted by, inter alia, a cut-down process. A plurality of deleting methods of unnecessary data are described above, and at least one of them is to be performed.

Figure 13:
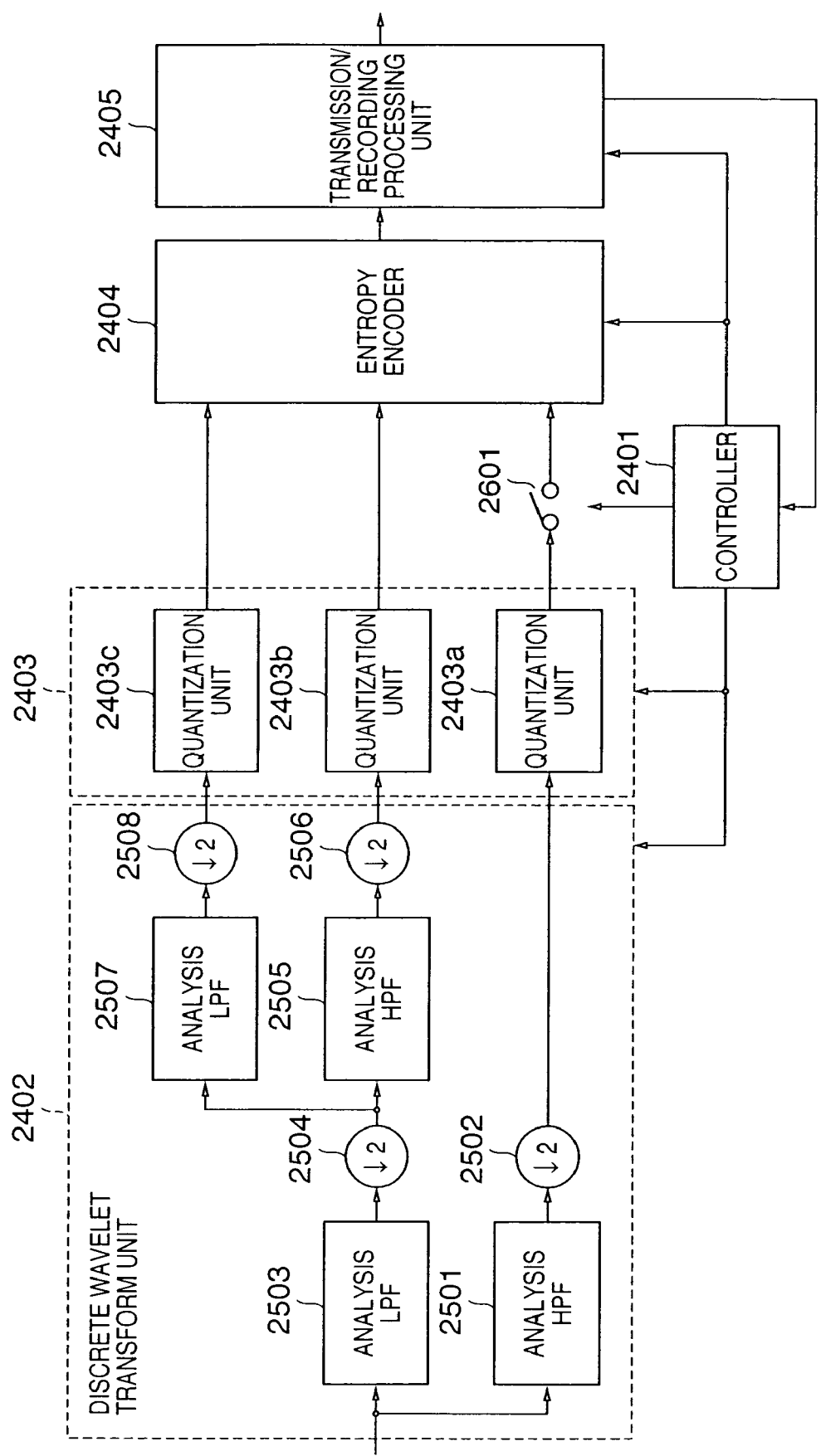
FIG. 13 is a block diagram showing an internal configuration of a discrete wavelet transform unit according to the fifth embodiment of the present invention.
Figure 38:
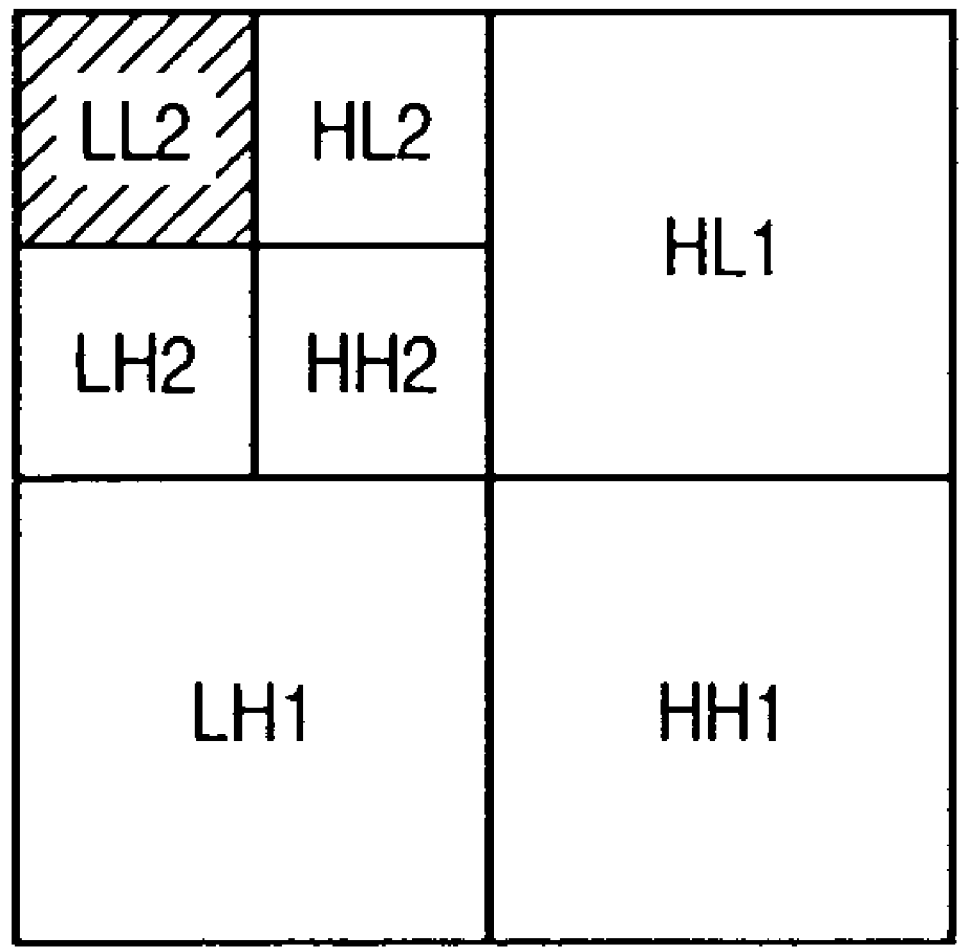
FIG. 38 is a drawing showing a conception of hierarchy of an image in hierarchical coding.
Figure 39:
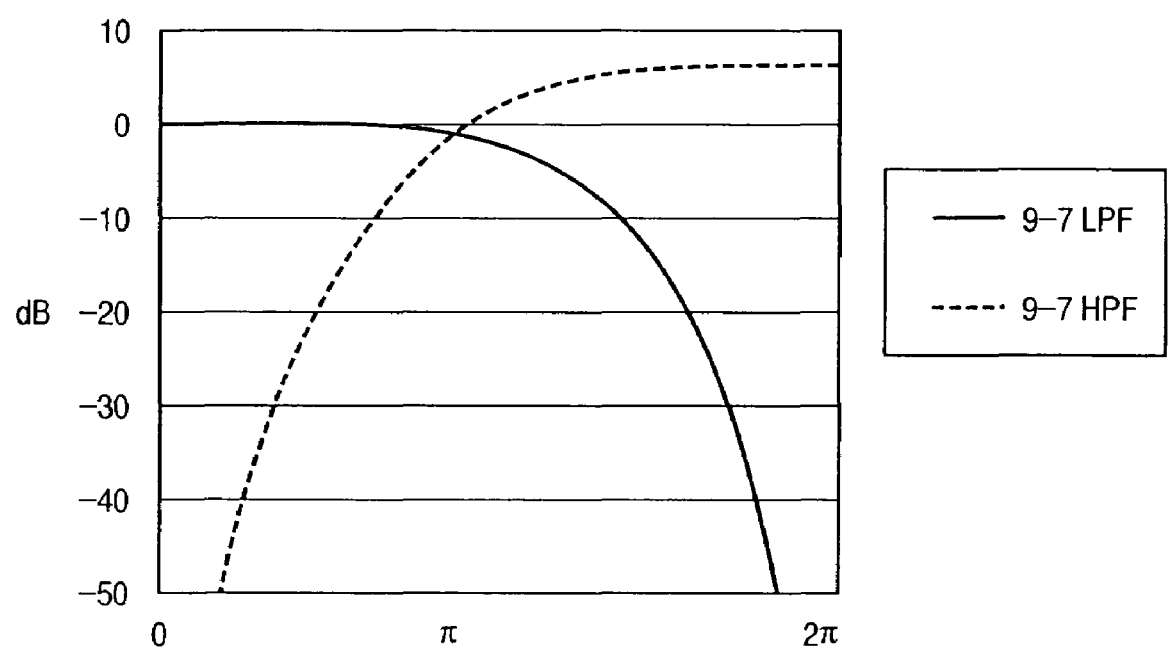
FIG. 39 shows characteristics of a conventional 9×7 filter.

FIG. 13 shows an internal configuration of the discrete wavelet transform unit 2402. Image data is inputted to a low pass filter 2503 for analysis (referred to as "analysis LPF", hereinafter) for band division and to a high pass filter 2501 for analysis (referred to as "analysis HPF", hereinafter) for band division, and separated into a low frequency band signal and a high frequency band signal. Since the band width of each signal is a half of the band width of the original image data, the down samplers 2502 and 2504 samples the signals. Then the high frequency component signal is outputted to the quantization unit 2403. The low frequency component signal is further recursively processed by an analysis HPF 2505, an analysis LPF 2507, and down samplers 2506 and 2508. Here, a case of three-hierarchy output by two cycles of processing is shown. The concept of three-layer hierarchy is shown in FIG. 38. By the two dimensional (vertical and horizontal) processing, data corresponding to HL1, LH1, HH1 shown in FIG. 38 is obtained by the analysis HPF 2501 and the down sampler 2502, and data corresponding to LL1 is obtained by the analysis LPF 2503 and the down sampler 2504. However, the LL1 is recursively processed, and data corresponding to HL2, LH2, HH2 in FIG. 38 is obtained by the analysis HPF 2505 and the down sampler 2506, and data corresponding to LL2 in FIG. 38 is obtained by the analysis LPF 2507 and the down sampler 2508.

When the data of the all layers of hierarchy is not needed, the transmission/recording processing unit 2405 outputs that information to the controller 2401. The controller 2401 controls so that data of an unnecessary layer/layers of hierarchy is not encoded among each frequency band data.

Figure 36:
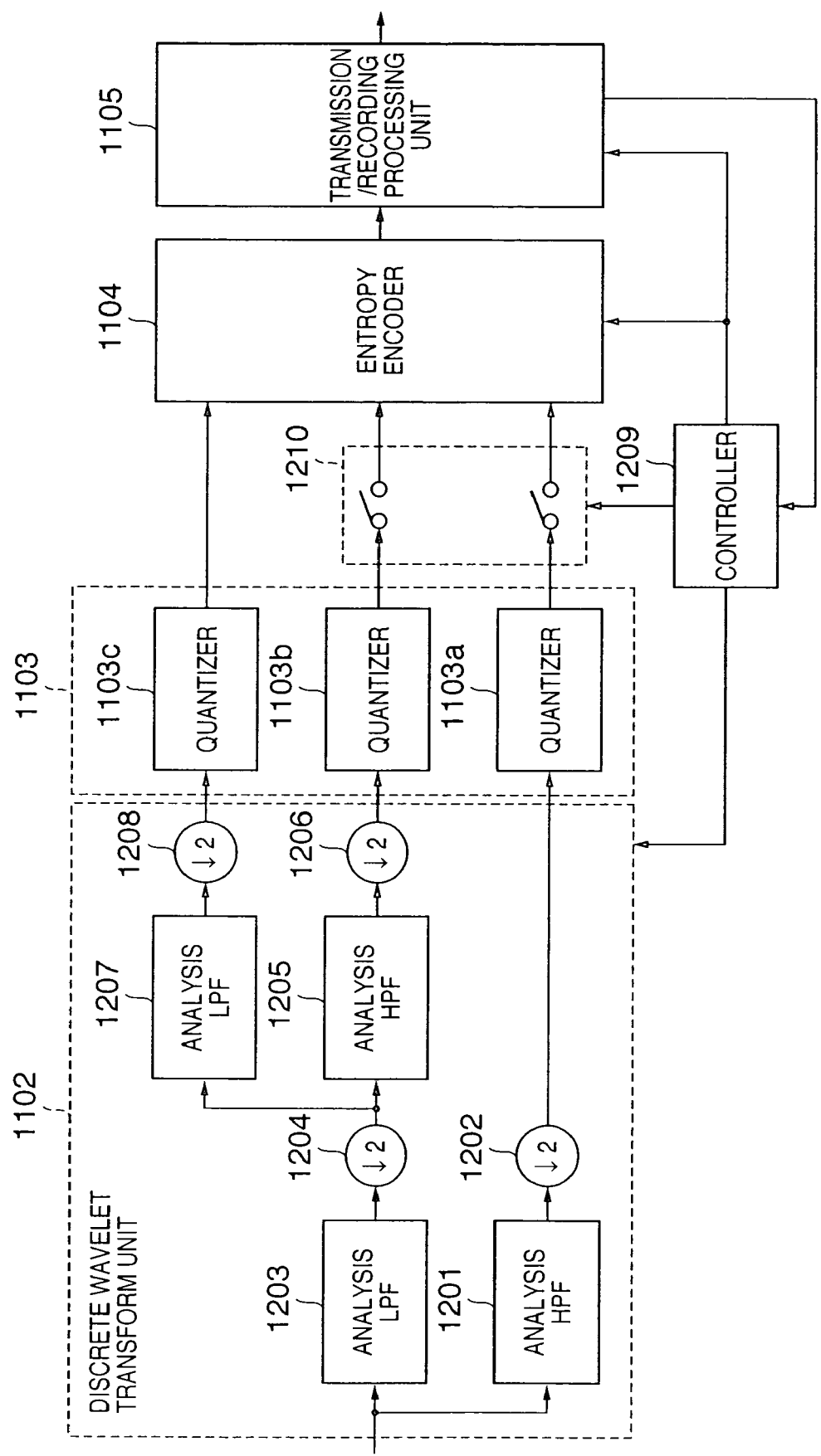
FIG. 36 is a block diagram for explaining details of another conventional encoding unit.

A determination algorithm is the difference between the fifth embodiment and the conventional configuration shown in FIG. 36, and the algorithm is for determining to, inter alia, stop encoding processing in the middle of the encoding processing, partially stop the processing, or prevent the encoding processing from being started. Since data in the fifth embodiment is obtained by encoding data of at least one more layer of hierarchy comparing to the conventional case, encoding of image data of only the lowest layer of hierarchy is not included in the fifth embodiment, and at least image data of the lowest and the second lowest layers has to be encoded. Therefore, a switch 2601 in FIG. 13 controls image data of a layer of hierarchy except those layers. However, a case of outputting a simple image, such as a thumbnail image, which does not require quality is not included in this case.

Data of respective frequency bands is quantized by the quantization units 2403a to 2403c corresponding to the respective bands, encoded by the entropy encoder 2404 for each frequency band, then outputted from the transmission/recording processing unit.

In this manner, it is possible to transfer and obtain an image of good quality with no alias by encoding up to a layer of hierarchy which is one layer more than the necessary layer/layers.

Next, an example of encoding processing according to the fifth embodiment is explained. Here, a case of obtaining a layer of hierarchy up to which image data is to be encoded on the basis of an input/output image size ratio is explained with reference to FIG. 14.

Figure 14:
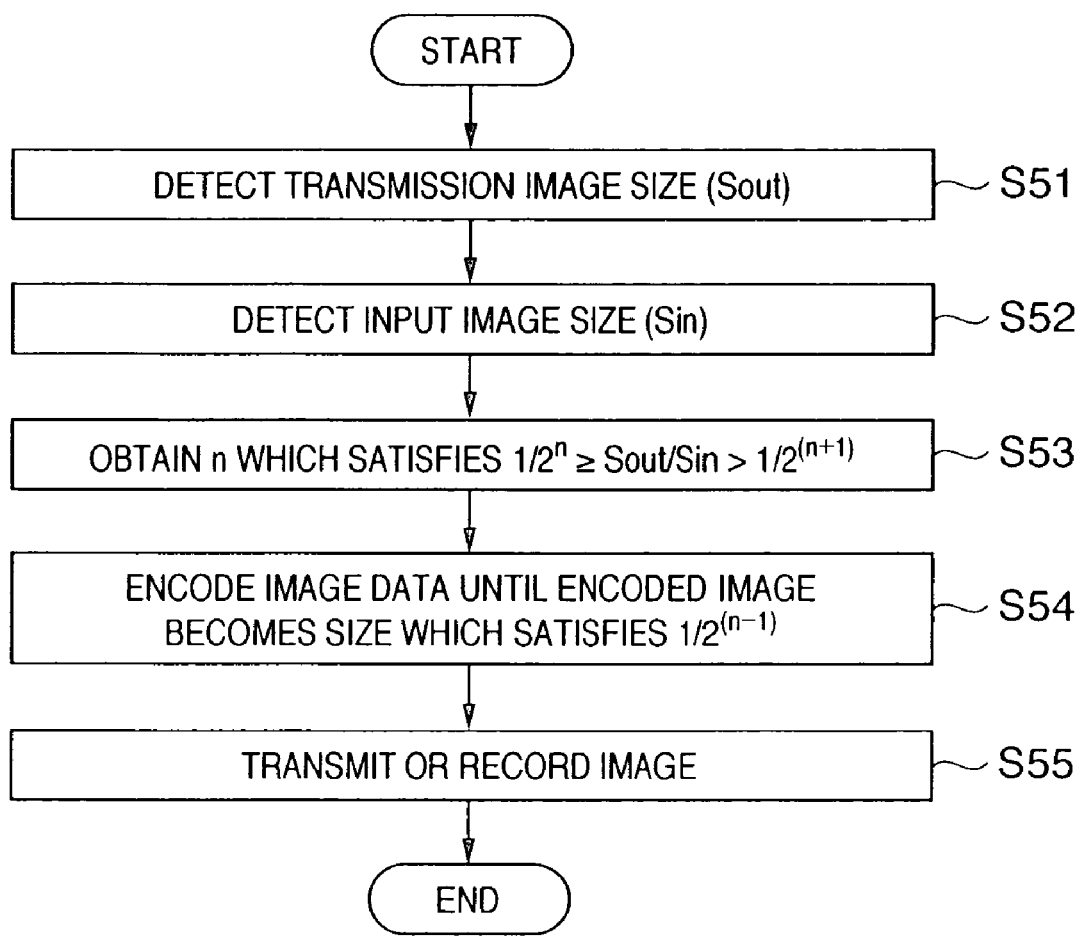
FIG. 14 is a flowchart for explaining an example of encoding processing according to the fifth embodiment of the present invention.

Referring to FIG. 14, a transmission image size (Sout) is detected in step S51, and an input image size (Sin) is detected in step S52.

Then in step S53, a layer (n) up to which image data is to be at least encoded is calculated using the equation (6) from the transmission image size (Sout) and the input image size (Sin) respectively obtained in steps S51 and S52. This process corresponds to the process in step S203 of FIG. 11.

$$1/2^n \geq Sout/Sin > 1/2^{(n+1)} \qquad (6)$$

In step S54, a layer of hierarchy up to which image data is to be actually encoded is determined on the basis of "n" obtained in step S53 using the equation (7) and the image data is encoded. This process corresponds to the process in steps S204 and S205 in FIG. 11.

$$1/2^{(n-1)} \qquad (7)$$

where n is an integer equal to or greater than 1

In step S55, encoded image data obtained in step S54 is transmitted or recorded on a medium.

With the foregoing processing, it is possible to output an image of good quality when image data is encoded up to an intermediate layer of hierarchy.

It should be noted that a case of encoding image data up to a layer of hierarchy which is one layer more than the necessary layer/layers is explained in the fifth embodiment. If a higher quality is demanded, encoding of image data up to two or more layers of hierarchy in addition to the necessary layer/layers can satisfy the demand. Thus, the quality of an image may be determined in view of an operation amount or hardware scale.

Sixth Embodiment

In a sixth embodiment, another method of obtaining a layer of hierarchy up to which image data is to be encoded on the basis of an input/output image size ratio is explained with reference to FIG. 15. The apparatus configuration and a concept of hierarchy coding are the same as those described in the fifth embodiment, and thus the description of them are omitted. Further, the processes in FIG. 15 which are same as those shown FIG. 14 are referred to by the same step numbers.

Figure 15:
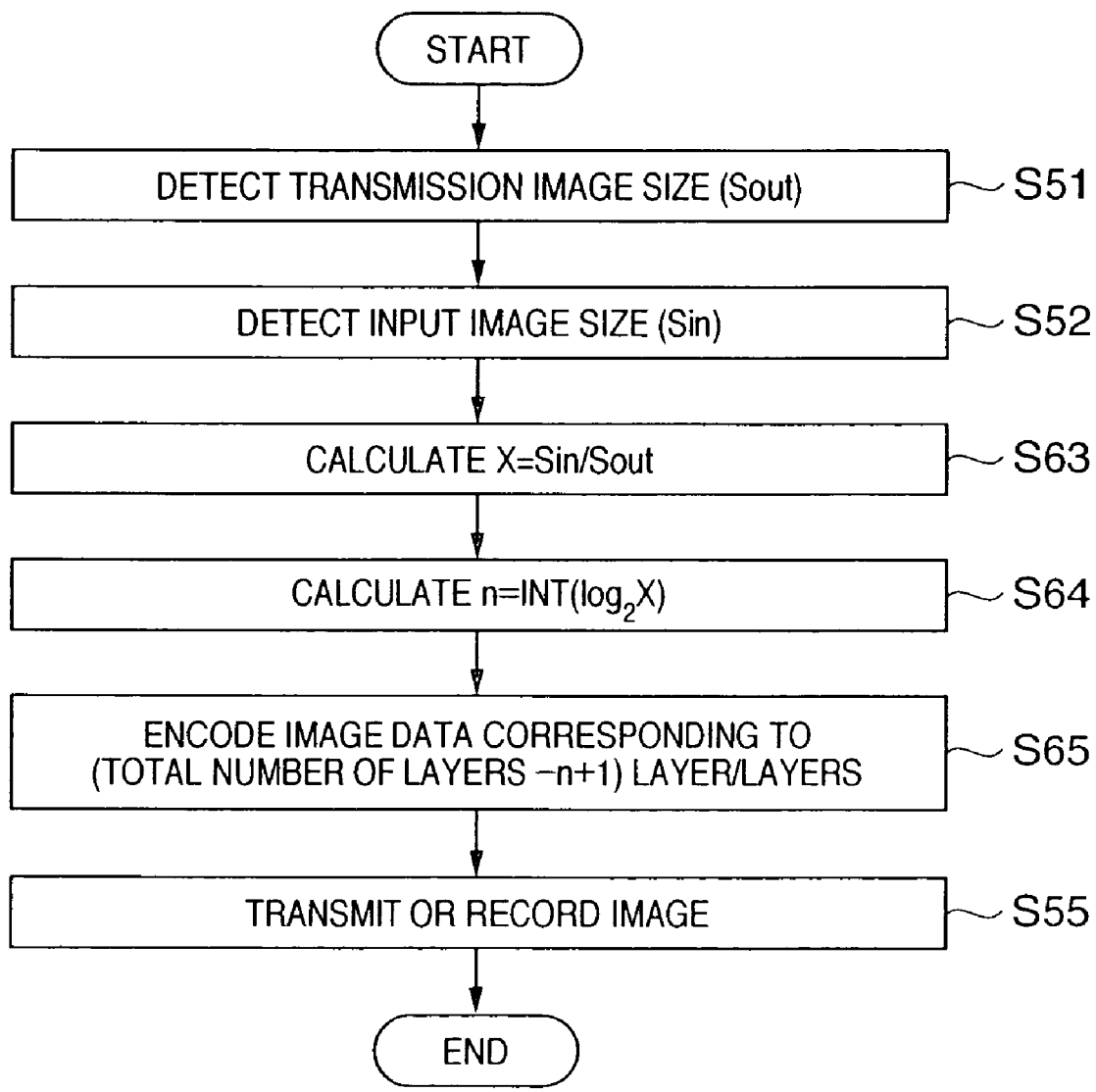
FIG. 15 is a flowchart for explaining an example of encoding processing according to a sixth embodiment of the present invention.

Referring to FIG. 15, a transmission image size (Sout) is detected in step S51, and an input image size (Sin) is detected in step S52.

Then in step S63, an input/output image size ratio (X) is calculated using the equation (8) from the transmission image size (Sout) and the input image size (Sin) respectively obtained in steps S51 and S52.

$$X = Sin/Sout \qquad (8)$$

In step S64, the maximum number of layer/layers of hierarchy which can be excluded from encoding processing is determined using the equation (9) on the basis of the input/output image size ratio (X) obtained in step S63.

$$n = INT(\log_2 X) \qquad (9)$$

INT(f(X)) in the equation (9) represents an operation of rounding down below the decimal place of a value obtained by the calculation of f(X).

Since the number of layer/layers which can be excluded from the encoding processing is determined in step S64, the number of layer/layers, image data of which has to be encoded, is calculated based on the total number of layers of hierarchy of an input image, and further a layer up to which image data is actually encoded, that is one layer more than the necessary layer/layers, is calculated in step S65 using the equation (10), and image data is encoded so as to satisfy the condition.

Number of Layer/Layers to Be Encoded=Total Number of Layers−n+1 (10)

In step S55, encoded image data obtained in step S65 is transmitted or recorded on a medium.

With the foregoing processing, it is possible to output an image of good quality when image data is encoded up to an intermediate layer of hierarchy.

Seventh Embodiment

In a seventh embodiment, a method of hierarchically encoding image data layer by layer and obtaining an image of a desired size by checking the size of the encoded image is explained with reference to FIG. 16. The apparatus configuration and a concept of the hierarchy coding are the same as those described in the fifth embodiment, and thus the description of them are omitted. Further, the processes in FIG. 16 which are same as those shown FIG. 14 are referred to by the same step numbers.

Referring to FIG. 16, a transmission image size (Sout) is detected in step S51, and the process proceeds to step S72 where image data corresponding to the lowest layer of hierarchy out of layer/layers which has/have not been encoded is encoded.

In step S73, it is determined whether the size of the image encoded in step S72 is equal to or larger than the transmission image size (Sout). If Yes, the process moves to step S74, whereas if No, the process returns to step S72 and image data of another lowest layer is encoded. By the operation of steps S72 and S73, image data corresponding to an image having a size equal to or larger than the transmission image size is encoded.

In addition to the image which is encoded to the size equal to or larger than the output image size in steps S72 and S73, image data of one more layer is encoded in step S74. It should be noted that if the size of the image has reached to the input image size at this point, the process of step S74 is not performed.

In step S55, encoded image data obtained in step S54 is transmitted or recorded on a medium.

With the foregoing processing, it is possible to output an image of good quality when image data is encoded up to an intermediate layer of hierarchy.

Eighth Embodiment

In an eighth embodiment, a method of obtaining from a look up table (LUP) a layer of hierarchy up to which image data is to be encoded to obtain an image with no alias is explained.

Figure 17:
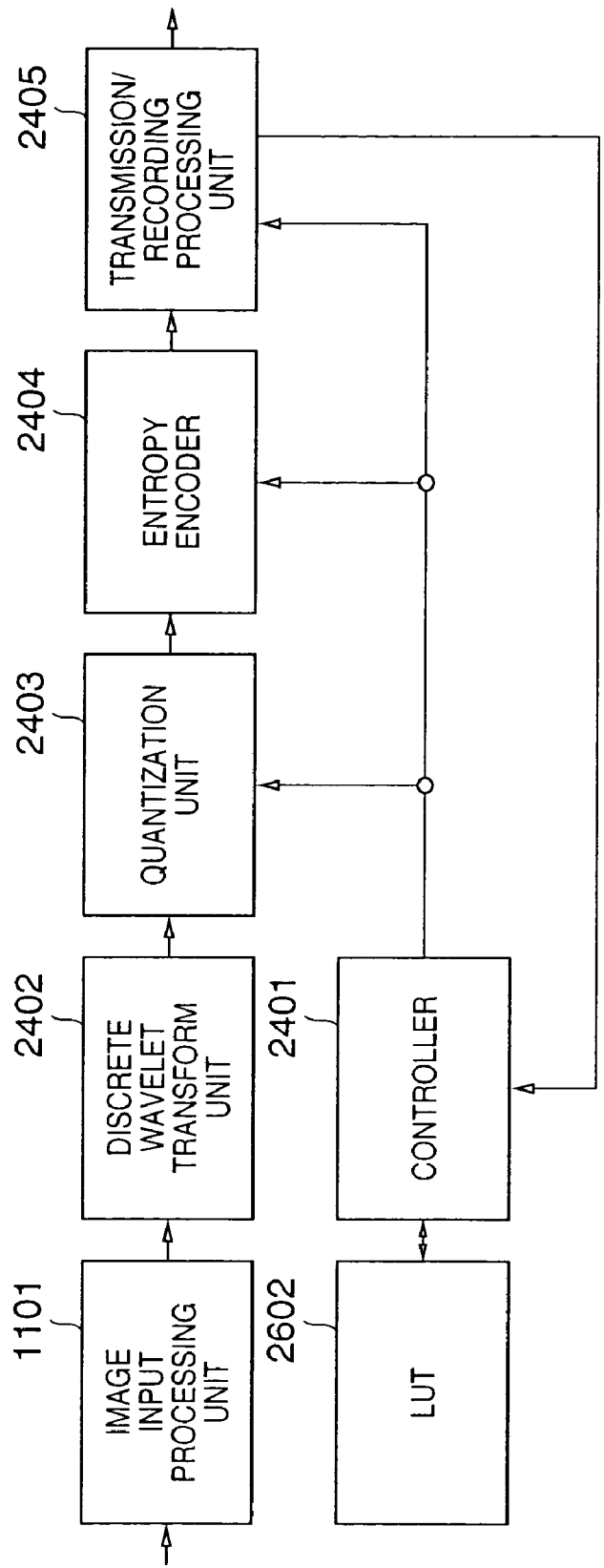
FIG. 17 is a block diagram showing an internal configuration of a discrete wavelet transform unit according to an eighth embodiment of the present invention.

FIG. 17 is a block diagram illustrating a functional configuration of an encoding apparatus according to the eighth embodiment of the present invention. The configuration in FIG. 17 differs from that of FIG. 12 described in the fifth embodiment in which a LUP 2602 is added and can be referred by a controller 2401. Other elements are same as those in the fifth embodiment, and the explanation of them are omitted.

The type and/or structure of the LUT 2602 is not fixed as long as the function and purpose are same. In a case of using a volatile memory, such as SRAM, for instance, the content of LUT 2602 is loaded at the start of the encoding processing.

Further, the contents of the LUT 2602 may be adaptively changed by determining the characteristics of a wavelet filter or the degree of effect of alias.

The controller 2401 determines a layer of hierarchy up to which image data is to be encoded for obtaining an image with no alias from the input image size and the transmission image size by referring to the LUT 2602, and controls the discrete wavelet transform unit 2402, the quantization unit 2403, the entropy encoder 2404 and the transmission/recording processing unit 2405.

Next, processing in the eighth embodiment is explained with reference to FIG. 18. The processes in FIG. 18 which are same as those shown FIG. 14 are referred to by the same step numbers.

Figure 18:
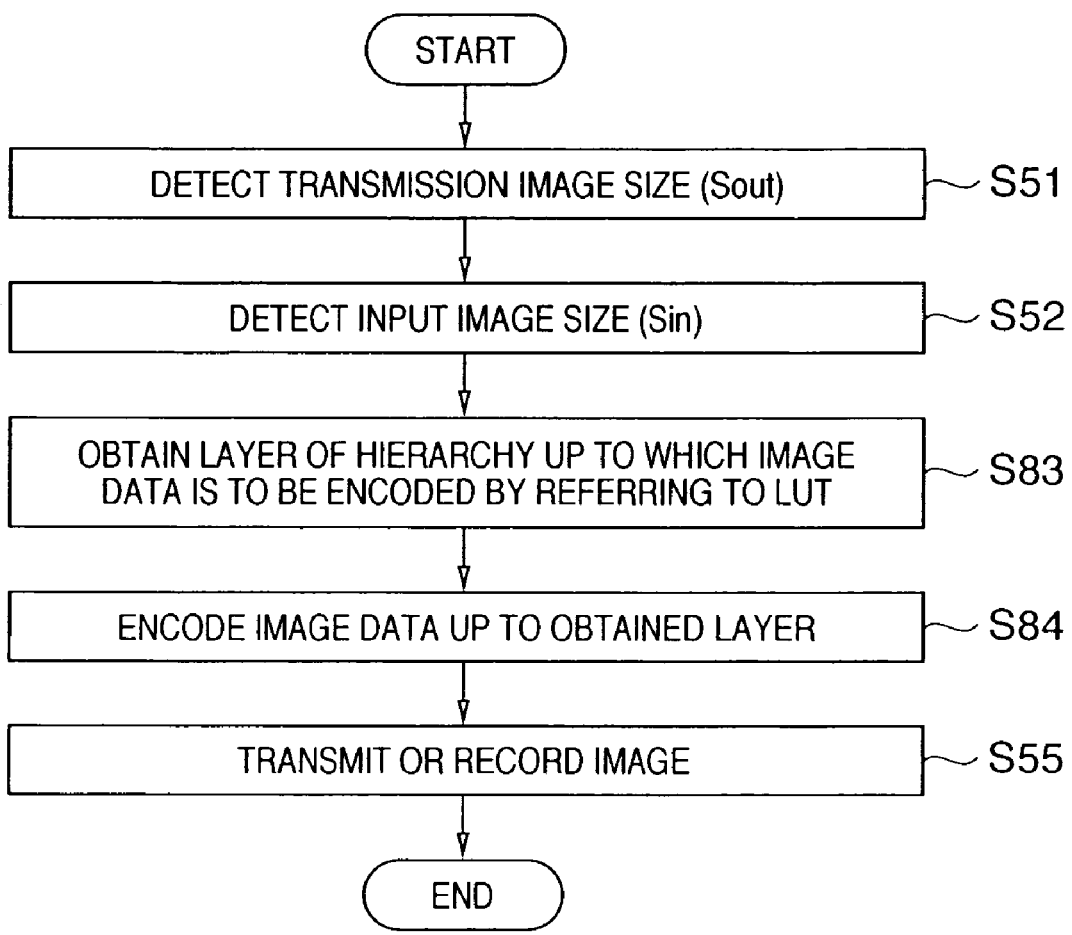
FIG. 18 is a flowchart for explaining an example of encoding processing according to the eighth embodiment of the present invention.

Referring to FIG. 18, a transmission image size (Sout) is detected in step S51, and an input image size (Sin) is detected in step S52.

In step S83, a layer of hierarchy up to which image data is to be encoded is determined by referring to the LUT 2602 based on the information obtained in steps S51 and S52. The LUT 2602 is preset so as to give a layer of hierarchy which is one layer more than the minimum layer of hierarchy necessary for obtaining an image of the designated transmission image size (e.g., so as to give an output as shown in FIG. 3).

In step S84, image data is encoded up to the layer obtained in step S83.

In step S55, encoded image data obtained in step S84 is transmitted or recorded on a medium.

With the foregoing processing, it is possible to output an image of good quality when image data is encoded up to an intermediate layer of hierarchy.

In the eighth embodiment, effects of alias are determined and information on a layer/layers of hierarchy to be encoded is obtained from LUT. However, it is possible to realize the same effect of the eighth embodiment by obtaining a layer/layers of hierarchy which is/are not to be encoded. Further, a numeral operation equivalent to LUT may be performed instead.

In the aforesaid first to eighth embodiments, two dimensional wavelet transform is explained, but the present invention is not limited to this, and the similar operation can be applied to linear wavelet transform. Further, either of the number of pixels in the horizontal direction and the number of pixels in the vertical direction, or both of those numbers may be used or which is to be used may be determined for each case as an image size.

Further, in the first to eighth embodiments, the operations are explained as software processing with reference to flowcharts, however, the operations may be realized by hardware.

Further, similar effects can be attained by using approximate values as the values.

Further, when the image signal consists of a plurality of components, such as a luminance component and color component, the present invention can be applied to all of the components or to a luminance component to which the present invention is effective.

In the following ninth to fifteenth embodiments of the present invention, the present invention is realized as an encoding apparatus and a decoding apparatus adopting hierarchical coding processing, and the present invention is especially effective to an apparatus which outputs an image of up to an intermediate layer of hierarchy, and an apparatus which converts color resolution. In the embodiments, a case of adopting a discrete wavelet transform method which conform to JPEG2000 is explained.

Ninth Embodiment

Figure 19:
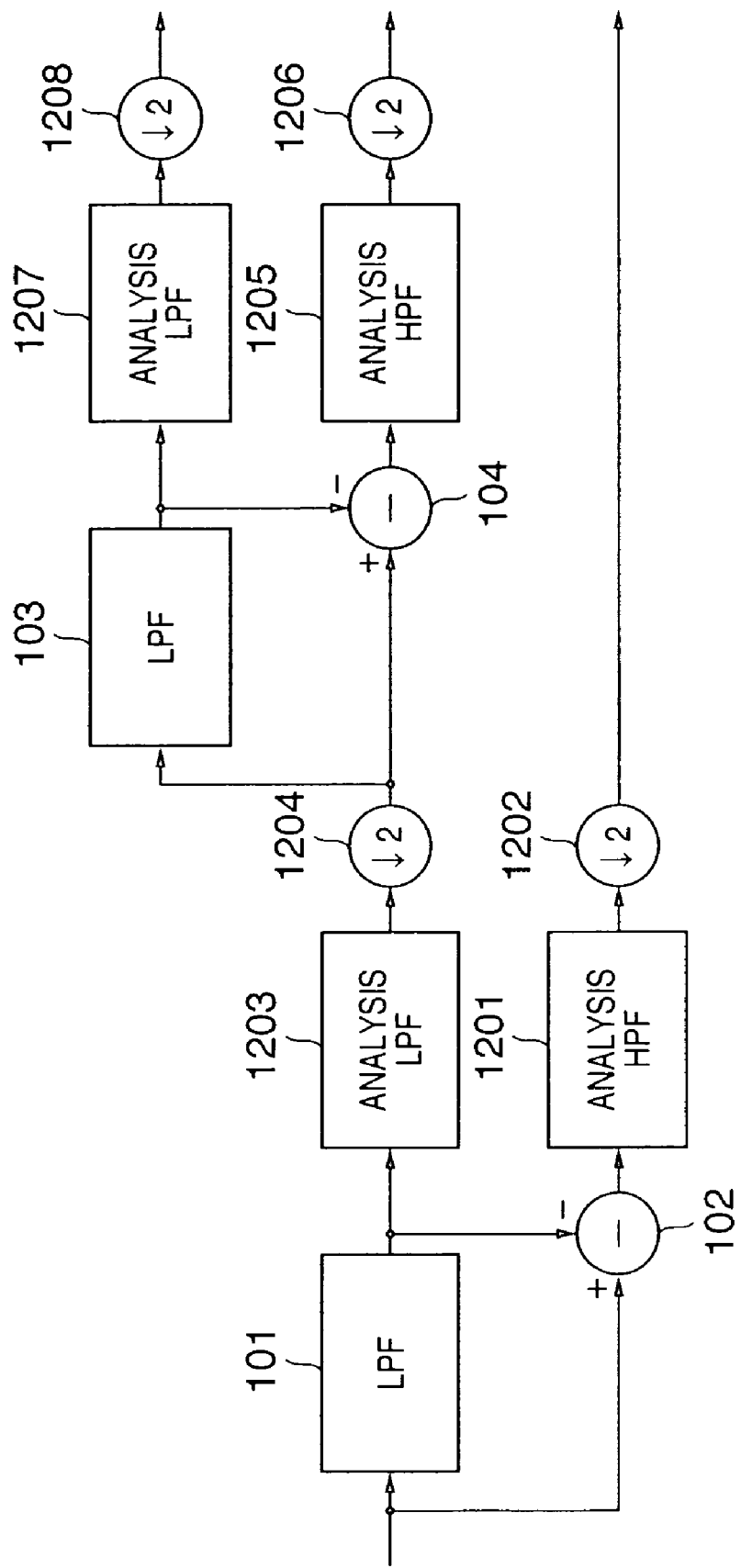
FIG. 19 is a block diagram showing a configuration of a discrete wavelet transform unit according to a ninth embodiment of the present invention.
Figure 35:
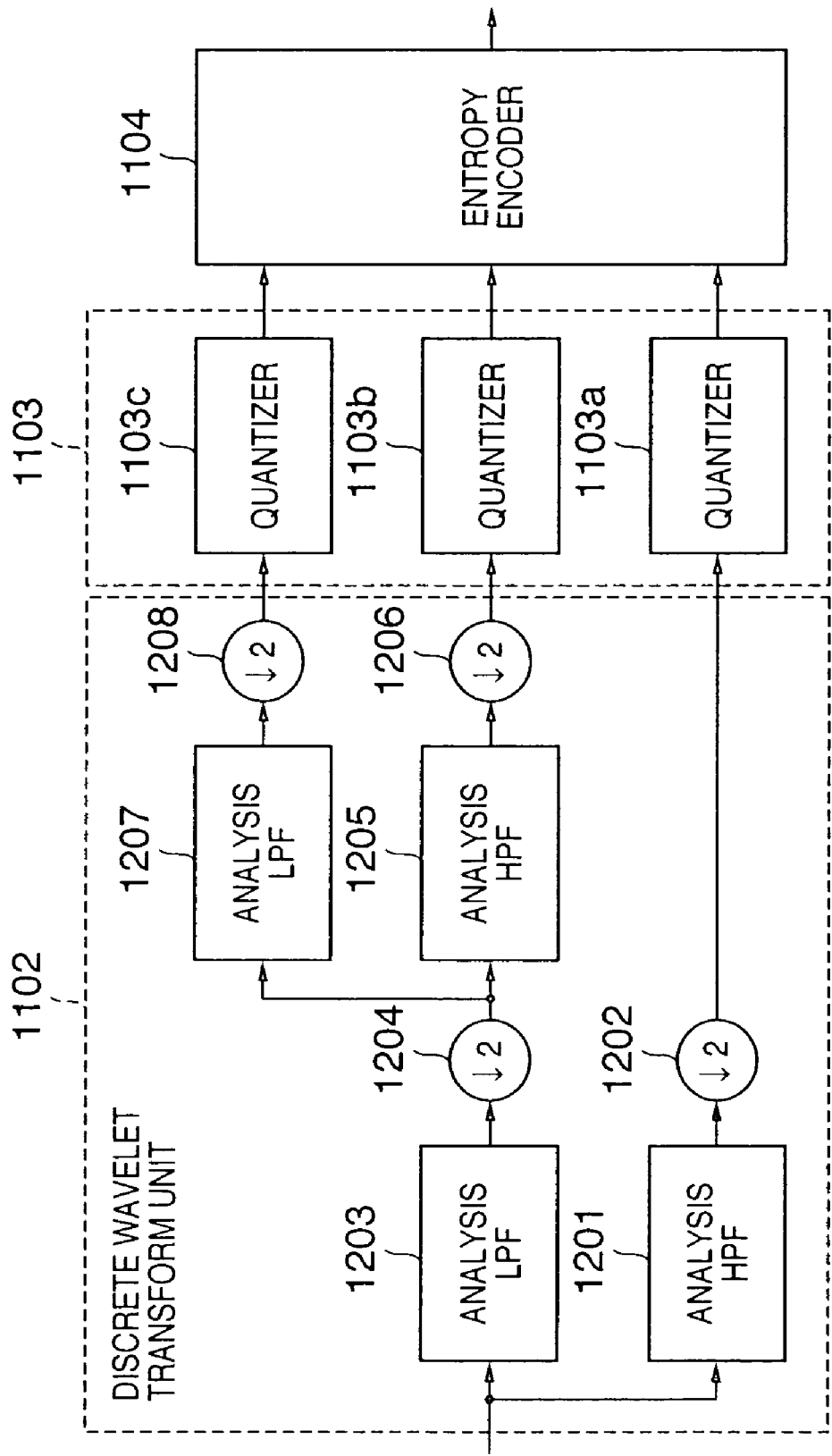
FIG. 35 is a block diagram for explaining details of a conventional encoding unit.

A configuration of a discrete wavelet transform unit according to the ninth embodiment is explained with reference to the block diagram of FIG. 19. In FIG. 19, elements which operate similarly to those shown in FIGS. 35 and 36 are referred to by the same reference numerals, and explanation of them are omitted.

Reference numerals 101 and 103 denote LPF as pre-filters, and reference numeral 102 and 104 denote subtractors.

Next, an operation of the discrete wavelet transform unit having the configuration as described above is explained with reference to FIG. 20.

An input image signal enters the LPF 101 and the subtractor 102. The image signal entered the LPF 101 is limited its frequency (step S301), then inputted to the analysis LPF 1203 of the wavelet transform unit similarly to the conventional transform unit. Since the analysis LPF 1203 has broad characteristics, down sampling by the down sampler 1204 causes alias. However, LPF 101 functions as a pre-filter and restrains in advance a frequency component which causes alias. The LPF 101 is designed to have characteristics for restraining and cutting frequency components of the nyquist frequency and higher frequencies so as to prevent alias defined by a sampling theorem for its utilization purpose. The characteristics depend on imaging characteristics of the whole system, and they should be adjusted to the optimum characteristics.

Meanwhile, an output from the subtractor 102 is inputted to the analysis HPF 1201. The subtractor 102 subtracts an output signal of the LPF 101 from the input image signal and outputs (1-pre-filter) signal (step S302). The subtraction process can achieve an effect similar to a HPF, as well as realize no gain and flat frequency characteristics together with the output from the LPF 101.

Figure 21:
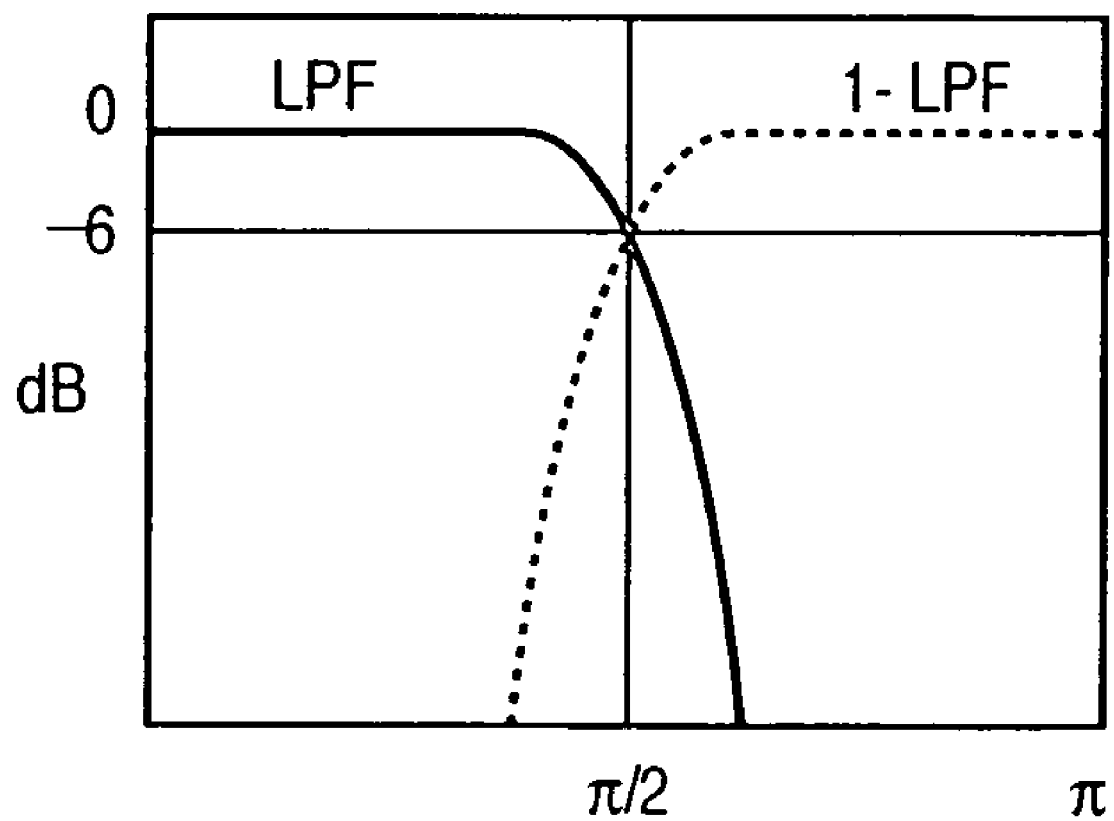
FIG. 21 is an explanatory view for explaining filter characteristics according to the ninth embodiment of the present invention.

The characteristics are shown in FIG. 21. FIG. 21 shows a state that signals which pass through the LPF 101 and the HPF (1-LPF 101) respectively drop near nyquist frequency in good balance. By moving the cutoff frequency of the LPF 101 to the lower frequency side, alias of low frequency band is further reduced, but in turn, more alias is generated in the high frequency band.

The low frequency component signal which passed through the analysis LPF 1203 is down-sampled by the down sampler 1204, and outputted as a low frequency component of the first layer of hierarchy (i.e., data corresponding to LL1). The high frequency component signal which passed through the analysis HPF 1201 is down-sampled by the down sampler 1202, and outputted as a high, frequency component of the first layer of hierarchy (i.e., data corresponding to HL1, LH1, and HH1 in FIG. 38) (step S303).

In step S304, whether or not image data has undergone wavelet transform processing up to a preset layer of hierarchy is determined, and if NO, the process returns to step S301 where the similar processes as described above are repeated.

In the configuration shown in FIG. 19 of the ninth embodiment, image data is layered by recursively performing the above processes on the low frequency component. More specifically, the output from the down sampler 1204 (data corresponding to LL1 which is a low frequency component of the first layer of hierarchy) is further inputted to the LPF 103 as a pre-filter (step S301), and its output is further inputted to the second analysis LPF 1207 where a conventional process is performed. The component which causes alias is restrained and/or removed by the LPF 103 at this time, thus an alias component is not generated. The frequency characteristics of the LPF 103 has characteristics to restrain and/or remove alias caused by the analysis LPF 1207 and the down sampler 1208.

In the analysis HPF 1205, an output from the subtractor 104 is inputted. The subtractor 104 subtracts an output signal of the LPF 103 from the low frequency component signal outputted from the down sampler 1204, and outputs the difference (step S302). The subtraction process can achieve an effect similar to a HPF, as well as realize no gain and flat frequency characteristics together with the output from the LPF 103 (step S303).

Thereafter, the low frequency component signal which passed through the analysis LPF 1207 is down-sampled by the down sampler 1208, and outputted as a low frequency component of the second layer of hierarchy (i.e., data corresponding to LL2 in FIG. 38). The high frequency component signal which passed through the analysis HPF 1205 is down-sampled by the down sampler 1206, and outputted as a high frequency component of the second layer of hierarchy (i.e., data corresponding to HL2, LH2, and HH2 in FIG. 38).

When it is determined in step S304 that wavelet transform of layering image data up to a preset layer is finished, the process proceeds to step S305 where a signal of each layer is quantized.

The hierarchically coded data quantized in step S305 undergoes entropy coding which compresses the data by using its redundancy (step S306). Thereafter, the compressed data is formatted in accordance with an output format, and transmitted or outputted to a recording system in step S307.

Figure 34:
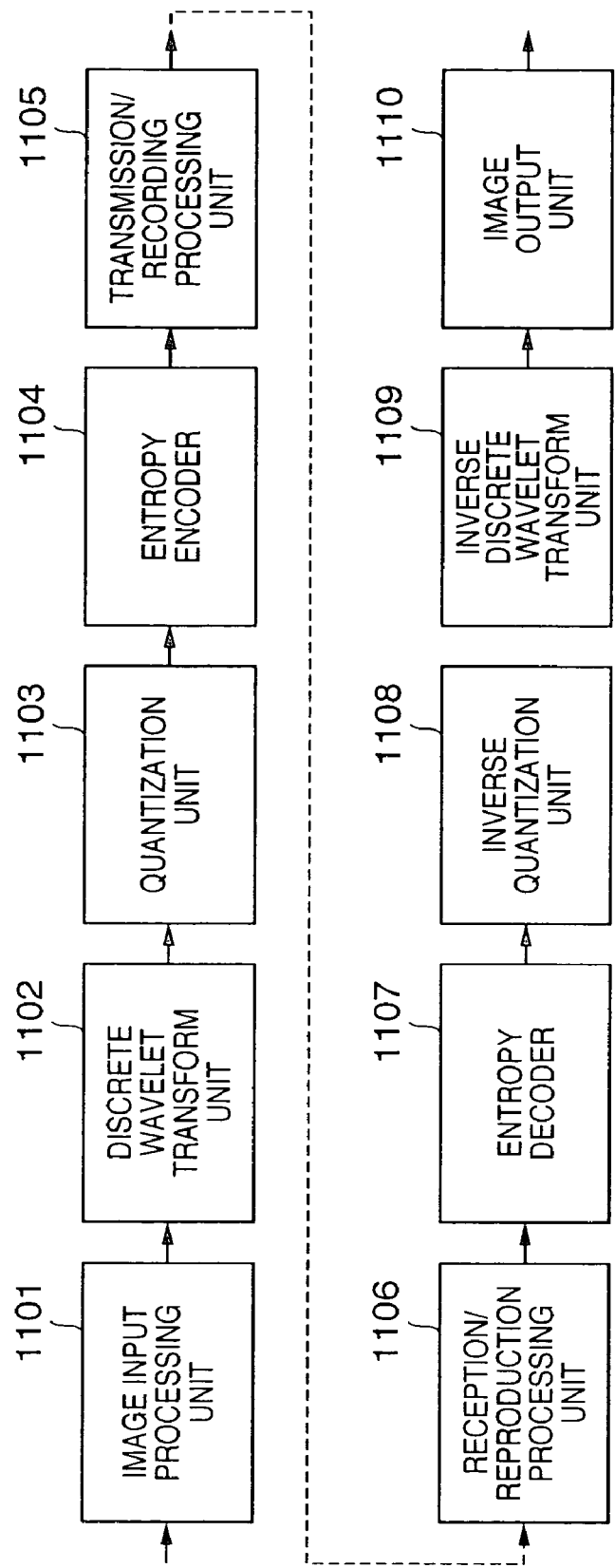
FIG. 34 is a block diagram showing a configuration of a conventional encoding and decoding apparatus.

The processes from step S305 to step S307 can be performed by using structures similarly to the quantization unit 1103, the entropy encoder 1104, and the transmission/recording processing unit 1105 shown in FIG. 34 described in the Background of the Invention.

Since the ninth embodiment adopts octave division, the relationship between the cutoff frequencies of the LPF 101 and LPF 103 is also octave. Because the down sampler 1204 makes the sampling frequencies of an image have octave relationship, same FIR filters can be used as the LPF 101 and LPF 103 in the configuration.

However, when the fact that the frequency band varies for each image is considered, it is also possible to design each LPF to have optimum characteristics for processing an image delicately so as to correspond to respective frequency band and/or improving encoding efficiency. Especially if the highest layer of hierarchy (high frequency component) is not encoded or decoded, it is possible to restrain and remove an effect of alias to its maximum by putting more weight on low frequency bandpass characteristics of LPFs.

Thus, it is possible to encode an image with no alias in an intermediate layer of hierarchy while conforming to the standard by restraining and removing a component of nyquist frequency and higher frequency which causes alias before performing wavelet transform. This eventually enables a coded image signal to be decoded in good condition.

Modification of Ninth Embodiment

Figure 22:
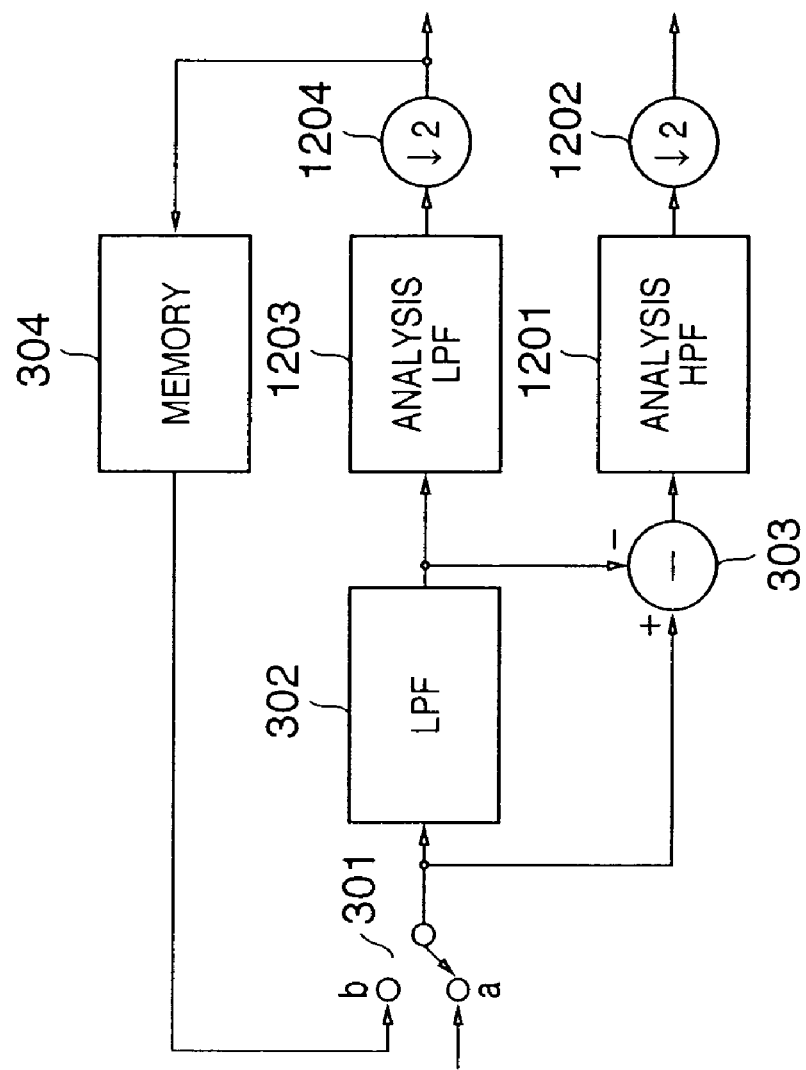
FIG. 22 is a block diagram illustrating a configuration of a discrete wavelet transform unit designed to have a recursive mechanism according to a modification of the ninth embodiment of the present invention.

Next, a modification of the ninth embodiment is explained. In this modification, a case of recursively using the LPF, subtractor, analysis LPF, and analysis HPF, shown in FIG. 19 is explained. FIG. 22 shows a configuration example of a discrete wavelet transform unit according to the modification. In FIG. 22, elements, which perform similar processes as those shown in FIG. 19, are referred to by the same reference numerals and explanation of them is omitted. FIG. 22 is different from the ninth embodiment in which a switch 301 and memory 304 are added.

An input image signal enters from an a terminal of the switch 301, and inputted to a LPF 302 and the subtractor 303. The LPF 302 performs band restriction for restraining and removing an alias component on the image signal, and outputs the processed image signal via the analysis LPF 1203 and the down sampler 1204 as a low frequency component signal.

A subtractor 303 functions as a HPF by taking a difference between the input image signal and the output from the LPF 302, and its output signal is outputted as a high frequency component signal through the analysis HPF 1201 and the down sampler 1202.

Between the outputs from the down samplers 1201 and 1203, the high frequency component signal is outputted to the next configuration element. Whereas, the low frequency component signal is temporarily stored in the memory 304 to be recursively used and, in the next hierarchical layering processing, inputted again from the memory 304 to the LPF 302 and the subtractor 303 via a terminal b of the switch 301. By performing this recursive processing up to a predetermined layer of hierarchy, layers are formed.

As described above, it is possible to acquire the same effects as those of the ninth embodiment.

Tenth Embodiment

Next, a tenth embodiment is explained.

Figure 23:
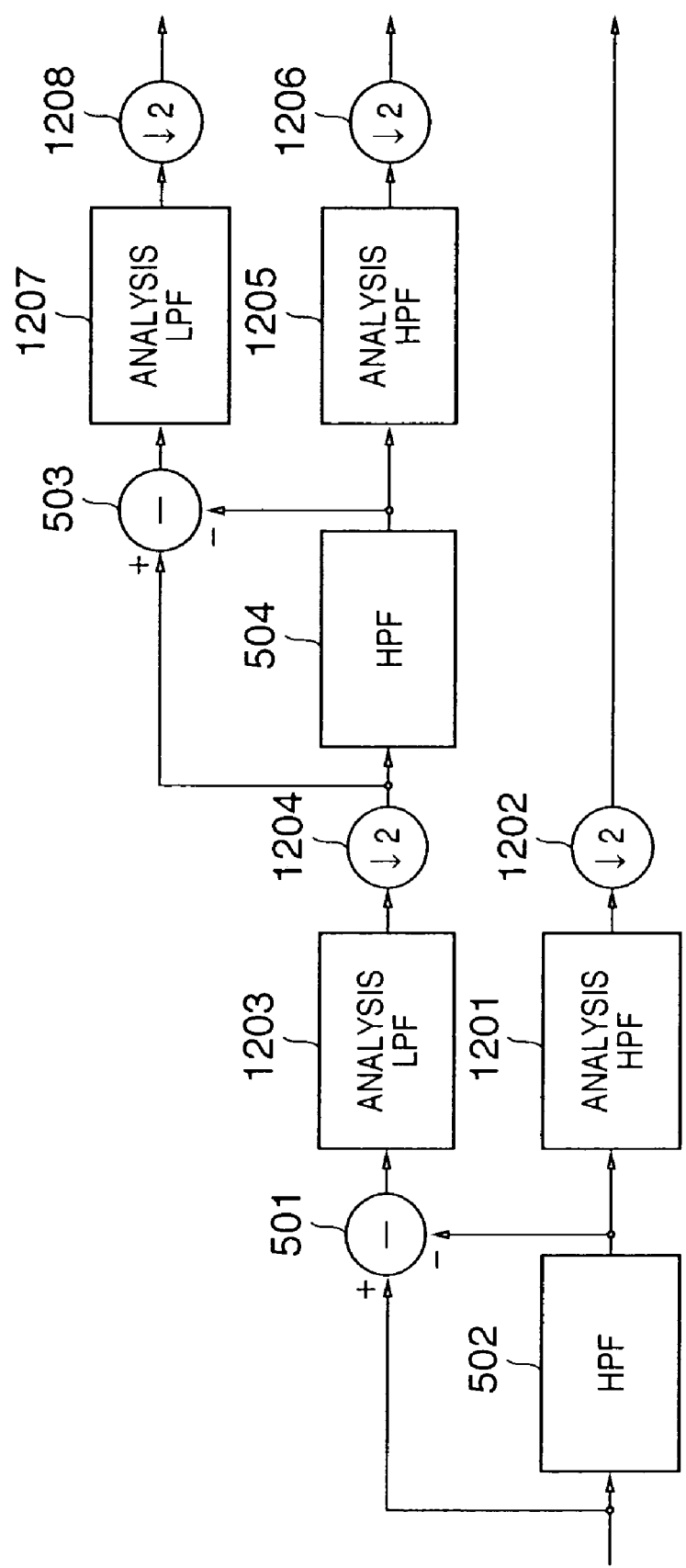
FIG. 23 is a block diagram showing a configuration of a discrete wavelet transform unit according to a tenth embodiment of the present invention.

FIG. 23 is a block diagram illustrating a configuration of a discrete wavelet transform unit according to the tenth embodiment. LPFs are used as pre-filters in the ninth embodiment, whereas HPFs are used as shown in FIG. 23 in the tenth embodiment. In FIG. 23, elements which operate similarly to those shown in FIGS. 35, 36 and 19 are referred to by the same reference numerals, and explanation of them is omitted.

Reference numerals 502 and 504 denote HPFs as pre-filters, and reference numerals 501 and 503 denote subtractors.

Figure 20:
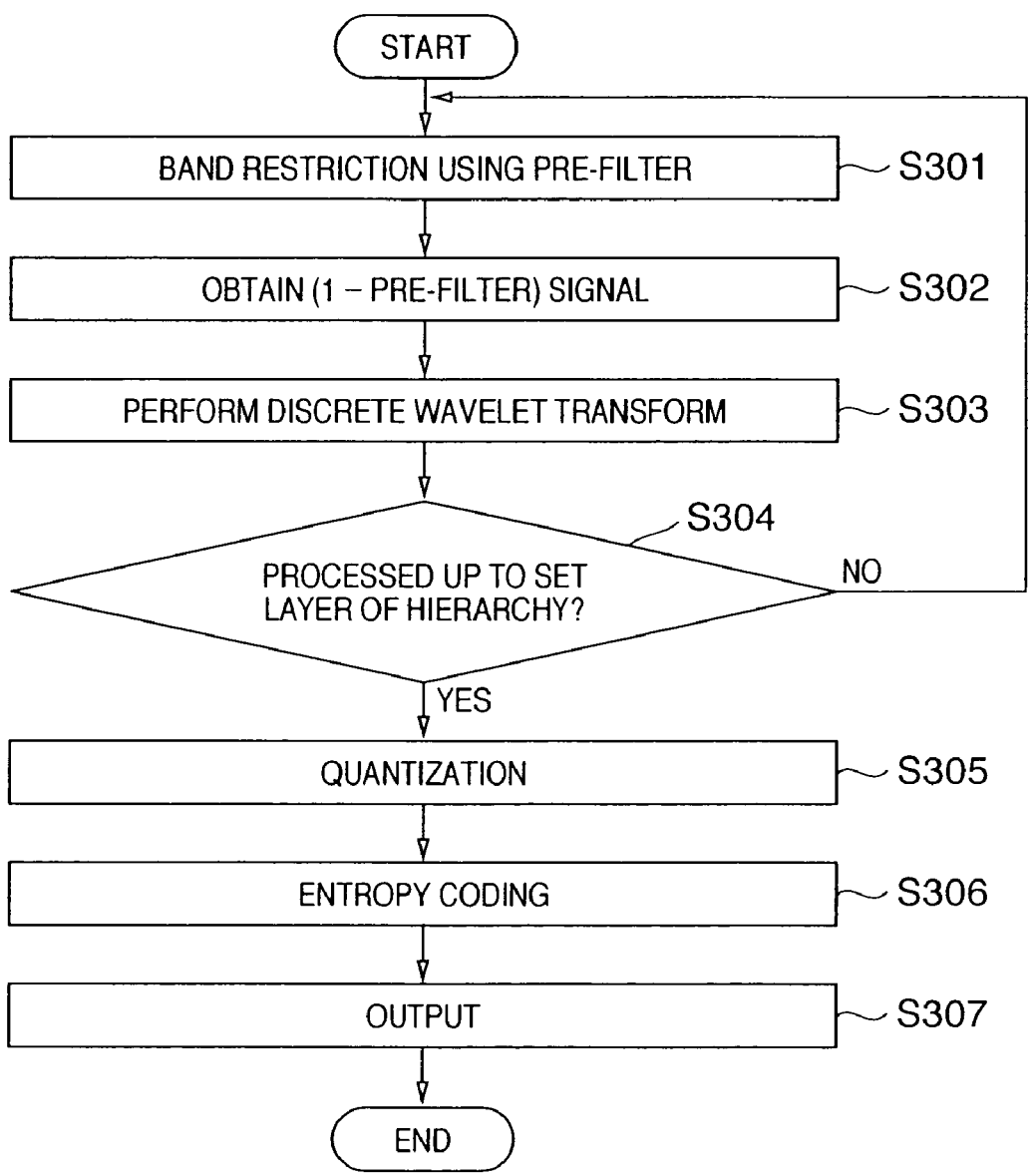
FIG. 20 is a flowchart for explaining encoding processing according to the ninth embodiment of the present invention.

An operation of the discrete wavelet transform unit according to the tenth embodiment is explained with reference to the flowchart in FIG. 20 similarly to the ninth embodiment.

An input image signal enters the HPF 502 and the subtractor 501. The image signal entered the HPF 502 is limited its frequency (step S301), then inputted to the analysis HPF 1201 of the wavelet transform unit similarly to the conventional transform unit. Since the analysis HPF 1201 has broad characteristics, down sampling by the down sampler 1202 causes alias. However, the HPF 502 functions as a pre-filter and restrains in advance a frequency component which causes alias. The HPF 502 is designed to have characteristics for restraining and cutting frequency components of the nyquist frequency and lower frequencies so as to prevent alias defined by a sampling theorem for its utilization purpose. The characteristics depend on imaging characteristics of the whole system, and they should be adjusted to the optimum characteristics.

Meanwhile, an output from the subtractor 501 is inputted to the analysis LPF 1203. The subtractor 501 subtracts an output signal of the HPF 502 from the input image signal and outputs (1-pre-filter) signal (step S302). The subtraction process can achieve an effect similar to a LPF, as well as realize no gain and flat frequency characteristics together with an output from the HPF 502.

Figure 24:
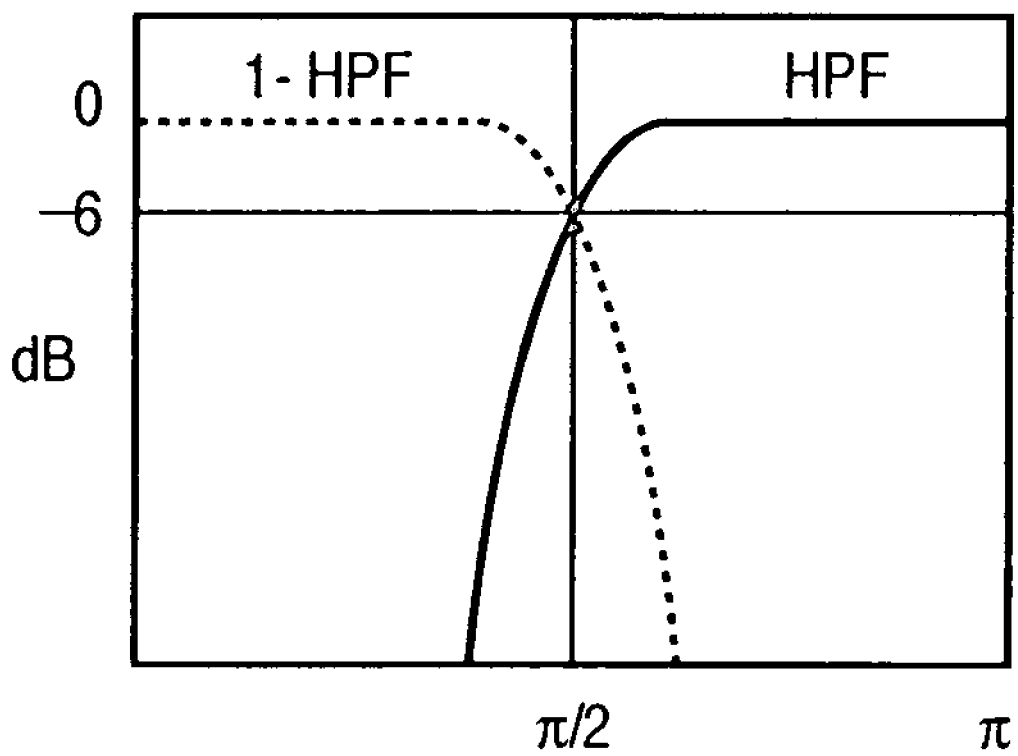
FIG. 24 is an explanatory view for explaining filter characteristics according to the tenth embodiment of the present invention.

The characteristics are shown in FIG. 24. FIG. 24 shows a state that signals which pass through the LPF (1-HPF 502) and the HPF 502 respectively drop near nyquist frequency in good balance. By moving the cutoff frequency of the HPF 502 to the lower frequency side, alias of low frequency band is further reduced, but in turn, more alias is generated in the high frequency band.

The high frequency component signal which passed through the analysis HPF 1201 is down-sampled by the down sampler 1202, and outputted as a high frequency component of the first layer of hierarchy (i.e., data corresponding to HL1, LH1, and HH1 in FIG. 38). The low frequency component signal which passed through the analysis LPF 1203 is down-sampled by the down sampler 1204, and outputted as a low frequency component of the first layer of hierarchy (i.e., data corresponding to LL1) (step S303).

In step S304, whether or not image data has undergone wavelet transform processing up to a preset layer of hierarchy is determined, and if NO, the process returns to step S301 where the similar processes as described above are repeated.

In the configuration shown in FIG. 23 of the tenth embodiment, image data is layered by recursively performing the above processes on the low frequency component. More specifically, the output from the down sampler 1204 (data corresponding to LL1 which is a low frequency component of the first layer of hierarchy) is further inputted to the HPF 504 as a pre-filter (step S301), and its output is further inputted to the second analysis HPF 1205 where a conventional process is performed. The component which causes alias is restrained and/or removed by the HPF 504 at this time, thus an alias component is not generated. The frequency characteristics of the HPF 504 has characteristics to restrain and/or remove alias caused by the analysis HPF 1205 and the down sampler 1206.

In the analysis LPF 1207, an output from the subtractor 503 is inputted. The subtractor 503 subtracts an output signal of the HPF 504 from the low frequency component signal outputted from the down sampler 1204, and outputs the difference (step S302). The subtraction process can achieve an effect similar to a LPF, as well as realize no gain and flat frequency characteristics together with an output from the HPF 504.

Thereafter, the high frequency component signal which passed through the analysis HPF 1205 is down-sampled by the down sampler 1206, and outputted as a high frequency component of the second layer of hierarchy (i.e., data corresponding to HL2, LH2 and HH2 in FIG. 38). The low frequency component signal which passed through the analysis LPF 1207 is down-sampled by the down sampler 1208, and outputted as a low frequency component of the second layer of hierarchy (i.e., data corresponding to LL2 in FIG. 38) (step S303).

The processes subsequent to YES in step S304 are the same as those explained in the ninth embodiment, which explanation is omitted.

Since the tenth embodiment adopts octave division, the relationship between the cutoff frequencies of the HPF 502 and HPF 504 is also octave. Because the down sampler 1204 makes the sampling frequencies of an image have octave relationship, same FIR filters can be used as the HPF 502 and HPF 504 in the configuration.

When the fact that the frequency band varies for each image is considered, it is also possible to design each HPF to have optimum characteristics for processing an image delicately so as to correspond to respective frequency band and/or improving encoding efficiency. Especially if the highest layer of hierarchy (high frequency component) is not encoded or decoded, it is possible to restrain and remove an effect of alias to its maximum by putting more weight on low frequency bandpass characteristics of HPFs.

As described above, it is possible to attain the same effects as those of the ninth embodiment by using HPF as a pre-filter instead of LPF.

Modification of Tenth Embodiment

Figure 25:
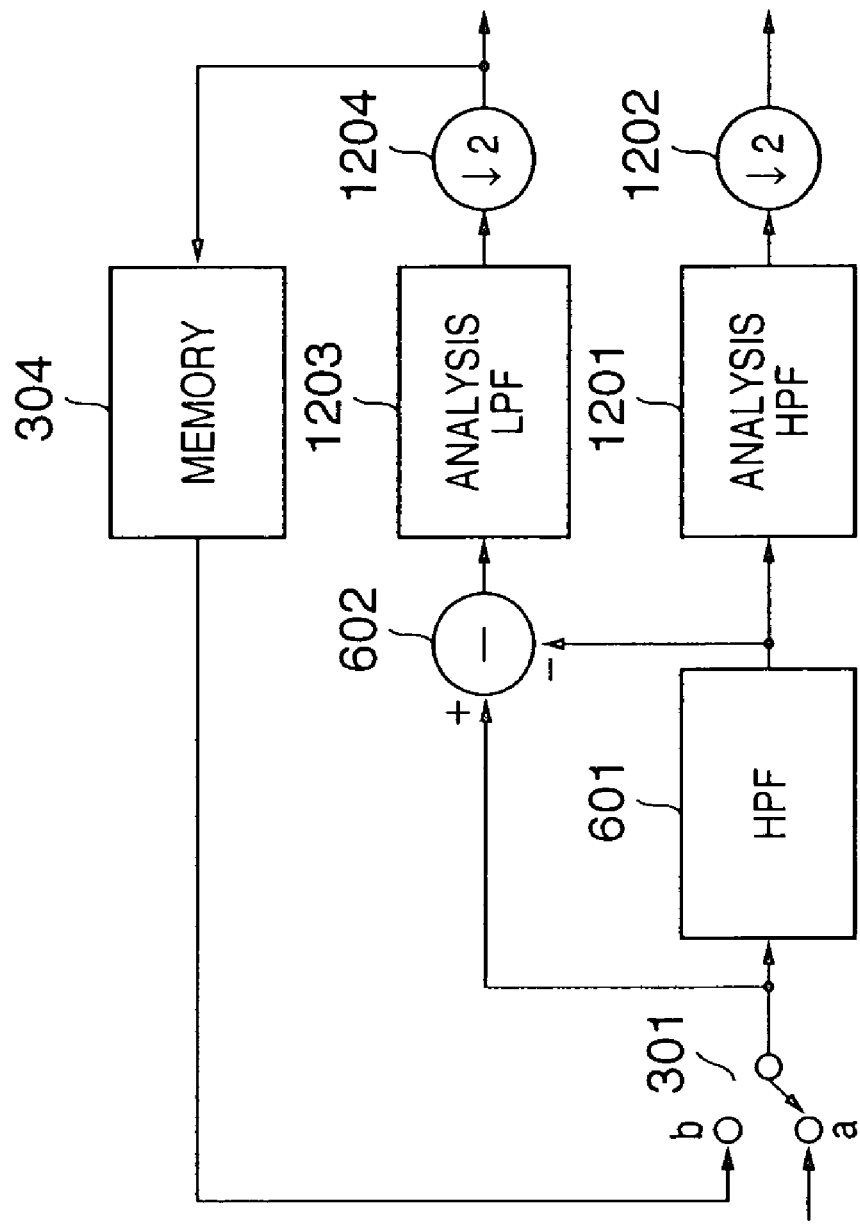
FIG. 25 is a block diagram illustrating a configuration of a discrete wavelet transform unit designed to have a recursive mechanism according to a modification of the tenth embodiment of the present invention.

Next, a modification of the tenth embodiment is explained. In this modification, a case of recursively using the HPF, subtractor, analysis LPF, and analysis HPF, shown in FIG. 23 is explained. FIG. 25 shows a configuration example of a discrete wavelet transform unit according to the modification.

In FIG. 25, elements which perform similar processes as those shown in FIG. 23 are referred to by the same reference numerals and explanation of them is omitted. FIG. 25 is different from the tenth embodiment in which a switch 301 and memory 304 are added.

An input image signal enters from an a terminal of the switch 301, and inputted to a HPF 601 and the subtractor 602. The HPF 601 performs band restriction for restraining and removing an alias component on the image signal, and outputs the processed image signal via the analysis HPF 1201 and the down sampler 1202 as a high frequency component signal.

A subtractor 602 functions as a LPF by taking a difference between the input image signal and the output from the HPF 601, and its output signal is outputted as a low frequency component signal through the analysis LPF 1203 and the down sampler 1204.

The low frequency component signal is temporarily stored in the memory 304 to be recursively used and, in the next hierarchical layering processing, inputted again from the memory 304 to the HPF 601 and the subtractor 602 via a terminal b of the switch 301. By performing this recursive processing up to a predetermined layer of hierarchy, layers are formed.

According to the modification of the tenth embodiment, it is possible to acquire the same effects as those of the ninth embodiment.

Eleventh Embodiment

Next, an eleventh embodiment is explained.

Figure 26:
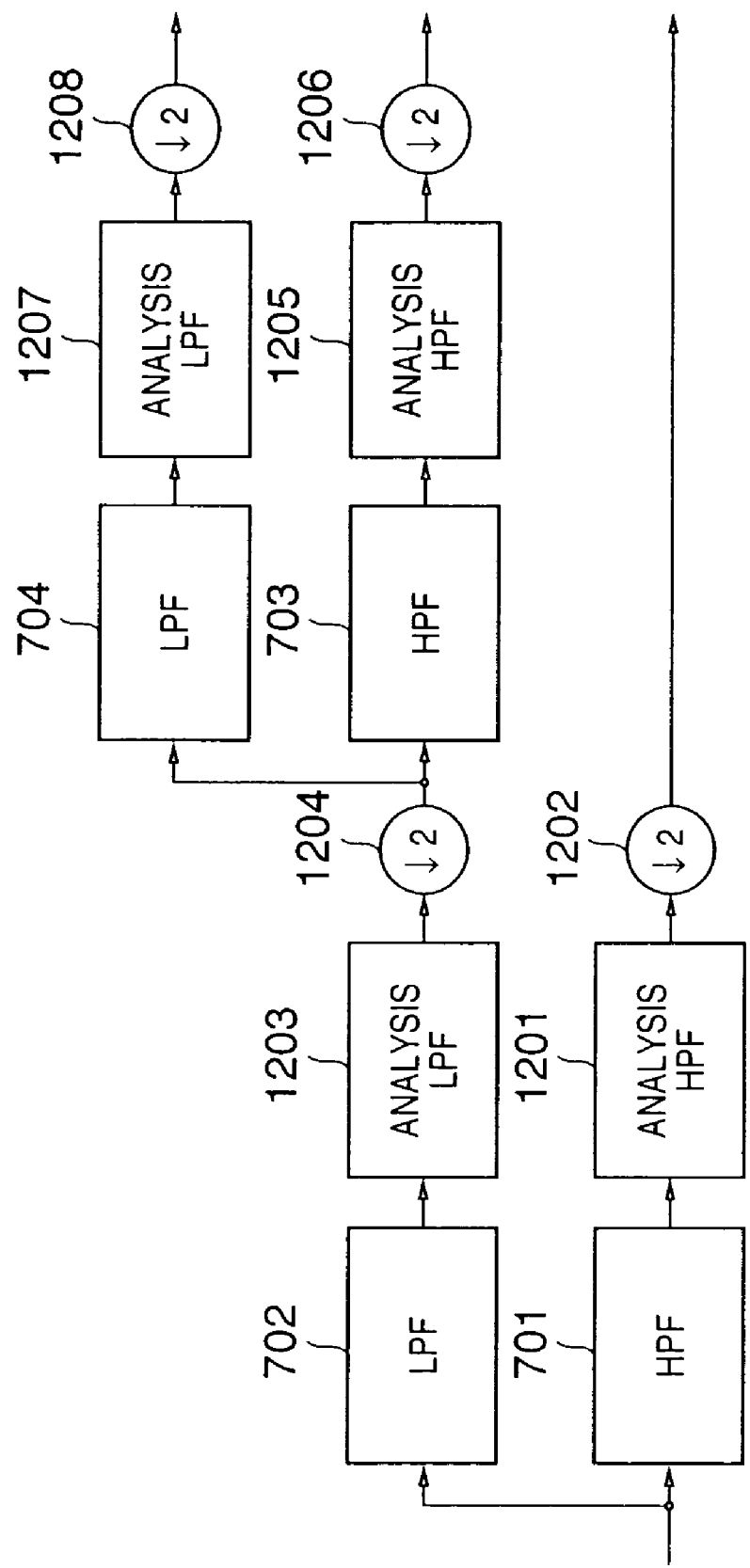
FIG. 26 is a block diagram showing a configuration of a discrete wavelet transform unit according to an eleventh embodiment of the present invention.

FIG. 26 is a block diagram illustrating a configuration of a discrete wavelet transform unit according to the eleventh embodiment. LPFs are used in the ninth embodiment and HPFs are used in the tenth embodiment as pre-filters, whereas both LPFs and HPFs are used as shown in FIG. 26 in the eleventh embodiment. In FIG. 26, elements which operates similarly to those shown in FIGS. 35, 36, 19, and 23 are referred to by the same reference numerals, and explanation of them is omitted.

Reference numerals 701 and 703 denote HPFs as pre-filters, and reference numeral 702 and 704 denote LPFs.

An operation of the discrete wavelet transform unit according to the eleventh embodiment is explained with reference to the flowchart in FIG. 20 similarly to the ninth embodiment.

An input image signal is limited its frequency by the HPF 701 (step S301), then inputted to the analysis HPF 1201 of the wavelet transform unit similarly to the conventional transform unit. Since the analysis HPF 1201 has broad characteristics, down sampling by the down sampler 1202 causes alias. However, the HPF 701 functions as a pre-filter and restrains in advance a frequency component which causes alias. The HPF 701 is designed to have characteristics for restraining and cutting frequency components of the nyquist frequency or lower frequencies so as to prevent alias defined by a sampling theorem for its utilization purpose. The characteristics depend on imaging characteristics of the whole system, so that they should be adjusted to the optimum characteristics.

Meanwhile, the input image signal also enters the LPF 702 and is limited its frequency (corresponds to obtaining (1-pre-filter) signal in step S302), then inputted to the analysis LPF 1203 of the wavelet transform unit similarly to the conventional transform unit. Since the analysis LPF 1203 has broad characteristics, down sampling by the down sampler 1204 causes alias. However, the LPF 702 functions as a pre-filter and restrains in advance a frequency component which causes alias. The LPF 702 is designed to have characteristics for restraining and cutting frequency components of the nyquist frequency and higher frequencies so as to prevent alias defined by a sampling theorem for its utilization purpose. The characteristics depend on imaging characteristics of the whole system, and they should be adjusted to the optimum characteristics.

It should be noted that the frequency band restriction process by the LPF 702 can be considered as the process of step S301. In such case, the frequency band restriction process by the HPF 701 can be considered as the process of acquiring a (1-pre-filter) signal performed in step S302.

Figure 27:
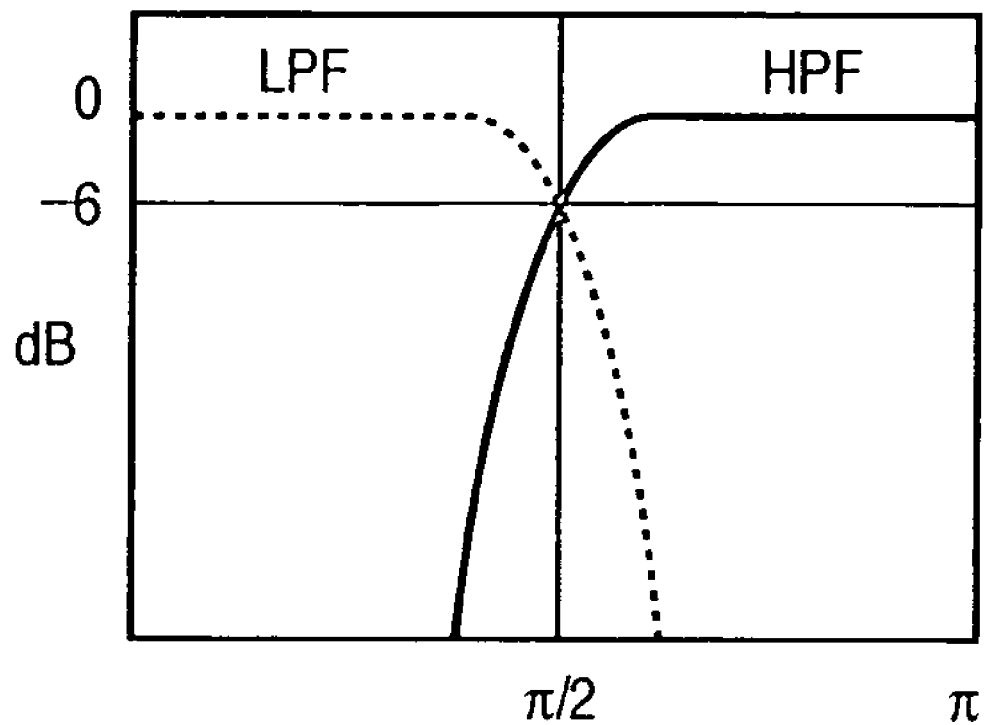
FIG. 27 is an explanatory view for explaining filter characteristics according to the eleventh embodiment of the present invention.

The characteristics of HPF 701 and LPF 702 are shown in FIG. 27. FIG. 27 shows a state that signals which pass through the LPF 702 and the HPF 701 respectively drop near nyquist frequency in good balance. By moving the cutoff frequencies of the HPF 701 and LPF 702 to the lower frequency side, alias of low frequency band is further reduced, but in turn, more alias is generated in the high frequency band.

The high frequency component signal which passed through the analysis HPF 1201 is down-sampled by the down sampler 1202, and outputted as a high frequency component of the first layer of hierarchy (i.e., data corresponding to HL1, LH1, and HH1 in FIG. 38). The low frequency component signal which passed through the analysis LPF 1203 is down-sampled by the down sampler 1204, and outputted as a low frequency component of the first layer of hierarchy (i.e., data corresponding to LL1) (step S303).

In step S304, whether or not image data has undergone wavelet transform processing up to a preset layer of hierarchy is determined, and if NO, the process returns to step S301 where the similar processes as described above are repeated.

In the configuration shown in FIG. 26 of the eleventh embodiment, image data is layered by recursively performing the above processes on the low frequency component. More specifically, the output from the down sampler 1204 (data corresponding to LL1 which is a low frequency component of the first layer of hierarchy) is further inputted to pre-filters, the HPF 703 and LPF 704 (steps S301 and S302), and an output of the HPF 703 is further inputted to the second analysis HPF 1205 where a conventional process is performed. The component which causes alias is restrained and/or removed by the HPF 703 at this time, thus an alias component is not generated. The frequency characteristics of the HPF 703 has characteristics to restrain and/or remove alias caused by the analysis HPF 1205 and the down sampler 1206. To the analysis LPF 1207, an output from LPF 704 is inputted.

Thereafter, the high frequency component signal which passed through the analysis HPF 1205 is down-sampled by the down sampler 1206, and outputted as a high frequency component of the second layer of hierarchy (i.e., data corresponding to HL2, LH2 and HH2 in FIG. 38). The low frequency component signal which passed through the analysis LPF 1207 is down-sampled by the down sampler 1208, and outputted as a low frequency component of the second layer of hierarchy (i.e., data corresponding to LL2 in FIG. 38) (step S303).

Since the eleventh embodiment adopts octave division, the relationship between the cutoff frequencies of the HPFs 701 and 703, and of the LPFs 702 and 704 are also octave. Because the down sampler 1204 makes the sampling frequencies of an image have octave relationship, same FIR filters can be used as the HPFs 701 and 703, and the LPFs 702 and 704 in the configuration.

However, when the fact that the frequency band varies for each image is considered, it is also possible to design each HPF and LPF to have optimum characteristics for processing an image delicately so as to correspond to respective frequency band and/or improving encoding efficiency. Especially if the highest layer of hierarchy (high frequency component) is not encoded or decoded, it is possible to restrain and remove an effect of alias to its maximum by putting more weight on low frequency bandpass characteristics of HPFs and LPFs.

As described above, it is possible to attain the same effects as those of the ninth embodiment by using LPFs and HPFs as pre-filters.

Modification of Eleventh Embodiment

Figure 28:
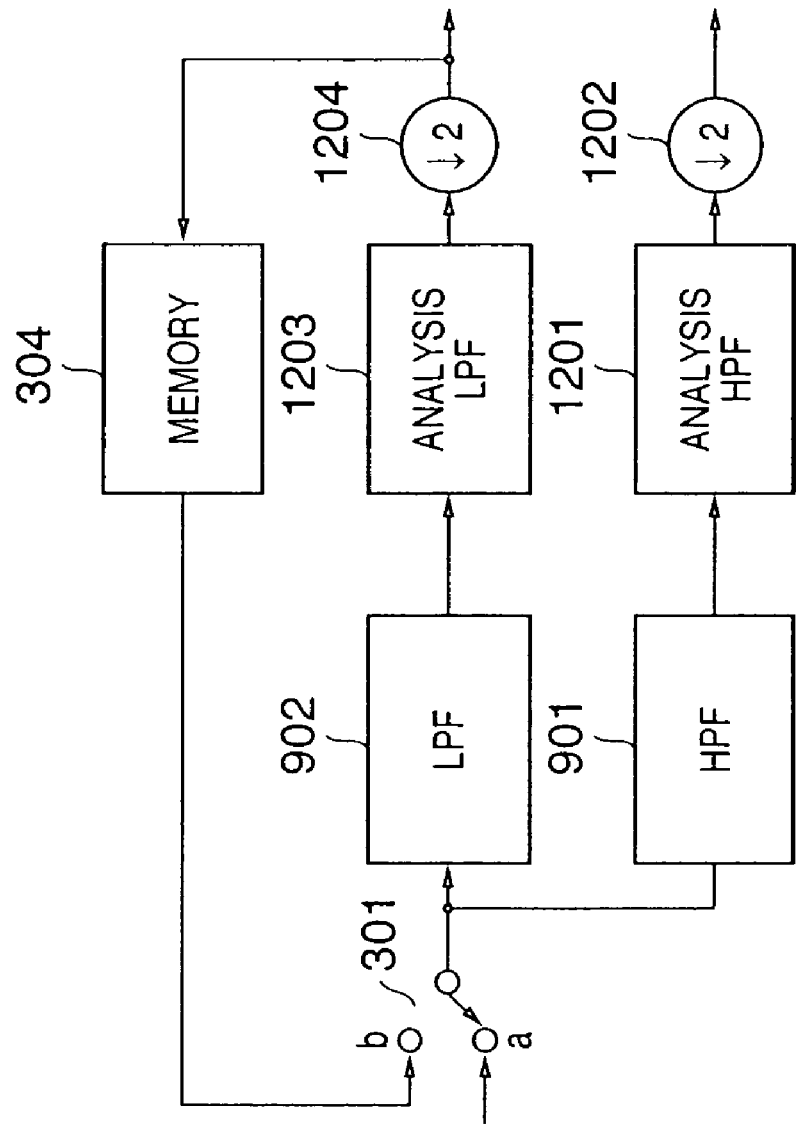
FIG. 28 is a block diagram illustrating a configuration of a discrete wavelet transform unit designed to have a recursive mechanism according to a modification of the eleventh embodiment of the present invention.

Next, a modification of the eleventh embodiment is explained. In this modification, a case of recursively using the HPF, LPF, analysis LPF, and analysis HPF, shown in FIG. 26 is explained. FIG. 28 shows a configuration example of a discrete wavelet transform unit according to the modification. In FIG. 28, elements which perform similar processes as those shown in FIG. 26 are referred to by the same reference numerals and explanation of them is omitted. FIG. 28 is different from the eleventh embodiment in which a switch 301 and memory 304 are added.

An input image signal enters from an a terminal of the switch 301, and inputted to HPF 901 and LPF 902. The HPF 901 and LPF 902 perform band restriction for restraining and removing an alias component on the image signal. An output of the HPF 901 is outputted via the analysis HPF 1201 and the down sampler 1202 as a high frequency component signal.

The output of the LPF 902 is outputted as a low frequency component signal through the analysis LPF 1203 and the down sampler 1204.

The low frequency component signal is temporarily stored in the memory 304 to be recursively used and, in the next hierarchical layering processing, inputted again from the memory 304 to the HPF 901 and the LPF 902 via a terminal b of the switch 301. By performing this recursive processing up to a predetermined layer hierarchy, layers are formed.

According to the modification of the eleventh embodiment, it is possible to acquire the same effects as those of the ninth embodiment using both LPF and HPF as pre-filters.

It should be noted that in filtering processes by HPFs and/or LPFs in the ninth to eleventh embodiments and their modifications, either or both of the horizontal component and the vertical components may be adaptively used.

Further, if an image signal consists of a plurality of components, the present invention is applied to all of the components or to a luminance signal to which it is considered effective to apply the present invention. For applying the present invention to color components, it is possible to apply to conversion processing of 4:2:2, 4:1:1, 4:2:0, or 4:1:0. This can be easily realized by using a hierarchical structure.

Twelfth Embodiment

Next, a twelfth embodiment is explained.

Figure 29:
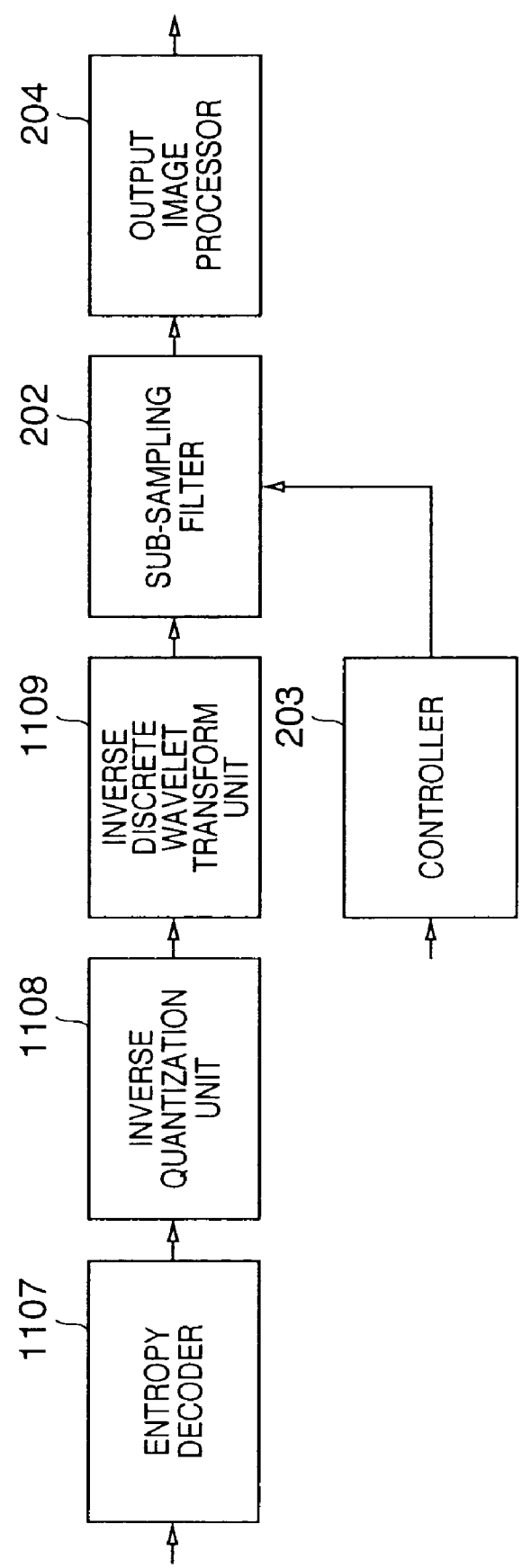
FIG. 29 is a block diagram showing a configuration of a decoder according to a twelfth embodiment of the present invention.

FIG. 29 is a block diagram illustrating a configuration of an decoder according to the twelfth embodiment of the present invention. In FIG. 29, elements which operates similarly to those shown in FIG. 34 explained in the Background of the Invention are referred to by the same reference numerals, and explanation of them is omitted.

Reference numeral 202 denotes a sub-sampling filter (or, low pass filter or down sampling filter) for removing alias; 203, a controller for controlling insertion of the sub-sampling filter 202; and 204, an output image processor.

The controller 203 determines whether decoding processing is performed for all the layers of hierarchy of the encoded image data, and controls whether to make the image data pass through the sub-sampling filter 202 or processed. The sub-sampling filter 202 performs processes including a pre-filter process for removing alias caused by down sampling. The output image processor 204 performs various processes and conversions for outputting an image, and outputs the processed image.

Figure 30:
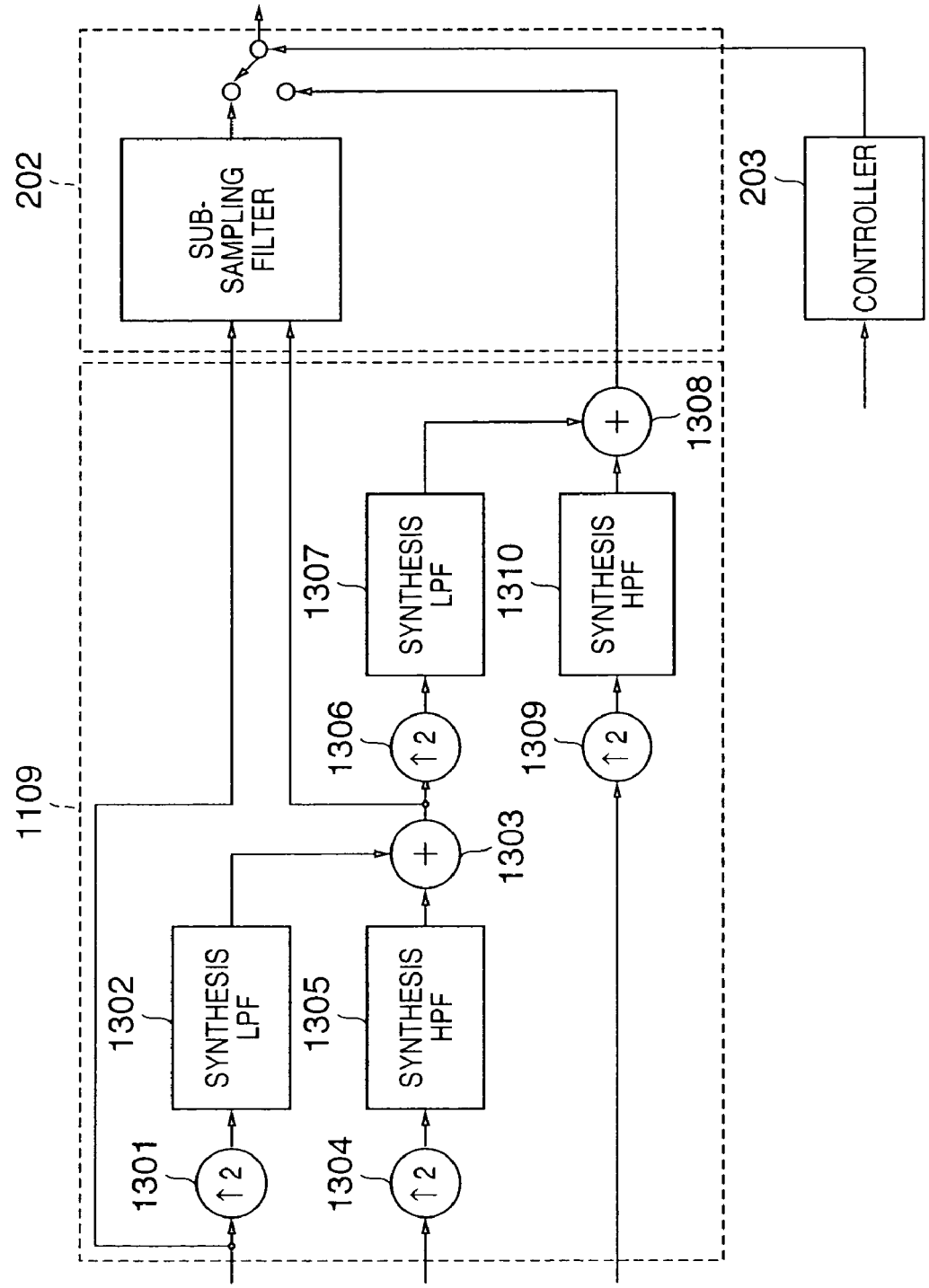
FIG. 30 is a block diagram showing an internal configuration of a sub-sampling filter according to the twelfth embodiment of the present invention.

FIG. 30 shows an internal configuration of the sub-sampling filter 202. When all the layers of hierarchy of image data are decoded, it is unnecessary to insert the sub-sampling filter, and image data passes through the sub-sampling filter 202 without being processed. It should be noted that it is possible to intentionally use the sub-sampling filter for reducing the image size. When all the layers of the image data are not decoded, a sub-sampling process is performed to remove an alias component included in the image data, thereby an image of good quality is outputted. However, a case of outputting a simple image, such as a thumbnail image, which does not require high image quality may be excluded from the above operation.

Next, decoding processing in the decoder having the configuration as described above according to the twelfth embodiment is explained with reference to a flowchart in FIG. 31.

In step S401, input image information including an image size and information on encoded layer/layers of hierarchy of an image to be inputted to the decoding apparatus is acquired. Next in step S402, output image information including an output image size is acquired, and the process moves to step S403.

In step S403, a layer of hierarchy up to which image data is to be decoded is determined on the basis of the information, such as the input image size and the output image size obtained in steps S401 and S402, respectively, then the process proceeds to step S404. In step S404, decoding processing is performed up to the layer determined in step S403. Next, whether or not all of the layers of image data were decoded in step S404 is determined in step S405. If Yes, the process proceeds to step S407, whereas if No, the process goes to step S406.

If all the layers of the encoded image data are not decoded, it means that the image data is decoded up to an intermediate layer of hierarchy. In this case, the decoded image signal includes alias, and an alias component which is not cancelled because no signal component outputted from a HPF included in the image data is synthesized is restrained and removed using the sub-sampling filter 202. After filtering the decoded image data, the process proceeds to step S407.

If all the layers of hierarchy of encoded image data were decoded, no alias component remains. Accordingly, the process in step S406 is not necessary, and the process directly moves to step S407 without performing the process in step S406. In step S407, γ correction, color correction, format conversion, offset process, and so on, which are suitable for a destination of the obtained image of good quality are performed, thereby outputting the image of demanded good quality.

According to the twelfth embodiment of the present invention as described above, it is possible to obtain an image of good quality with no alias by inserting the sub-sampling filter 202 when image data is decoded up to an intermediate layer of hierarchy.

Thirteenth Embodiment

Next, a thirteenth embodiment of the present invention is explained. The decoder of the thirteenth embodiment has the same configuration as that described in FIGS. 29 and 30, however, a process in the controller 203 is different from that described in the twelfth embodiment. Decoding processing is explained with reference to a flowchart in FIG. 32 below.

In the twelfth embodiment, it is determined up to which layer of hierarchy image data is to be decoded in decoding processing. In the thirteenth embodiment, whether to insert a sub-sampling filter 202 or not is determined based on the layer of hierarchy up to which image data was encoded in encoding processing.

Figure 32:
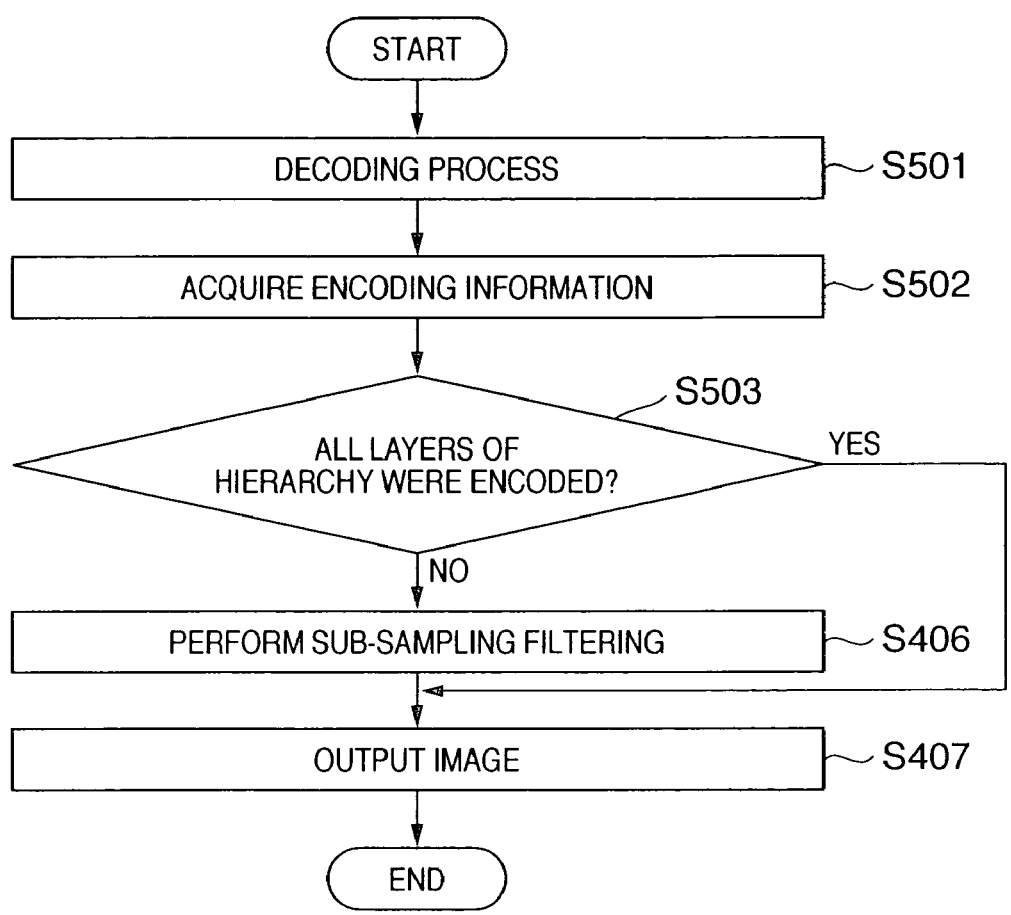
FIG. 32 is a flowchart for explaining decoding processing according to a thirteenth embodiment of the present invention.

In step S501 in FIG. 32, all the coded image data is decoded.

Next in step S502, encoding information on whether all the layers of hierarchy of the image data were encoded after the image data was layered hierarchically is acquired. In step S503, whether or not all the layers of the image data were encoded is determined based on the information acquired in step S502. If No, the process moves onto step S406, whereas if Yes, the process goes to S407.

If all the layers of the image data were not encoded in encoding processing, the decoded image signal includes alias. Thus, an alias component which is not cancelled because no signal component outputted from a HPF included in the image data is synthesized is restrained and removed using the sub-sampling filter 202. After filtering the decoded image data, the process proceeds to step S407.

If all the layers of hierarchy of image data were encoded, no alias component remains. Accordingly, the process in step S406 is not necessary, and the process directly moves to step S407 without performing the process in step S406. In step S407, γ correction, color correction, format conversion, offset process, and so on, which are suitable for a destination of the obtained image of good quality are performed, thereby outputting the image of demanded good quality.

With the aforesaid operation, it is possible to obtain an image of good quality with no alias by inserting the sub-sampling filter 202 when image data was encoded to an intermediate layer of hierarchy in encoding processing.

It should be noted that whether or not to insert the sub-sampling filter 202 is determined in accordance with whether or not all the layers of hierarchy of the image data were encoded in encoding processing in the thirteenth embodiment. In addition to this control, it is also possible to control the insertion of the filter 202 on the basis of a layer up to which the image data is decoded in decoding processing as described in the twelfth embodiment.

Fourteenth Embodiment

Next, a fourteenth embodiment of the present invention is explained. The decoder of the fourteenth embodiment has the same configuration as that described in FIGS. 29 and 30, however, a process in the controller 203 is different from that described in the twelfth and thirteenth embodiments. Decoding processing is explained with reference to a flowchart in FIG. 33 below.

A layer of hierarchy up to which image data is to be decoded is determined in the twelfth embodiment, and a layer of hierarchy up to which image data was encoded is determined in the thirteenth embodiment. In contrast, in the fourteenth embodiment, relates to insertion of the sub-sampling filter 202 determined at the time of receiving an image data or reproducing image data from a medium.

Figure 33:
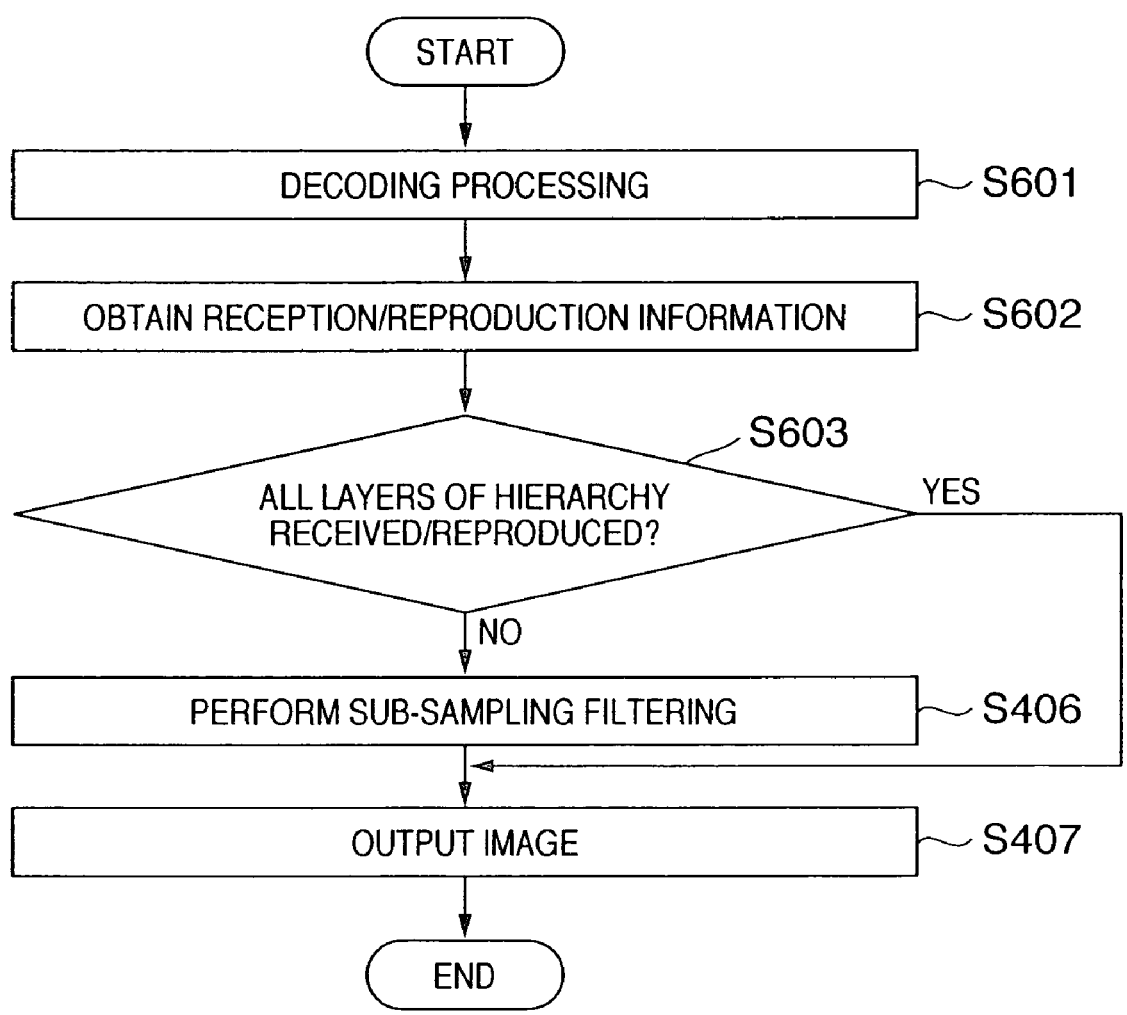
FIG. 33 is a flowchart for explaining decoding processing according to a fourteenth embodiment of the present invention.

In FIG. 33, image data is received or reproduced from a medium or the like up to a predetermined hierarchy, and decoded.

In step S602, information on whether or not received/reproduced image data contains all the layers of hierarchy is received at the time of reception or reproduction from, e.g., a medium of the image data. Then, in step S603, whether or not all the layers of the image data are received/reproduced is determined based on the information acquired in step S602. If No, the process moves to step S406, whereas if Yes, the process proceeds to step S407.

If all the hierarchies of encoded image data are not received/reproduced, the image data is decoded to an intermediate layer of hierarchy. In this case, the decoded image signal includes alias, and an alias component which is not cancelled because no signal component outputted from a HPF included in the image data is synthesized is restrained and removed using the sub-sampling filter 202. After filtering the decoded image data, the process proceeds to step S407.

If all the layers of hierarchy of encoded image data were received/reproduced, no alias component remains. Accordingly, the process in step S406 is not necessary, and the process directly moves to step S407 without performing the process in step S406. In step S407, γ correction, color correction, format conversion, offset process, and so on, which are suitable for a destination of the obtained image of good quality are performed, thereby outputting the image of demanded good quality.

According to the fourteenth embodiment of the present invention as described above, it is possible to obtain an image of good quality with no alias by inserting the sub-sampling filter 202 when image data is received/reproduced up to an intermediate layer of hierarchy.

Note that, in the twelfth to fourteenth embodiment, the sub-sampling filter 202 is inserted when image data is decoded up to an intermediate layer of hierarchy. However, a case of outputting a simple image, such as a thumbnail image, which does not require high image quality may be excluded from the above operation.

Further, if an image signal consists of a plurality of components, the present invention is applied to all of the components or to a luminance signal to which it is considered effective to apply the present invention.

In the aforesaid ninth to fourteenth embodiments, two dimensional wavelet transform is explained, but the present invention is not limited to this, and the similar operation can be applied to linear wavelet transform. Further, either of the horizontal or vertical components may be used, it is preferable to use both of the horizontal and vertical components.

Further, the software configuration of the above embodiments can be suitably realized by a hardware configuration and vice versa.

Other Embodiment

The present invention can be applied to a system constituted by a plurality of devices (e.g., host computer, interface, scanner, camera head, communication device) or to an apparatus comprising a single device (e.g., facsimile machine, digital still camera, digital video camera).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to any one of the flowcharts 1, 6-8, 10, 11, 14-16, 18, 20, and 31-33 described in the embodiments.

The present invention is not limited to the above embodiments and various changes and modifications can be made within the spirit and scope of the present invention. Therefore to apprise the public of the scope of the present invention, the following claims are made.

What is claimed is:

1. A decoding method of decoding encoded image data which has been hierarchically encoded in advance by a discrete wavelet transform method, comprising:
using a processor to perform the following:
determining a size of an image to be output;
judging a minimum number of layer/layers of hierarchy needed to obtain a decoded image of size equal to or exceed the determined size;
determining whether the minimum number of layer/layers of hierarchy corresponds to all the layers of hierarchy of the encoded image data;
decoding, if the determination proves true, all the layers of hierarchy of the encoded image data, and otherwise decoding the encoded image data up to a layer of hierarchy which is one or more layers higher than the minimum number of layer/layers of hierarchy; and
reducing the size of the decoded image to the determined size,
wherein, in said judging step, the number n satisfies a condition of $$1/2^n > Sout/Sin > 1/2^{(n+1)}$$

where Sout is an output image size, and Sin is the input image size, n is an integer equal to or greater than 1, and is judged as the minimum number of layer/layers of hierarchy, and in said decoding step, image data is decoded up to a hierarchy until an input-output ratio of image size becomes $$1/2^{(n-1)}.$$

2. A decoding method of decoding encoded image data which has been hierarchically encoded in advance by a discrete wavelet transform method, comprising:
using a processor to perform the following:
determining a size of an image to be outputted;
judging a minimum number of layer/layers of hierarchy needed to obtain a decoded image of size equal to or exceed the determined size;
determining whether the minimum number of layer/layers of hierarchy corresponds to all the layers of hierarchy of the encoded image data;
decoding, if the determination proves true, all the layers of hierarchy of the encoded image data, and otherwise decoding the encoded image data up to a layer of hierarchy which is one or more layers higher than the minimum number of layer/layers of hierarchy; and
reducing the size of the decoded image to the determined size,
wherein, in said judging step, the number n satisfies a condition of $$X = Sin/Sout$$

$$n = INT(\log_2 X)$$

where Sout is an output image size, and Sin is the input image size, and is judged as the minimum number of layer/layers of hierarchy; and
in said decoding step, image data is decoded up to a hierarchy which satisfies a condition of $$\text{Number of Layer/Layers to Be Decoded} = (\text{Total Number of Layers}) - n + 1.$$

3. A decoding method of decoding encoded image data which has been hierarchically encoded in advance by a discrete wavelet transform method, comprising:
using a processor to perform the following:
determining a size of an image to be outputted;
judging a minimum number of layer/layers of hierarchy needed to obtain a decoded image of size equal to or exceed the determined size;
determining whether the minimum number of layer/layers of hierarchy corresponds to all the layers of hierarchy of the encoded image data;
decoding, if the determination proves true, all the layers of hierarchy of the encoded image data, and otherwise decoding the encoded image data up to a layer of hierarchy which is one or more layers higher than the minimum number of layer/layers of hierarchy; and
reducing the size of the decoded image to the determined size,
wherein said decoding the encoded image data up to a layer of hierarchy which is one or more layers higher than the minimum number of layer/layers of hierarchy further includes:
decoding a lowest layer of hierarchy of encoded image data among layer/layers which has/have not been decoded, and repeating the decoding of a lowest layer of hierarchy of the encoded image data among the layer/layers which has/have not been decoded until it is determined that the size of the decoded image is equal to or larger than the determined size of the image to be outputted; and
decoding a next lowest layer of hierarchy of the encoded image data.

4. The decoding method according to claim 1, wherein the determined size includes horizontal pixel number information and vertical pixel number information.

5. The decoding method according to claim 1, wherein an encoding method used conforms to JPEG2000.

6. A decoding apparatus for decoding encoded image data which has been hierarchically encoded in advance, comprising:
   a first determination unit that determines a size of an image to be outputted;
   a judging unit that judges a minimum number of layer/layers of hierarchy needed to obtain a decoded image of size equal to or exceed the determined size;
   a second determination unit that determines whether the minimum number of layer/layers of hierarchy corresponds to all the layers of hierarchy of the encoded image data;
   a decoding unit that, if the determination proves true, encodes all the layers of hierarchy of the enclosed image data, and otherwise decodes the encoded image data up to a layer of hierarchy which is one or more layers higher than the minimum number of layer/layers of hierarchy; and
   a reduction unit that reduces the size of the decoded image to the determined size,
   wherein, in said judging step, the number n satisfies a condition of $1/2^n \geq Sout/Sin > 1/2^{(n+1)}$ where Sout is an output image size, and Sin is the input image size, n is an integer equal to or greater than 1, and is judged as the minimum number of layer/layers of hierarchy, and
   wherein, in said decoding step, image data is decoded up to a hierarchy until an input-output ratio of image size becomes $1/2^{(n-1)}$.

7. An encoding method of hierarchically encoding image data by a discrete wavelet transform method, comprising:
   using a processor to perform the following:
   determining a size of an image to be outputted;
   judging a minimum number of layer/layers of hierarchy needed to obtain a decoded image of size equal to or exceed the determined size;
   determining whether the minimum number of layer/layers of hierarchy corresponds to all the layers of hierarchy to which the image data can be encoded; and
   encoding, if the determination proves true, all the layers of hierarchy of the image data, and otherwise encoding the image data up to a layer of hierarchy which is one more layer higher than the minimum number of layer/layers of hierarchy,
   wherein, in said judging step, the number n satisfies a condition of $1/2^n > Sout/Sin > 1/2^{(n+1)}$ where Sout is an output image size, and Sin is the input image size, n is an integer equal to or greater than 1, and is judged as the minimum number of layer/layers of hierarchy, and
   wherein, in said encoding step, image data is decoded up to a hierarchy until an input-output ratio of image size becomes $1/2^{(n-1)}$.

8. An encoding method of hierarchically encoding image data by a discrete wavelet transform method, comprising:
   using a processor to perform the following:
   determining a size of an image to be outputted;
   judging a minimum number of layer/layers of hierarchy needed to obtain a decoded image of size equal to or exceed the determined size;
   determining whether the minimum number of layer/layers of hierarchy corresponds to all the layers of hierarchy to which the image data can be encoded; and
   encoding, if the determination proves true, all the layers of hierarchy of the encoded image data, and otherwise encoding the image data up to a layer of hierarchy which is one more layer higher than the minimum number of layer/layers of hierarchy,
   wherein, in said judging step, the number n satisfies a condition of $X = Sin/Sout$ $n = INT(\log_2 X)$ where Sout is an output image size, and Sin is the input image size, and is judged as the minimum number of layer/layers of hierarchy, and
   wherein, in said encoding step, image data is encoded up to a hierarchy which satisfies a condition of Number of Layer/Layers to Be Decoded=(Total Number of Layers)−n+1.

9. An encoding method of hierarchically encoding image data by a discrete wavelet transform method, comprising:
   using a processor to perform the following:
   determining a size of an image to be outputted;
   judging a minimum number of layer/layers of hierarchy needed to obtain a decoded image of size equal to or exceed the determined size;
   determining whether the minimum number of layer/layers of hierarchy corresponds to all the layers of hierarchy to which the image data can be encoded; and
   encoding, if the determination proves true, all the layers of hierarchy of the image data, and otherwise encoding the image data up to a layer of hierarchy which is one or more layers higher than the minimum number of layer/layers of hierarchy,
   wherein said encoding the image data up to a layer of hierarchy which is one or more layers higher than the minimum number of layer/layers of hierarchy further includes:
   encoding a lowest layer of hierarchy of an image among layer/layers which has/have not been encoded, and repeating encoding of a lowest layer of hierarchy of the image among the layer/layers which has/have not been encoded until it is determined that the size of the encoded image is equal to or larger than the determined size of the image to be outputted; and encoding a next lowest layer of hierarchy of the image.

10. The encoding method according to claim 7, wherein the determined size includes horizontal pixel number information and vertical pixel number information.

11. The encoding method according to claim 7, wherein an encoding method conforms to JPEG2000.

12. An encoding apparatus for hierarchically encoding an image, comprising:
    a first determination unit that determines a size of an image to be outputted;
    a judging unit that judges a minimum number of layer/layers of hierarchy needed to obtain a decoded image of size equal to or exceed the determined size;

a second determination unit that determines whether the minimum number of layer/layers of hierarchy corresponds to all the layers of hierarchy to which the image data can be encoded;

an encoding unit that, if the determination proves true, encodes all the layers of hierarchy of the image data, and otherwise encodes the image up to a layer of hierarchy which is one or more layers higher than the minimum number of layer/layers of hierarchy; and reducing the size of the decoded image to the determined size, wherein, in said judging step, the number n satisfies a condition of $$1/2^n > Sout/Sin \_ 1/2^{(n+1)}$$

where Sout is an output image size, and Sin is the input image size, n is an integer equal to or greater than 1, and is judged as the minimum number of layer/layers of hierarchy, and wherein, in said encoding step, image data is decoded up to a hierarchy until an input-output ratio of image size becomes $$1/2^{(n-1)}.$$

13. The decoding method according to claim 2, wherein the determined size includes horizontal pixel number information and vertical pixel number information.

14. The decoding method according to claim 3, wherein the determined size includes horizontal pixel number information and vertical pixel number information.

15. A decoding apparatus for decoding encoded image data which has been hierarchically encoded in advance, comprising:

a first determination unit that determines a size of an image to be outputted;

a judging unit that judges a minimum number of layer/layers of hierarchy needed to obtain a decoded image of size equal to or exceed the determined size;

a second determination unit that determines whether the minimum number of layer/layers of hierarchy corresponds to all the layers of hierarchy of the encoded image data;

a decoding that, if the determination proves true, encodes all the layers of hierarchy of the encoded image data, and otherwise decoding the encoded image data up to a layer of hierarchy which is one or more layers higher than the minimum number of layer/layers of hierarchy; and a reducing unit that reduces the size of the decoded image to the determined size, wherein, in said judging unit, the number n satisfies a condition of $$X = Sin/Sout$$

$$n = INT(\log_2 X)$$

where Sout is an output image size, and Sin is the input image size, and is judged as the minimum number of layer/layers of hierarchy; and in said decoding unit, image data is decoded up to a hierarchy which satisfies a condition of Number of Layer/Layers to Be Decoded=(Total Number of Layers)−n+1.

16. A decoding apparatus for decoding encoded image data which has been hierarchically encoded in advance, comprising:

a first determining unit that determines a size of an image to be outputted;

a judging unit that judges a minimum number of layer/layers of hierarchy needed to obtain a decoded image of size equal to or exceed the determined size;

a second determining unit that determines whether the minimum number of layer/layers of hierarchy corresponds to all the layers of hierarchy of the encoded image data;

a decoding unit that, if the determination proves true, decodes all the layers of hierarchy of the encoded image data, and otherwise decodes the encoded image data up to a layer of hierarchy which is one or more layers higher than the minimum number of layer/layers of hierarchy; and a reducing unit that reduces the size of the decoded image to the determined size, wherein when said decoding unit decodes the encoded image data up to a layer of hierarchy which is one or more layers higher than the minimum number of layer/layers of hierarchy, the decoding further includes:

decoding a lowest layer of hierarchy of encoded image data among layer/layers which has/have not been decoded, and repeating the decoding of a lowest layer of hierarchy of the encoded image data among the layer/layers which has/have not been decoded until it is determined that the size of the decoded image is equal to or larger than the determined size of the image to be outputted; and decoding a next lowest layer of hierarchy of the encoded image data.

17. An encoding apparatus for hierarchically encoding image data by a discrete wavelet transform method, comprising:

a first determining unit that determines a size of an image to be outputted;

a judging unit that judges a minimum number of layer/layers of hierarchy needed to obtain a decoded image of size equal to or exceed the determined size;

a second determining unit that determines whether the minimum number of layer/layers of hierarchy corresponds to all the layers of hierarchy to which the image data can be encoded;

an encoding unit that, if the determination proves true, encodes all the layers of hierarchy of the encoded image data, and otherwise encodes the image data up to a layer of hierarchy which is one more layer higher than the minimum number of layer/layers of hierarchy, wherein, in said judging unit, the number n satisfies a condition of $$X = Sin/Sout$$

$$n = INT(\log_2 X)$$

where Sout is an output image size, and Sin is the input image size, and is judged as the minimum number of layer/layers of hierarchy, and wherein, in said encoding step, image data is encoded up to a hierarchy which satisfies a condition of Number of Layer/Layers to Be Decoded=(Total Number of Layers)−n+1.

18. An encoding apparatus for hierarchically encoding image data by a discrete wavelet transform method, comprising:

a first determining unit that determines a size of an image to be outputted;

a judging unit that judges a minimum number of layer/layers of hierarchy needed to obtain a decoded image of size equal to or exceed the determined size;

a second determining unit that determines whether the minimum number of layer/layers of hierarchy corresponds to all the layers of hierarchy to which the image data can be encoded;

an encoding unit that, if the determination proves true, encodes all the layers of hierarchy of the image data, and otherwise encodes the image data up to a layer of hierarchy which is one layer higher than the minimum number of layer/layers of hierarchy, wherein said encoding the image data up to a layer of hierarchy which is one or more layers higher than the minimum number of layer/layers of hierarchy further includes:

encoding a lowest layer of hierarchy of an image among layer/layers which has/have not been encoded, and repeating encoding of a lowest layer of hierarchy of the image among the layer/layers which has/have not been encoded until it is determined that the size of the encoded image is equal to or larger than the determined size of the image to be outputted; and encoding a next lowest layer of hierarchy of the image.

* * * * *